(12) United States Patent
Miyanishi et al.

(10) Patent No.: US 7,690,009 B2
(45) Date of Patent: Mar. 30, 2010

(54) ELECTROMAGNETIC FIELD GENERATING ELEMENT, INFORMATION RECORDING/REPRODUCING HEAD AND INFORMATION RECORDING/REPRODUCTION APPARATUS

(75) Inventors: Shintaro Miyanishi, Ikoma-gun (JP); Naoyasu Iketani, Nara (JP); Kunio Kojima, Nabari (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 12/316,592

(22) Filed: Dec. 12, 2008

(65) Prior Publication Data

US 2009/0106783 A1  Apr. 23, 2009

Related U.S. Application Data

(62) Division of application No. 11/238,024, filed on Sep. 27, 2005, now Pat. No. 7,489,597.

(30) Foreign Application Priority Data

Sep. 27, 2004 (JP) ............................. 2004-280670
Oct. 13, 2004 (JP) ............................. 2004-298735
Feb. 7, 2005 (JP) ............................. 2005-031149

(51) Int. Cl.
*G11B 11/24* (2006.01)
*G11B 11/00* (2006.01)

(52) U.S. Cl. ............... 720/658; 369/13.33; 369/13.02; 369/13.22

(58) Field of Classification Search ............. 369/13.01, 369/13.02, 13.13, 13.22, 13.23, 13.33; 360/59; 720/658

See application file for complete search history.

(56) References Cited

U.S. PATENT DOCUMENTS 6,584,045 B1  6/2003  Ishii et al.

(Continued)

FOREIGN PATENT DOCUMENTS

EP  0 996 117 A1  4/2000

(Continued)

OTHER PUBLICATIONS

Honeywell, Inc. SSEC, "*Challenges of Coreless Current Sensors-Part 1-*" INTERNIX Newsletter; May 2006; No. 91; pp. 56-57.

(Continued)

*Primary Examiner*—William J Klimowicz
(74) *Attorney, Agent, or Firm*—Edwards Angell Palmer & Dodge LLP; David G. Conlin; David A. Tucker

(57) ABSTRACT

An electromagnetic field generating element restrains magnetic field attenuation or magnetic field delay in a high frequency recording/reproducing head for thermally assisted magnetic field recording/reproduction using a near field. An information recording/reproducing head and an information recording/reproducing apparatus carry out high frequency magnetic recording/reproduction. The electromagnetic field generating element includes: (i) a substrate, (ii) conductors each provided on the substrate and each serving as a supporting section, (iii) a plate-like-shaped conductor provided on the conductors and (iv) a semiconductor laser element provided on the substrate. The semiconductor laser element irradiates laser light to the plate-like-shaped conductor substantially parallel to an extending flat surface of the plate-like-shaped conductor. This causes generation of a near field in the plate-like-shaped conductor. In addition, a magnetic field is generated by supplying a current to the plate-like-shaped conductor.

17 Claims, 54 Drawing Sheets

U.S. PATENT DOCUMENTS

| | | | |
|---|---|---|---|
| 6,687,195 B2 | | 2/2004 | Miyanishi et al. |
| 6,795,380 B2* | | 9/2004 | Akiyama et al. .......... 369/13.33 |
| 6,956,808 B2 | | 10/2005 | Miyanishi et al. |
| 7,307,923 B2 | | 12/2007 | Miyanishi et al. |
| 7,372,648 B2* | | 5/2008 | Akiyama et al. .......... 369/13.33 |
| 7,489,597 B2* | | 2/2009 | Miyanishi et al. ......... 369/13.33 |
| 7,500,255 B2* | | 3/2009 | Seigler et al. ................ 720/658 |
| 2001/0021208 A1 | | 9/2001 | Ueyanage |
| 2001/0040868 A1* | | 11/2001 | Ueyanagi et al. ............. 369/300 |
| 2002/0003752 A1 | | 1/2002 | Fuji et al. |
| 2002/0167870 A1* | | 11/2002 | Akiyama et al. .......... 369/13.33 |
| 2003/0128452 A1* | | 7/2003 | McDaniel et al. ............. 360/59 |
| 2003/0198146 A1* | | 10/2003 | Rottmayer et al. ....... 369/13.13 |
| 2003/0223316 A1 | | 12/2003 | Saga et al. |
| 2004/0001394 A1* | | 1/2004 | Challener et al. ......... 369/13.32 |
| 2004/0001421 A1* | | 1/2004 | Tawa et al. ............. 369/112.28 |
| 2004/0081030 A1* | | 4/2004 | Jang et al. ................ 369/13.17 |
| 2004/0194119 A1 | | 9/2004 | Miyanishi et al. |
| 2004/0257965 A1 | | 12/2004 | Miyanishi et al. |
| 2005/0030883 A1* | | 2/2005 | Hesselink et al. ........... 369/300 |
| 2005/0289577 A1 | | 12/2005 | Seigler et al. |
| 2006/0075417 A1 | | 4/2006 | Miyanishi et al. |

FOREIGN PATENT DOCUMENTS

| | | | |
|---|---|---|---|
| JP | 04-295649 A | | 10/1992 |
| JP | 8-14895 | | 2/1996 |
| JP | 2000-113499 A | | 4/2000 |
| JP | 2000-215427 A | | 8/2000 |
| JP | 2001-244564 | | 9/2001 |
| JP | 2001-250251 | | 9/2001 |
| JP | 2001283405 A | * | 10/2001 |
| JP | 2001-319365 | | 11/2001 |
| JP | 2004-216473 A | | 8/2004 |
| JP | 2004-303299 A | | 10/2004 |
| JP | 2006-120294 A | | 5/2006 |
| JP | 2007-323736 A | | 12/2007 |

OTHER PUBLICATIONS

H. Tsujii, et al.; "*LD-PD Device Integrated with Br$_2$ Gass*"; Journel of IEICE (Institute of Electronics, Information and Communication Engineers); May 20, 1988; vol. J71-C; No. 5; pp. 732-738.

M. Otsu, et al.; (ed); "*Near-field Nano-photonics Handbook*"; Optronics Co.; Ltd.: 1 ed.; Sep. 5, 1997; pp. 6-9, pp. 172-175 and 184-187.

Shintaro Miyanishi et al,; "*Near-Field Assisted Magnetic Recording*"; IEEE Transactions on Magnetics; Oct. 2005; vol. 41; No. 10; pp. 2817-2821.

E. Sugawara, et al.; "*Thin-film Micro-coils for Magneto-optical Recording*"; Journal of MSJ (Magnetic Society of Japan); 2002; vol. 26; No. 4; pp. 345-349.

Shintaro Miyanishi et al.; "*Near field and magnetic fied generator for thermal assisted magnetic recording*"; Electrochimica Acta; Nov. 2007; vol. 53; pp. 4-6.

S. Onari; "*Spectroscopy of Solids*"; Shokabo Publishing Co., Ltd.; 1st ed.; Sep. 20, 1994; pp. 33.

M. Otsu, et al; (ed); "*Near-field Nano-photonics Handbook*" Optronics Co., Ltd.; 1st ed.; Sep. 5, 1997; pp. 178-179.

F. Koyama, et al.; "*Surfce emitting lasers for near-field optics*"; Oyo Butsuri; Japan Society of Applied Physics (JSAPA); vol. 68; No. 12; pp. 1380-1383.

S. Miyanishi, et al.; "*Near Field Assisted Magnetic Recording*"; Digests of the IEEE International Magnetics Conference, Nagoya Congress Center; Nagoya; Japan; Apr. 4-6, 2005; (pp. 15 and 1-6).

M. Hirata, et al.; "*Resolution of the Near Field Optical Probe with a Triangular Aperture in Polarization Controlled System*"; Extended Abstracts of the 50th Spring Meeting, 2003; The Japan Society of Applied Physics and Related Societies; Mar. 27, 2003; pp. 1102-1103.

L. Vaccaro, et al.; "*Propagation of the Electromagnetic Field in Fully Coated Near-Field Optical Probes*"; Applied Physics Letters; vol. 83; No. 3; 2003 American Institute of Physics; pp. 584-586; Jul. 21, 2003.

S. MMiyanishi et al.; "*Monolithically-Fabricated Hybrid Head for Near Field Assisted Magnetic Recording*"; IEEE International Magnetics Conference AE-01; pp. 51; May 4, 2008.

Notice of Reasons for Refusal mailed Jun. 5, 2007, by the Japanese Patent Office for the Japanese patent application No. 2003-092383 corresponding to U.S. Appl. No. 10/811,429.

* cited by examiner

FIG. 1
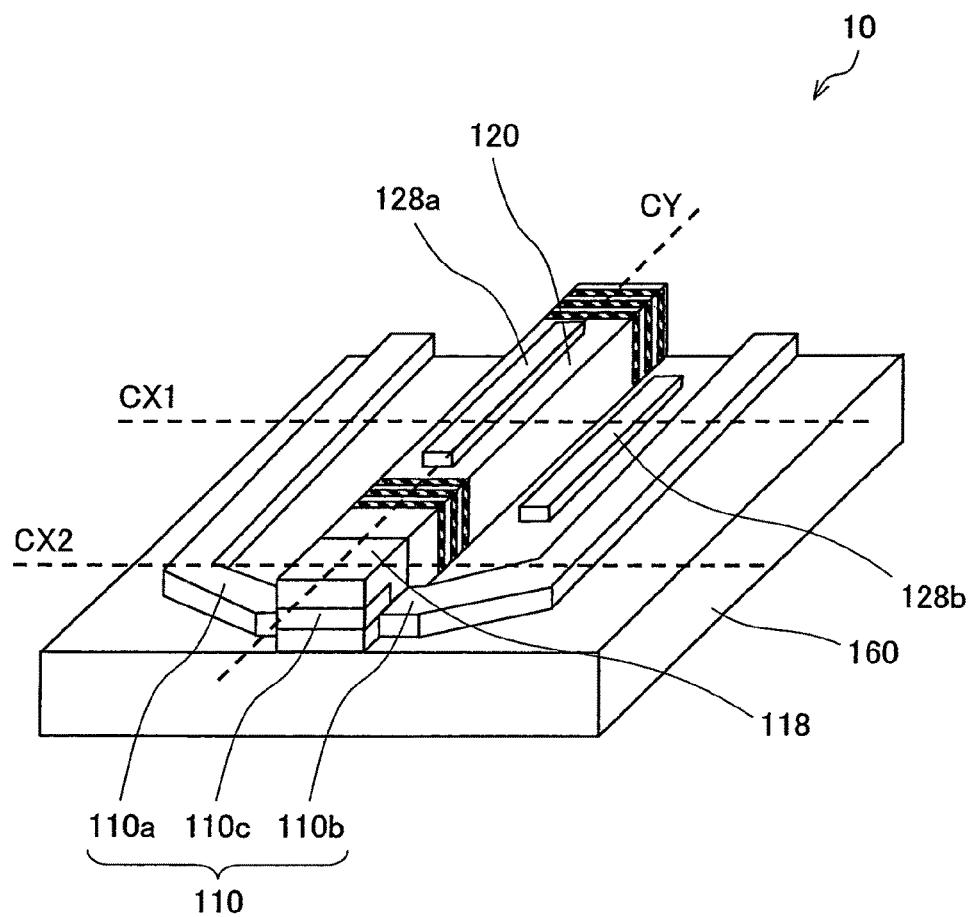
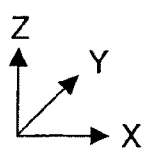

FIG. 8
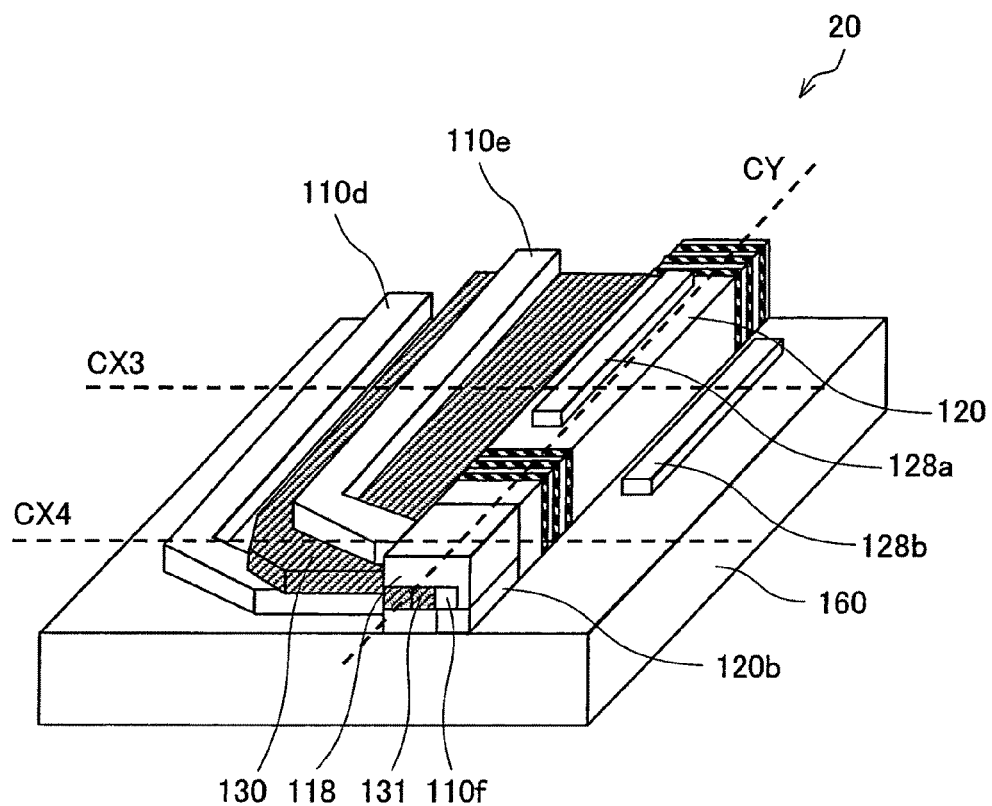
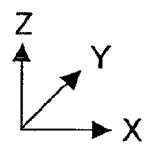

FIG. 12
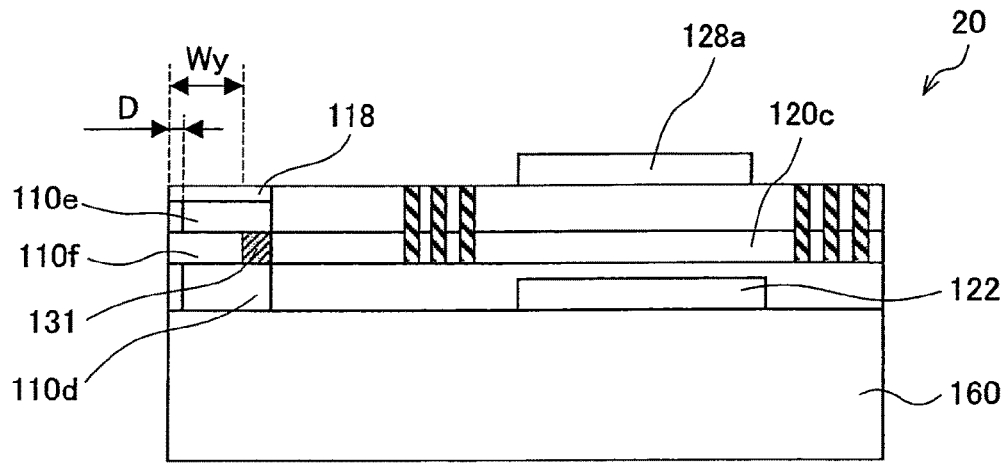
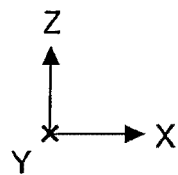
FIG. 13
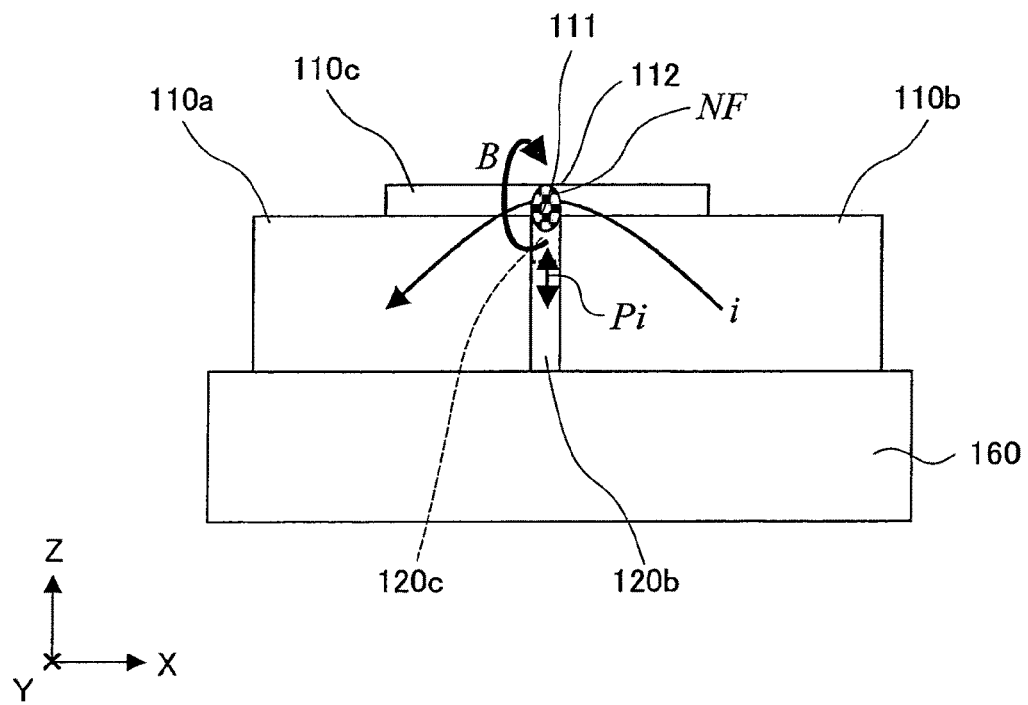
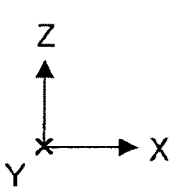

ELECTROMAGNETIC FIELD GENERATING ELEMENT, INFORMATION RECORDING/REPRODUCING HEAD AND INFORMATION RECORDING/REPRODUCTION APPARATUS

This is a divisional patent application of U.S. patent application Ser. No. 11/238,024 filed on 27 Sep. 2005, now U.S. Pat. No. 7,489,597, entitled ELECTROMAGNETIC FIELD GENERATING ELEMENT, INFORMATION RECORDING/REPRODUCING HEAD, AND INFORMATION RECORDING/REPRODUCING APPARATUS by Shintaro MIYANISHI, Naoyasu IKETANI, and Kunio KOJIMA the same inventors as of this divisional application.

This Nonprovisional application claims priority under 35 U.S.C. §119(a) on (i) Patent Application No. 2004/298735 filed in Japan on Oct. 13, 2004, (ii) Patent Application No. 2004/280670 flied in Japan on Sep. 27, 2004, and (iii) Patent Application No. 2005/031149 filed in Japan on Feb. 7, 2005, the entire contents of which are hereby incorporated by reference.

FIELD OF THE INVENTION

The present invention relates to an electromagnetic field generating element, an information recording/reproducing head, and an information recording/reproducing apparatus. Specifically, the present invention relates to (i) an electromagnetic field generating element for generating a near field and a magnetic field, (ii) an information recording/reproducing head including the electromagnetic field generating element, or (iii) an information recording/reproducing apparatus including the electromagnetic field generating element.

Note that the wording "information recording/reproducing apparatus" in the present specification encompasses: (i) an apparatus for recording information onto a recording medium and reproducing information from the recording medium, (ii) an apparatus for merely recording information onto the recording medium, and (iii) an apparatus for merely reproducing information from the recording medium.

BACKGROUND OF THE INVENTION

In recent years, thermally assisted (laser-assisted) magnetic recording has drawn an attention as a promising next generation high density magnetic recording technique. The technique is a technique for carrying out magnetic recording with respect to a high-coercivity magnetic recording medium, which is strong to heat fluctuation. Specifically, light is collected on a surface of such a magnetic recording medium so as to locally raise temperature of the magnetic recording medium. The temperature rise in such a portion of the magnetic recording medium causes reduction of the coercivity in the portion, with the result that the magnetic recording can be carried out with the use of a normal magnetic head.

Required for attainment of higher density thermally assisted magnetic field recording is size reduction of the collected light. Proposed in recent years is a technique using a near field which exceeds diffraction limit of light.

For example, Japanese Unexamined Patent Publication Tokukai 2001-319365 (published on Nov. 16, 2001; corresponding to US Patent Application 2001-0040868 A1) discloses a technique for using such a near field so as to attain the thermally assisted magnetic recording with respect to a magnetic recording film or an optical magnetic film. Specifically, such a thermally assisted magnetic recording using the near field is attained by forming a magnetic gap in the vicinity of an aperture in which the near field is generated. The formation of the magnetic gap is carried out by using a yoke extension section formed in a magnetic circuit constituting a thin film magnetic transducer.

That is, a flying recording head described in Japanese Unexamined Patent Publication Tokukai 2001-319365 includes a light shield body including an aperture having a size smaller than a size of laser light. The light shield body is provided in a position from which the laser light is irradiated, so that the laser light irradiated to the light shield body causes generation of the near field. Meanwhile, in the flying recording head, a magnetic field is generated by the thin film magnetic transducer, and the magnetic field thus generated is induced in the near field via the yoke extension section, with the result that the magnetic gap is formed. The magnetic gap is used for the recording onto the information recording medium, while raising the temperature of the information recording medium by using the near field.

Further, Japanese Unexamined Patent Publication Tokukai 2001-244564 (published on Sep. 7, 2001; corresponding to US Patent Application US2001-0021208 A1) and Japanese Unexamined Patent Publication Tokukai 2001-250251 (published on Sep. 14, 2001; corresponding to US Patent Application US2001-0021208 A1) do not describe a technique of generating the magnetic field, but describe a technique about a semiconductor laser including a part for generating the near field. See the description below.

Each of FIG. 74(a) and FIG. 74(b) illustrates an optical head, which is described in each of Japanese Unexamined Patent Publication Tokukai 2001-244564 (published on Sep. 7, 2001) and Japanese Unexamined Patent Publication Tokukai 2001-250251 (published on Sep. 14, 2001) and which includes such a semiconductor laser that has a metal light shield body having a fine aperture. As shown in FIG. 74(a), such an optical head 900 includes a flying slider 911. The flying slider 911 has a rear end portion 911a in which a semiconductor laser 920 is provided. The semiconductor laser 920 includes (i) a crystalline film 930, (ii) a high reflection multilayer film 910a provided in the rear end surface of the crystalline film 930, and (iii) a low reflection multilayer film 910b provided in the front end surface of the crystalline film 930. The high reflection multilayer film 910a has a reflectance different from that of the low reflection multilayer film 910b. The low reflection multilayer film 910b has a surface on which a metal light shield body 940 having a coaxial aperture 915 is provided. The coaxial aperture 915 is made up of (i) a rectangle-shaped minute aperture, and (ii) a rectangle-shaped center metal body which is provided such that the center of the center metal body coincides with the center of the minute aperture.

As such, the optical head 900 includes the semiconductor laser 920 having the metal light shielding member 940 in which the coaxial aperture 915 is formed. Such a single optical head 900 irradiates laser light from a laser oscillation region 980 to the coaxial aperture 915. This causes generation of a near field 960 in the vicinity of the minute aperture of the coaxial aperture 915. On this occasion, in cases where the optical head 900 is so positioned as to face a surface of a medium 970a provided on the substrate 970b as shown in FIG. 74(b), the optical head 900 irradiates laser from (i) the plan surface having the minute aperture in which the near field is generated, to (ii) the medium 970a. With this, the near field 960 can be irradiated to the surface (recording surface) of the medium 970a of the information recording medium 970, with the result that information can be recorded thereonto.

However, the conventional structures suffer from such a problem that good thermally assisted magnetic recording/reproduction cannot be carried out, at a high frequency, with respect to the minute region in the medium.

That is, in the structure of the flying recording head described in Japanese Unexamined Patent Publication Tokukai 2001-319365, the magnetic field is induced from the thin film magnetic transducer to the near field via the yoke extension section, so that the yoke extension section causes (i) strength attenuation of the magnetic field and (ii) propagation delay of thereof. The strength attenuation of the magnetic field gives rise to decrease of output for the writing, whereas the propagation delay thereof gives rise to slow responsiveness. For this reason, the flying recording head having such a structure is not suitable for the high frequency magnetic recording/reproduction.

On the other hand, in each structure of Japanese Unexamined Patent Publication Tokukai 2001-244564 and Japanese Unexamined Patent Publication Tokukai 2001-250251, when the near field generated in the minute aperture actually comes close to the surface of the medium, the near field resonates between (i) the plan surface in which the minute aperture is formed, and (ii) the surface of the medium; and the near field propagates within the plan surface. Accordingly, strength distribution of the near field varies in the minute aperture. For this reason, the techniques are not suitable for the near field assisted recording which requires the near field for the recording onto a minute region of the medium.

Note that, the wording "near field" in the present specification encompasses (i) a surface plasmon Dsp (surface-plasmon polariton), which is a surface electromagnetic wave generated on a surface of a material or generated in the vicinity of an interface of the material; (ii) a localized surface plasmon Dlsp (localized surface-plasmon polariton) which is locally excited in a solitary fine particle, a tip of a minute metal needle, etc.; and the like.

SUMMARY OF THE INVENTION

The present invention is made in view of the foregoing conventional problems, and its object is to provide (i) an electromagnetic field generating element which allows restraint of magnetic field attenuation and magnetic field delay; (ii) an information recording/reproducing head and an information recording/reproducing apparatus, each of which is suitable for the thermally assisted magnetic recording/reproduction carried out, at high frequency, with respect to a minute region. The thermally assisted magnetic recording/reproducing uses the near field.

To achieve the object, an electromagnetic field generating element of the present invention includes: (i) a substrate; (ii) a conductor, which is provided on the substrate and which has a plate-like shape; and (iii) light irradiation means for irradiating light, the light irradiation means irradiating, to the conductor, light substantially parallel to an extending flat surface of the conductor, the conductor generating a magnetic field when receiving a current.

The light irradiation means irradiates light by (i) oscillating light or (ii) changing orientation of light irradiated from an external apparatus to the light irradiation means. The light irradiation means irradiates the light, to the conductor having the plate-like shape, light substantially parallel to the extending flat surface of the conductor. This causes generation of a near field in the surface of the conductor. The near field thus generated is propagated via the surface of the conductor, in the light irradiation direction. When the near field is propagated to an edge portion of the conductor, the orientation of the near field is dramatically changed along the surface of the conductor. Accordingly, an electric field is concentrated in the edge portion of the conductor. This causes generation of a strong localized near field from the edge portion of the conductor. As such, generated in the edge portion of the conductor are: (i) the near field generated by the light irradiation, and (ii) the localized near field generated in the direction in which the propagated near field travels. Therefore, such a stronger near field can be generated in the vicinity of the edge portion of the conductor. In this way, the structure above makes it possible to generate the near field in the vicinity of the edge portion of the conductor.

Further, the supply of the current to the conductor generating the near field allows generation of a magnetic field in the vicinity of the conductor. Generally, the magnetic field is stronger as distance is shorter to the portion in which the magnetic field is generated. For this reason, the magnetic field generated in the vicinity of the conductor is strong. As such, the structure above makes it possible to generate both the near field and the magnetic field in the vicinity of the edge portion of the conductor. In other words, the structure does not use a yoke extension section etc., for inducing the magnetic field; however, the structure makes it possible to generate the strong magnetic field directly in the region in which the near field is generated. Therefore, the structure above allows realization of an electromagnetic field generating element that allows restraint of the magnetic field attenuation and the magnetic field delay.

To achieve the object, an electromagnetic field generating element according to the present invention includes: (i) a light source; and (ii) a substrate, in which a conductor is provided; the conductor having a confinement portion, which is so narrow as to confine a path of a current flowing through the conductor; the confinement portion of the conductor having an edge that includes a bank-like structure portion projecting higher than a surface of the conductor; when the light source irradiates light to the confinement portion, a near field being generated in the bank-like portion within the confinement portion.

In the structure, the confinement portion formed in the conductor confines the path of the current supplied to the conductor, so that there is generated, in the vicinity of the confinement portion of the conductor, a magnetic field stronger than a magnetic field generated in cases where no confinement portion is formed.

Therefore, for generation of a strong magnetic field in a desired location, the confinement portion obtained by narrowing a portion of the conductor is formed in the location. That is, the electromagnetic field generating element does not need to use the yoke extension section so as to generate the magnetic field in such a desired location, so that the electromagnetic field generating element allows restraint of magnetic field attenuation or magnetic field delay as compared with the case of using the yoke extension section. This makes it possible to provide an electromagnetic field generating element suitable for the high frequency magnetic recording/reproduction.

In addition, the magnetic field is generated by supplying a current to the conductor. Further, the light irradiated from the light source is propagated to the conductor having the confinement portion, with the result that the light is irradiated to the conductor having the confinement portion. The light irradiation causes excitation of plasmon in the interface between (i) the conductor having the confinement portion and (ii) the substrate. This causes generation of the near field. The near field thus generated is propagated, via the side surface of the conductor, to the bank-like structure formed along the edge portion of the confinement portion of the conductor. In the bank-like structure, the near field is strengthened. This allows restraint of variation in strength distribution of the near field.

As such, the structure above generates the magnetic field and the near field in the confinement portion. In other words, the structure above makes it possible to generate the magnetic field and the near field in substantially the same location. Further, the magnetic field and the near field can be generated in a desired location by changing the position of the confinement portion of the conductor which has a simple structure and which is provided in the substrate.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1 is a diagram schematically illustrating a structure of an electromagnetic field generating element according to one embodiment of the present invention.

FIG. 8 is a diagram schematically illustrating a structure of an electromagnetic field generating element according to another embodiment according to the present invention.

FIG. 12 is a cross sectional view taken along line CY shown in FIG. 9.

FIG. 13 is a schematic cross sectional view taken along the line CX2 shown in FIG. 2.

DESCRIPTION OF THE EMBODIMENTS

Figure 2:
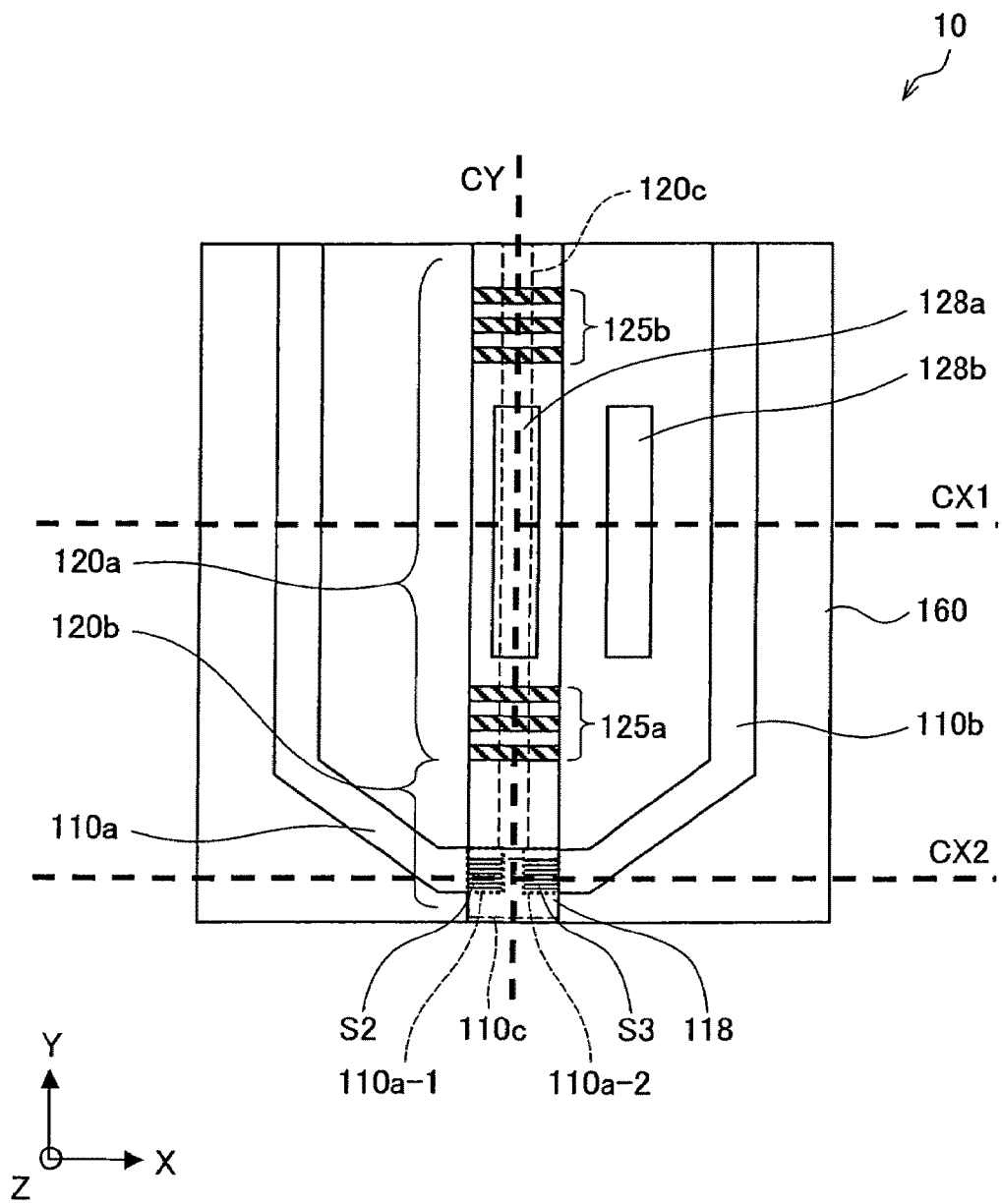
FIG. 2 is a diagram illustrating the electromagnetic field generating element that is shown in FIG. 1 and that is viewed from the Z axis positive direction.

Embodiments of the present invention will be explained below with reference to FIG. 1 through FIG. 73.

Embodiment 1

The following explains one embodiment of an electromagnetic field generating element according to the present invention, with reference to FIG. 1 through FIG. 7.

FIG. 1 is a diagram schematically illustrating the electromagnetic field generating element 10 according to the present embodiment. The electromagnetic field generating element 10 includes (i) a substrate 160, (ii) a semiconductor laser element 120 provided on the substrate 160, and (iii) a conductor clump 110.

Here, see the following definitions given for the sake of the clarity of explanation: (i) defined as "XY flat surface" is a surface whose sides respectively extending along the sides of the substrate 160; (ii) defined as "Z axis" is line perpendicular to the substrate 160; (iii) defined as "Z axis positive direction" is the upward direction of the substrate 160; (iv) defined as "Y axis direction" is the resonance direction of the semiconductor laser element 120 having a rectangular solid shape; (v) defined as "Y axis negative direction" is the laser irradiation direction, i.e., the direction in which the laser is irradiated; (vi) defined as "X axis" is an axis perpendicular to both the Y axis and the Z axis; and (vii) defined as "X axis positive direction" is rightward when viewing the electromagnetic generating element 10 with a conductor 110c positioned in the Y axis negative direction (front).

Further, in the explanation below, the X axis positive direction is also referred to as "right", an X axis negative direction being also referred to as "left", a Y axis positive direction being also referred to as "backward" or "rear", the Y axis negative direction being also referred to as "front" or "forefront", the Z axis positive direction being also referred to as "upward", a Z axis negative direction being also referred to as "downward". Moreover, a surface parallel to the Z axis is also referred to as "side surface".

Figure 3:
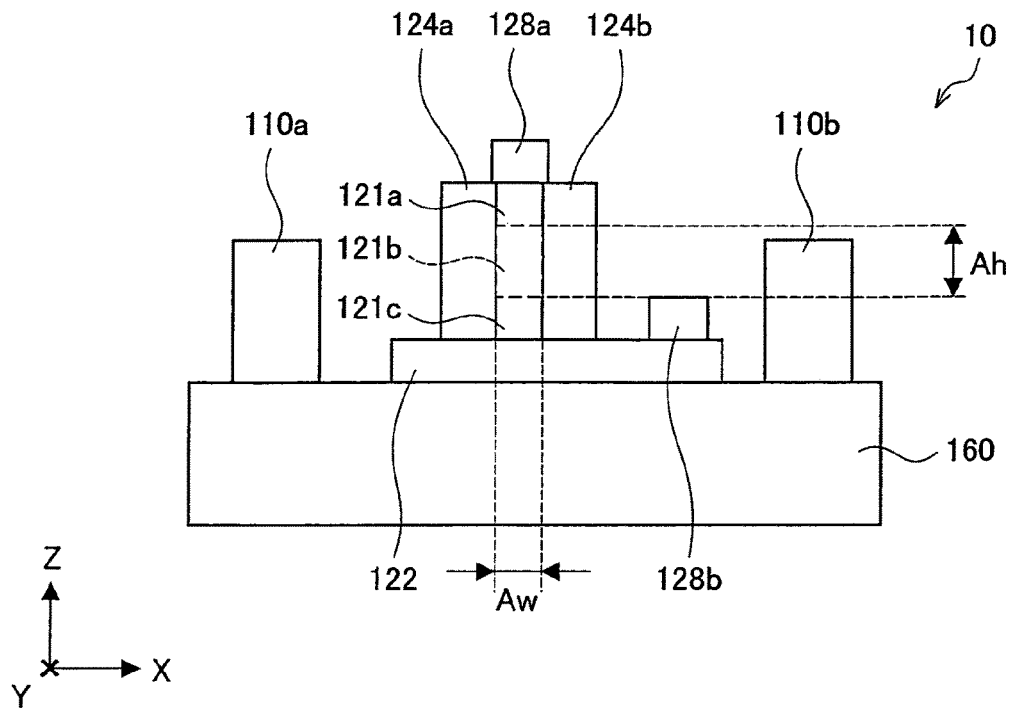
FIG. 3 is a cross sectional view taken along line CX1 shown in FIG. 2.

FIG. 2 is a diagram schematically illustrating the electromagnetic field generating element 10 according to the present embodiment, when viewed from the Z axis positive direction. FIG. 3 is a cross sectional view taken along line CX1 shown in FIG. 2. As shown in FIG. 2, the semiconductor laser element 120 is made up of a laser oscillation section 120a and a waveguide section 120b. The semiconductor laser element 120 has a rectangular solid shape whose longitudinal sides extend in the Y axis direction. Therefore, each of the laser oscillation section 120a and the waveguide section 120b also has a rectangular solid shape whose longitudinal sides extend in the Y axis direction, and the laser oscillation section 120a and the waveguide section 120b are provided side by side in the Y axis direction.

Details of the laser oscillation section 120a and the waveguide section 120b will be described later; however, the laser oscillation section 120a and the waveguide section 120b are provided such that the laser light is irradiated to a conductor 110c. In the present embodiment, the laser oscillation section 120a is provided on the substrate 160; however, the laser oscillation section 120a is not an essential constituent, so that the laser oscillation section 120a may be provided outside, and the laser light may be irradiated from outside to the conductor 110c via the waveguide section 120b. Moreover, the waveguide section 120b is not an essential constituent, either. Note that the laser oscillation section 120a and the waveguide section 120b each correspond to laser light irradiation means in claims.

As described above, in the present embodiment, the laser oscillation section 120a is so arranged as to irradiate the laser light in the Y axis negative direction. Therefore, the resonance direction of the laser oscillation section 120a corresponds to the Y direction, so that a distributed Bragg reflector (DBR) 125a is provided in an end (hereinafter, referred to as "Y axis negative direction end") of the laser oscillation section 120a in the Y axis negative direction, and a distributed Bragg reflector 125b is provided in an end (hereinafter, referred to as "Y axis positive direction end") of the laser oscillation section 120a in the Y axis positive direction. Alternatively, instead of the distributed Bragg reflector 125b, a reflective film may be provided in the Y axis positive direction end (in the upper portion of the laser oscillation section 120a in FIG. 2).

On and around the laser oscillation section 120a, electrodes 128a and 128b are provided so as to inject a current to the laser oscillation section 120a. Note that, in the present embodiment, the electrode 128a is provided on the upper surface of the laser oscillation section 120a, and the electrode 128b is provided in a lateral side with respect to the laser oscillation section 120a. Here, the electrode 128b may be provided on the lower surface of the substrate 160.

As shown in FIG. 3, the laser oscillation section 120a is made up of: an active laser 121b, two cladding layers 121a and 121c, and two block layers 124a and 124b. The cladding layers 121a and 121b are so provided on the upper surface and the lower surface of the active layer 121b as to sandwich the active layer 121b. In other words, the cladding layer 121c, the active layer 121b, and the cladding layer 121a are provided in this order from the downward.

The cladding layer 121a is a p-doped cladding layer, and the cladding layer 121c is an n-doped cladding layer. Under such an n-doped cladding layer 121c, a heavy-doped current injection layer 122 is provided. The current injection layer 122 makes contact with the cladding layer 121c, and has a rectangular solid shape having a portion projecting from the cladding layer 121c in the X axis positive direction. Provided on such a projection portion of the current injection layer 122 is the aforementioned electrode 128b. A current is supplied from the electrode 128b so as to be injected into the active layer 121b. This allows the semiconductor laser element 120 to excite the laser light.

In order to block the left side surface and the right side surface of the active layer 121b, the block layer 124a is provided on the left side surface of the active layer 121b, and the block layer 124b is provided on the right side surface thereof. The block layers 124a and 124b prevent the laser light from leaking out of the active layer 121b.

Note that the active layer 121b of the laser oscillation section 120a may have a multilayer quantum well structure. Further, it is preferable that each of the active layer 121b and the cladding layers 121a and 121c be made of a III-V group compound semiconductor. This allows easy formation of the semiconductor laser element 120 on the substrate 160, in cases where a crystalline substrate is used as the substrate 160.

It is preferable that the active layer 121b have a width Aw of approximately 100 nm to approximately 300 nm, and have a height Ah of approximately 200 nm to approximately 500 nm. With this, the active layer 121b has a rectangle-shaped cross sectional surface whose longitudinal sides are along the Z axis direction. This makes it easier to obtain TM mode laser light whose electric field vector is in the Z axis direction in FIG. 3.

Further, in the view of laser light containment efficiency, it is preferable that the block layers 124a and 124b be made of (i) any of a IV group semiconductor, a III-V group compound semiconductor, a II-VI group compound semiconductor, an insulator oxide, an insulator nitride, an insulating organic material, and the like; or (ii) a combination of them. Each of these materials has a refractive index lower than the active layer 121b has.

Explained next is the waveguide section 120b. The waveguide section 120b is provided adjacent to the laser oscillation section 120a in the laser oscillation direction (Y axis negative direction). The wave guide section 120b is formed in one piece with the laser oscillation section 120a. Therefore, the wave guide section 120b has the same structure as the structure of the laser oscillation section 120a, except the front end (described later) in which the conductors are implanted.

Specifically, the waveguide section 120b is made up of (i) a core layer, which corresponds to the active layer 121b of the laser oscillation section 120a; (ii) two cladding layers (not shown), which respectively correspond to the cladding layers 121a and 121c; and (iii) two block layers (not shown), which respectively correspond to the block layers 124a and 124b. Moreover, the cladding layers are so provided respectively on the upper surface and the lower surface of the core layer of the waveguide section 120b as to sandwich the core layer. Further, the block layers are so provided respectively on the side surfaces of the core layer as to sandwiches the core layer.

Here, the core layer of the waveguide section 120b is formed adjacent to the active layer 121b of the laser oscillation section 120a, in the extension line of the resonance direction of the laser oscillation section 120a. This makes it possible that the laser light generated in the active layer 121b of the laser oscillation section 120a is propagated to the core layer of the waveguide section 120b with high efficiency. This allows the waveguide section 120b to guide, in the Y axis negative direction, the laser light oscillated by the laser oscillation section 120a. With this, the laser light is irradiated to the conductor 110c described later.

The following description utilizes a wording "light propagation path portion 120c" for a region via which the laser is propagated. Specifically, the region corresponds to the surroundings of each center (line CY in FIG. 2) of the laser oscillation section 120a, the DBRs 125a and 125b, and the waveguide section 120b, all of which are provided side by side in the Y axis direction. Therefore, the laser light oscillated in the active layer 121b of the laser oscillation section 120a is propagated in the Y axis direction, passing through the light propagation path portion 120c. Here, the light propagation path portion 120c corresponds to (i) the active layer 121b in the laser oscillation section 120a, and (ii) the core layer in the waveguide section 120b.

The following explains the conductor clump 110. As shown in FIG. 1, the conductor clump 110 is made up of conductors 110a, 110b, and 110c. Although details will be described later, each of the conductors 110a and 110b also serves as a supporting section of the conductor 110c. Therefore, the conductors 110a and 110b correspond to a supporting section in claims.

Note that, each of the conductors 110a, 110b and 110c is made of (i) a metal having a high electric conductivity or (ii) a carbon nano tube, and is in the form of a plate. In the view of the high frequency responsiveness, it is preferable that each of the conductors 110a, 110b, and 110c be made of (i) any of Au, Pt, Ag, Cu, Al, Ti, W, Ir, Pd, and the like; or (ii) a combination of them. Each of these materials is a non-magnetic metal.

Respective shapes of the conductors 110a and 110b are not particularly limited; however, in the present embodiment, each of the conductors 110a and 110b has an elongate shape whose cross section is rectangular. As shown in FIG. 2, the conductor 110a constitutes one current path having no branch, and is so provided on the substrate 160 as to extend from (i) the left side with respect to the semiconductor laser element 120, to (ii) the front end of the waveguide section 120b. In other words, the conductor 110a has an end portion 110a-1 implanted in the left portion of the inside of the front end of the waveguide section 120b, and has the other end portion positioned on the left side with respect to the waveguide section 120b. Further, the conductor 110b has a shape symmetrical to the conductor 110a. Specifically, the conductor 110b also constitutes one current path having no branch, and is so provided on the substrate 160 as to extend from (i) the right side with respect to the semiconductor laser element 120, to (ii) the front end of the waveguide section 120b. In other words, the conductor 110b has an end portion 110b-1 implanted in the right portion of the inside of the front end, and has the other end portion positioned in the right side with respect to the waveguide section 120b.

Figure 4:
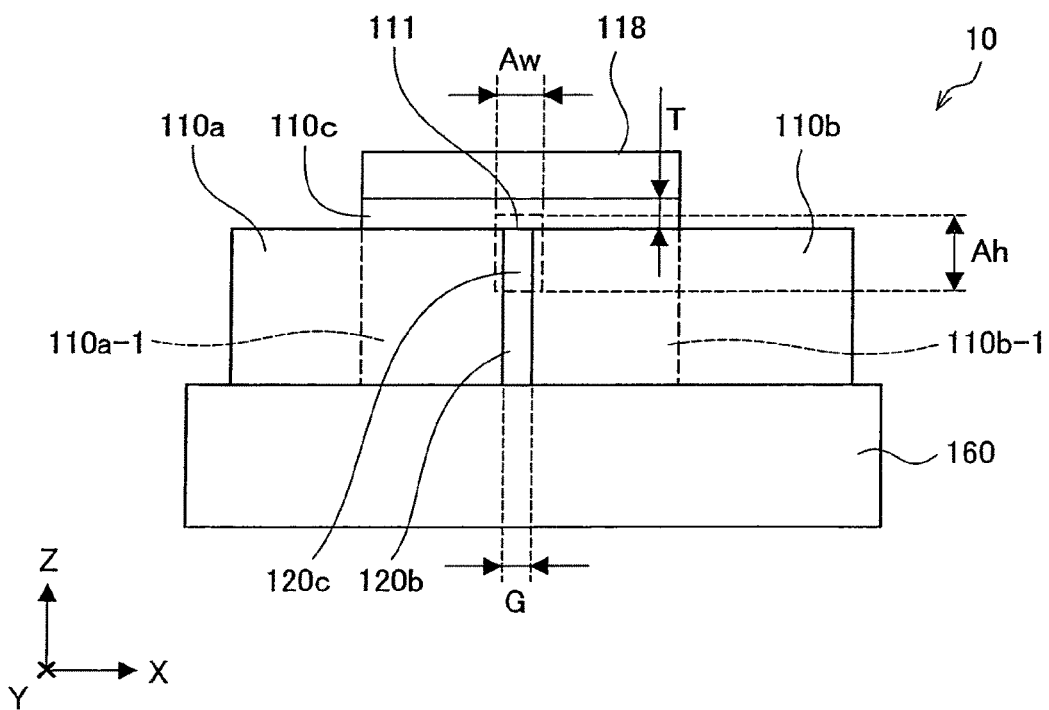
FIG. 4 is a cross sectional view taken along line CX2 shown in FIG. 2.

FIG. 4 is a cross sectional view taken along line CX2 shown in FIG. 2. The conductors 110a and 110b are so provided as to have the same height (thickness in the Z axis direction), and as to have the upper surfaces each positioned at substantially the same height as the upper boundary of the light propagation path portion 120c of the semiconductor laser element 120. Note that the light propagation path portion 120c shown in FIG. 4 is a cross section, and corresponds to a rectangular region surrounded by broken lines that respectively indicate the height Ah and the width Aw.

Further, the end surface of the end portion 110a-1 of the conductor 110a, and the end surface of the end portion 110b-1 of the conductor 110b are perpendicular to the X axis, and face each other in the front end of the waveguide section 120b as shown in FIG. 4. Further, there is a region between the right side surface of the end portion 110a-1 of the conductor 110a and the left side surface of the end portion 110b-1, and the region is termed "gap". Note that the gap has a width (length in the X axis direction) G. The gap is a part of the waveguide section 120b, so that the laser light passes through the upper portion of the gap.

Further, the conductor 110c is so provided on the conductors 110a and 110b as to cover the gap. This allows a current to flow from the conductor 110b to the conductor 110a via the conductor 110c, and allows the laser light to be irradiated from the semiconductor laser element 120 to the bottom surface of the conductor 110c. Here, the direction of the current flowing through the conductor clump 110 may be reverse to the direction described above.

Note that, it is preferable that the front bottom side (edge portion) 111 of the conductor 110c be positioned distant away by λ/ng or less from the boundary of the light propagation path portion 120c. Here, indicated by "λ" is wavelength of the laser light, and indicated by "ng" is a refractive index of the material of which the waveguide section 120b is made.

In the present embodiment, the conductor 110c is in the form of a thin plate (in the form of a film), and has a height (film thickness) shorter (thinner) than those of the conductors 110a and 110b. Such a conductor 110c confines a current i flowing through the conductor clump 110, with the result that a current density is increased. This allows generation of a strong magnetic field B in the laser oscillation side of the laser oscillation section 120a. Note that, it is preferable that the conductor 110c have a film thickness T of 1000 nm or thinner. Further, there is provided an insulating layer 118 on the conductor 110c.

In cases where the current i flowing through the conductor clump 110 is large, the confinement section (conductor 110c) is likely to be destroyed due to electric resistance. For this reason, it is preferable that, in cases where the current i is, e.g., approximately 100 mA, the conductor 110c have a cross sectional area S1 (see FIG. 7), a contact surface S2 (see FIG. 2), and a contact surface S3 (see FIG. 2), each of which is larger than approximately 6400 nm$^2$. Defined as the cross sectional area S1 is an area of a cross section of the conductor 110c, which cross section is perpendicular to the X axis. Further, the contact surface S2 refers to the contact surface of the conductor 110c with the conductor 110a, and the contact surface S3 refers to the contact surface of the conductor 110c with the conductor 110b. This makes it possible to prevent the contact portions of the conductor clump 110 and the current confinement section thereof from emitting heat and being melted due to Joule heat generated when the current i flows.

Further, it is preferable that the width G of the gap between the conductors 110a and 110b be shorter than the width of the active layer 121b. This allows reduction of propagation light component of the laser leaking from the gap to the outside of the electromagnetic field generating element 10, and allows increase of magnetic flux density in the gap. Accordingly, the electric field B generated on the periphery of the front bottom side 111 of the conductor 110c can be strengthened.

Figure 7:
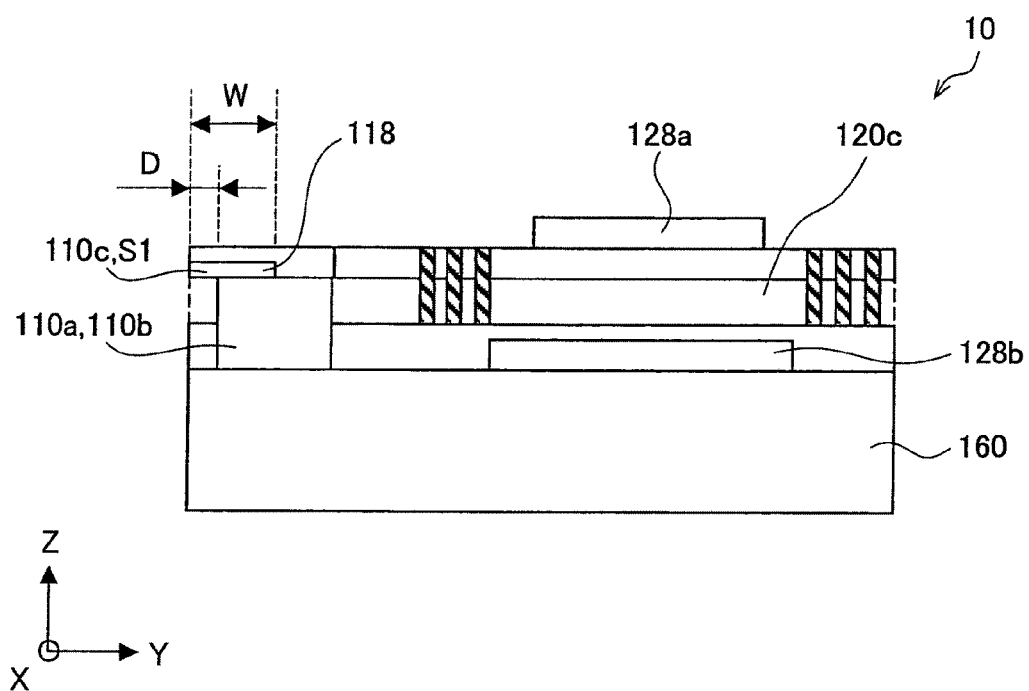
FIG. 7 is a cross sectional view taken along line CY shown in FIG. 2.
Figure 9:
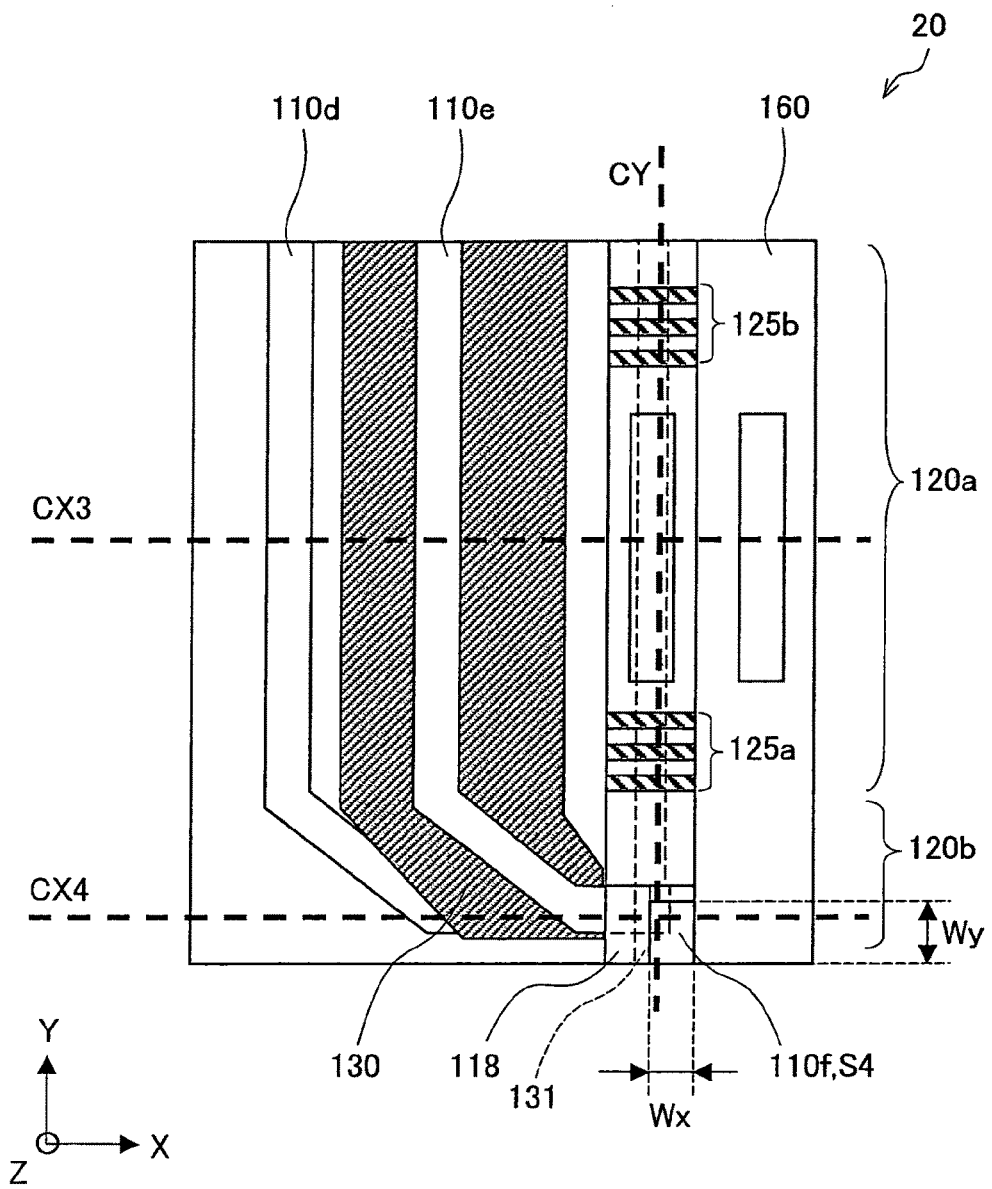
FIG. 9 is a diagram illustrating the electromagnetic field generating element that is shown in FIG. 8 and that is viewed from the Z axis positive direction.

FIG. 7 is a cross sectional view taken along the line CY shown in FIG. 2. As shown in FIG. 7, the conductor 110c projects in such a manner that its front end surface (forefront surface in the Y axis negative direction) is positioned distant away in the Y axis positive direction by distance D from the respective front end surfaces (forefront surfaces in the Y axis negative direction) of the conductor 110a and 110b. With this, the near field can be selectively generated on the periphery of the front bottom side 111 of the conductor 110c, even in cases where TE mode laser light whose electric field vector is in the X axis direction is mixed with the laser light emitted from the laser oscillation section. The laser light emitted therefrom is basically TM mode laser light whose electric field vector is in the Z axis direction.

Note that the surface of the end portion 110a-1 of the conductor 110a, the surface of the end portion 110b-1 of the conductor 110b, and the surface of the conductor 110c are each coated with a dielectric film whose refractive index is lower than that of the light propagation path portion 120c, the ends 110a-1 and 110b-1 being implanted in the front end of the waveguide section 120b. Preferably used as a material for the coating are: (i) any of the aforementioned IV group semiconductor, the III-V group compound semiconductor, the II-VI group compound semiconductor, the insulator oxide, the insulator nitride, the insulating organic material, and the like; or (ii) a combination of them. This makes it possible to prevent the oscillated laser light from leaking out of the conductor clump 110, and accordingly allows containment of the laser light in the light propagation path portion 120c of the waveguide section 120b.

Further, it is preferable that the substrate 160 be made of (i) a IV group semiconductor, (ii) a III-V group compound semiconductor, (iii) a II-IV group compound semiconductor, (iv) an insulator oxide, or (v) an insulator nitride. Examples of the IV group semiconductor include: Si, Ge, SiC, and the like. Examples of the III-V group compound semiconductor include: GaAs, GaP, InP, AlAs, GaN, InN, InSb, GaSb, and AlN. Examples of the II-VI group compound semiconductor include: ZnTe, ZeSe, ZnS, ZnO, and the like. Examples of the insulator oxide include: ZnO, $Al_2O_3$, $SiO_2$, $TiO_2$, $CrO_2$, $CeO_2$, and the like. Examples of the insulator nitride include: SiN, and the like.

For attainment of tighter combination between (i) each of the conductors 110a, 110b, and 110c, and (ii) the substrate 160 or the waveguide section 120b of the semiconductor laser element 120, it is preferable that a combining layer made of Zn, Ti, Cr, Al or the like be provided therebetween. This makes it possible to prevent each of the conductors 110a, 110b, and 110c from being detached from the substrate 160 or the waveguide section 120b of the semiconductor laser element 120, and accordingly allows improvement of element strength of the electromagnetic field generating element 10.

Note that the conductors 110a, 110b, and 110c are manufactured in accordance with the following processes. Firstly, the conductor 110a serving as a supporting table, and the conductor 110b having the same height as that of the conductor 110a are formed on the substrate 160 with the gap width G therebetween. The formation of the conductors 110a and 110b is carried out by depositing the conductors 110a and 110b on the substrate 160 in the Z axis positive direction in accordance with a publicly known thin film formation method such as the deposition method. With this, the respective thicknesses (heights) of the conductors 110a and 110b can be optimally adjusted by appropriately adjusting conditions in the thin film formation method.

Next, the conductor 110c in the form of a plate (film) is provided on the conductors 110a and 110b. With this, the bottom surface of the conductor 110c is accordingly positioned at the same height as the height of the respective upper surfaces of the conductors 110a and 110b. In the present embodiment, the laser light is irradiated to the bottom surface of the conductor 110c, and the near field is generated from the front bottom side 111 of the bottom surface. Therefore, with the structure above, the respective positions of the bottom surface and the front bottom side 111 of the conductor 110c are fine-adjusted to the laser light to be irradiated from the laser oscillation section 120a to the conductor 110c.

Note that, preferably used as the deposition method is the chemical deposition method, the physical deposition method, the sputtering method, the plating method, or the like. The formation of the conductors 110a and 110b with the use of these methods allows nano meter order adjustment of the respective heights of the conductors 110a and 110b, i.e., the position of the bottom surface of the conductor 110c. With this, the near field can be generated more effectively.

Explained next is an operation of the electromagnetic field generating element 10 according to the present embodiment. FIG. 13 is a cross sectional view illustrating the electromagnetic field generating element 10 shown in FIG. 2, when viewed in the Y axis positive direction. In cases where the current i is supplied from the conductor 110b to the conductor 110a via the conductor 110c, the current flows in the X axis negative direction through the conductor 110c. Accordingly, according to the corkscrew rule, the magnetic field is generated in the Y axis negative direction (out of the plane of FIG. 13) on the periphery of the front bottom side 111, whereas the magnetic field is generated in the Y axis positive direction (into the plane of FIG. 13) on the periphery of the front upper side 112 of the conductor 110c.

Here, the electric field B generated in the front bottom side 111 of the conductor 110c has a strength H, which is expressed by the following formula:

H=I/L, where "I" indicates the supplied current, "L" (=2×(W+T)) indicating the length of a path surrounding the cross sectional area S1 (=T×W) of the conductor 110c, "T" indicating the film thickness of the conductor 110c, and "W" indicating the width of the conductor 110c.

So, for example, when "T" is 100 nm and "W" is 200 nm and "I" is 100 mA, the strength H of the magnetic field B generated along the path surrounding the cross sectional surface S1 of the conductor 110c is approximately 167 kA/m (2100 Oe).

As such, the current flow through the conductor clump 110, in which the confinement section (conductor 110c) is provided in a desired position, causes the generation of the strong magnetic field B on the periphery of the front bottom side 111 of the confinement section (conductor 110c) in the current path.

As described above, unlike the conventional techniques, the electromagnetic field generating element 10 of the present embodiment does not need to use the yoke extension section for the generation of the magnetic field in a desired location, so that the electromagnetic field generating element 10 allows restraint of magnetic field attenuation or of magnetic field delay. For this reason, the electromagnetic field generating element 10 is suitable for the high frequency magnetic recording/reproduction.

Further, when the semiconductor laser element 120 oscillates laser light Pi, laser light Pi in the TM mode (the electric field vector is in the Z axis direction) causes generation of a surface plasmon Dsp on the interface between the conductor 110c and the waveguide section 120b in the light propagation path portion 120c. The surface plasmon Dsp thus generated is propagated, in the Y axis negative direction, to the bottom surface of the conductor 110c. In the front bottom side 111, the surface plasmon Dsp thus propagated is caused to change its direction, along the shape of the conductor 110c, to the Z axis positive direction. On this occasion, the surface plasmon Dsp causes generation of the strong near field in the vicinity of the front bottom side 111. As such, the electromagnetic field generating element 10 uses the corner (front bottom side 111) of the conductor 110c so as to generate such a strong near field NF.

As such, the electromagnetic field generating element 10 according to the present embodiment makes it possible to generate both the magnetic field B and the near field NF in the front bottom side 111 of the conductor 110c, by supplying the current to the conductor 110c and irradiating the laser light thereto.

Note that the near field NF indicates (i) the surface plasmon Dsp (surface-plasmon polariton), which is an electromagnetic wave generated in the vicinity of a surface of a material or in the vicinity of an interface thereof; (ii) a localized surface plasmon Dlsp (localized surface-plasmon polariton) which is locally excited in a solitary fine particle, a tip of a minute metal needle, etc.; and the like.

In the electromagnetic field generating element 10 of the present embodiment, the conductor 110c serving as the confinement section of the conductor clump 110, and the light propagation path portion 120c of the semiconductor laser element 120 are positioned in one straight line on the same surface of the substrate 160. Further, the front bottom side 111 of the conductor 110c is positioned in the vicinity of the boundary with the light propagation path portion 120c. Such a structure makes it possible that: the direction of the laser light Pi to be propagated through the light propagation path portion 120c is never changed, and the laser light Pi is directly irradiated to the conductor 110c constituting the confinement section of the conductor clump 110. This allows restraint of the laser strength attenuation due to the direction change of the laser light Pi. Accordingly, the near field can be generated with high efficiency in the vicinity of the front bottom side 111 of the conductor 110c.

In each of the inventions described in Japanese Unexamined Patent Publication Tokukai 2001-244564 and Japanese Unexamined Patent Publication Tokukai 2001-250251, when the near field generated in the fine aperture comes close to the surface of the medium, the near field resonates between (i) the flat surface on which the fine aperture is provided and (ii) the surface of the medium, the near field is propagated within the flat surface. This causes variation in strength distribution of the near field in the aperture portion. On the contrary, the electromagnetic field generating element of the present embodiment causes generation of the strong near field in the vicinity of the front bottom side 111 of the conductor 110c, so that the near field can be concentrated in a minute region.

Figure 5:
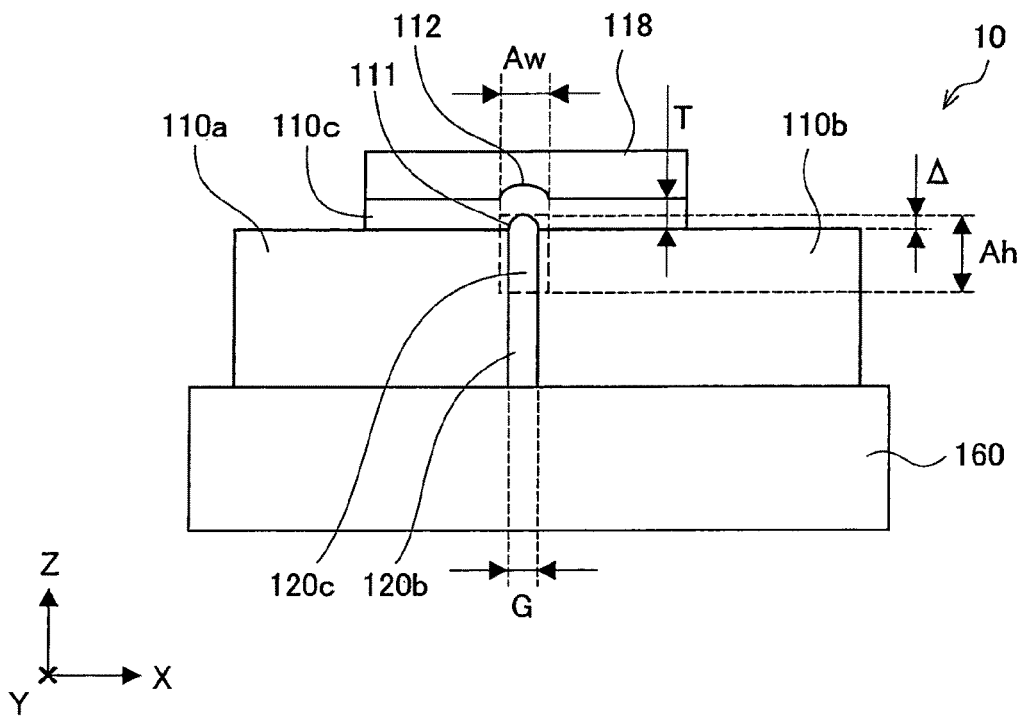
FIG. 5 is a cross sectional view which illustrates a modified example of the electromagnetic field generating element according to the present invention, and which is taken along the line CX2 shown in FIG. 2.

The following explains a modification example of the electric field generating element 10 according to the present embodiment with reference to FIG. 5. FIG. 5 is a cross sectional view taken along the line CX2 shown in FIG. 1.

In the present modification example, there is a bump Δ between (i) each of the contact surfaces of the conductors 110a and 110b with the conductor 110c, and (ii) the front bottom side 111 of the conductor 111c, the front bottom side 111 being positioned above the gap. The bump Δ needs to be thinner than the film thickness T of the conductor 110c so as not to disconnect the conductor 110c. Such a structure is similar to a shape of a magnetic coil of half turn, so that the flow of the current i through the conductor 110c causes convergence of the magnetic flux to the center of the gap (curvature center of the path via which the current i flows into the conductor 110c). This allows strength increase of the magnetic field B.

Further, the near field generated in the front bottom side 111 of the conductor 110c is reflected again by the semicircle-shaped front upper side 112 to the central portion of the front bottom side 111 of the conductor 110c. This allows strength increase of the near field in the vicinity of the center of the gap.

Figure 6:
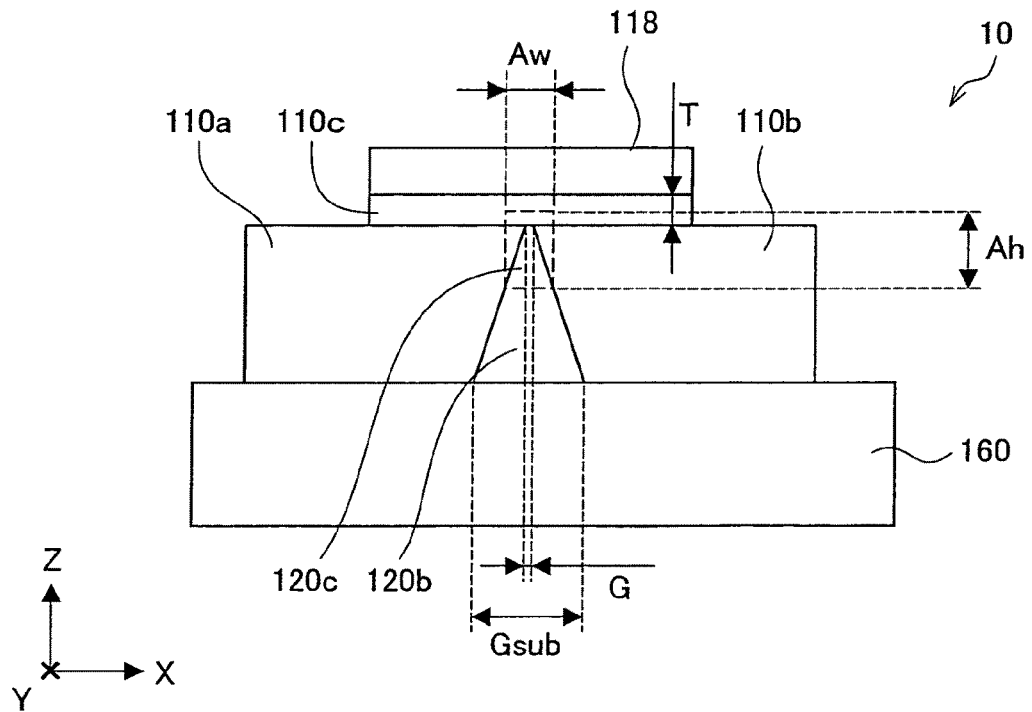
FIG. 6 is a cross sectional view which illustrates another modified example of the electromagnetic field generating element according to the present invention, and which is taken along the line CX2 shown in FIG. 2.

The following explains another modification example of the electromagnetic field generating element 10 according to the present embodiment with reference to FIG. 6. FIG. 6 is a cross sectional view taken along the line CX2 shown in FIG. 1.

In the present modification example, the respective boundary surfaces of the conductors 110a and 110b with the waveguide section 120b lean with respect to the line perpendicular to the surface of the substrate 160. Therefore, in the present embodiment, the gap width is G between the conductors 110a and 110b in the portion facing the conductor 110c, and the gap width is Gsub therebetween in the portion facing the substrate 160, and the gap width Gsub is larger than the gap width G. Such a small gap width G in the portion facing the conductor 110c allows strength increase of the magnetic field B generated in the vicinity of the front bottom side 111 of the conductor 110c, and such a large gap width Gsub in the portion facing the substrate 160 allows reduction of the leak current between the conductors 110a and 110b.

Embodiment 2

The following explains another embodiment of the electromagnetic generating element according to the present invention, with reference to FIG. 8 through FIG. 12. Note that materials having the equivalent functions as those shown in the drawings pertaining to the foregoing Embodiment 1 will be given the same reference symbols, and explanation thereof will be omitted here.

FIG. 8 is a diagram schematically illustrating an electromagnetic field generating element 20 of the present embodiment. In the electromagnetic field generating element 20 of the present embodiment, a semiconductor laser element 120 and a conductor clump 110 are provided on a substrate 160. The conductor clump 110 is made up of conductors 110d, 110e, and 110f, each of which is in the form of a plate. The conductors 110d, 110e, and 110f are provided such that their film surfaces are each substantially parallel to the resonance direction of the semiconductor laser 120. The conductor 110f serves as a confinement section of the conductor clump 110. Note that the conductor 110d serves as a supporting section of the conductor 110f, so that the conductor 110d of the present embodiment corresponds to the supporting section in claims.

Figure 10:
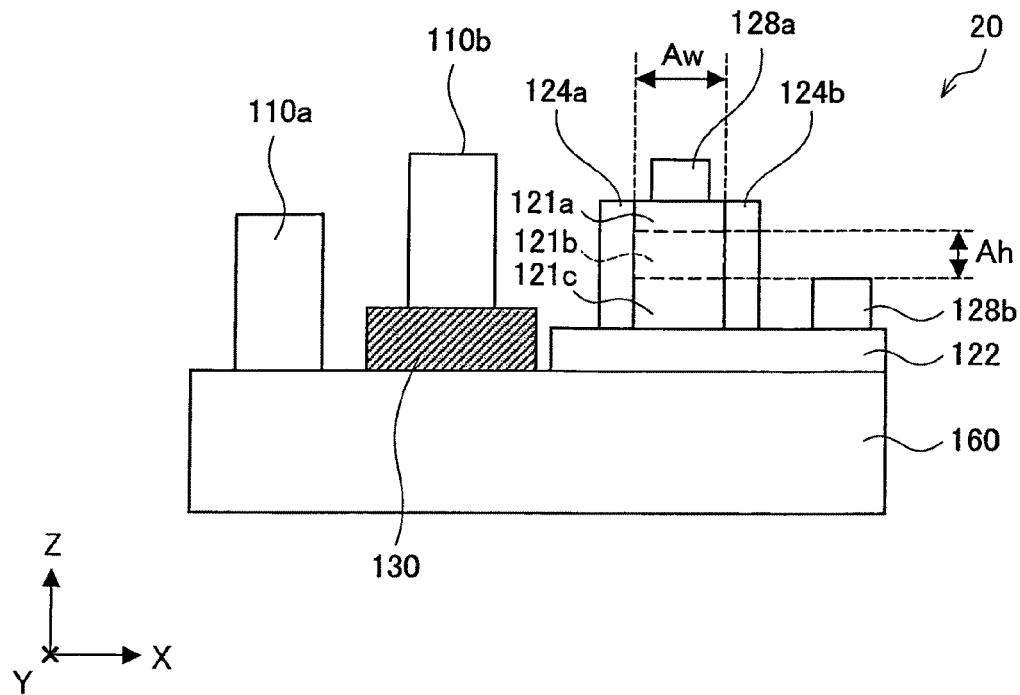
FIG. 10 is a cross sectional view taken along line CX3 shown in FIG. 9.

FIG. 10 is a cross sectional view which illustrates the electromagnetic field generating element 20 according to the present embodiment, and which is taken along line CX3 shown in FIG. 8. As shown in FIG. 10, a laser oscillation section 120a has a structure almost the same as the structure of the laser oscillation section 120a of the aforementioned electromagnetic field generating element 10 of Embodiment 1, but there is a structure difference therebetween as follows.

In the present embodiment, the laser oscillation section 120a has an active layer 121b having a rectangular cross sectional surface whose longitudinal sides are along the X axis direction. This makes it easier to obtain TE mode laser light whose electric field vector is in the X axis direction in FIG. 10. Note that, it is preferable that the active layer 121b have a width Aw of approximately 200 nm to 500 nm, and have a height Ah of approximately 100 nm to 300 nm.

Next, the following explains the conductors 110d, 110e, and 110f. Unlike Embodiment 1, in the present embodiment, the conductor clump 110 has a structure in which layers are provided on each other in the Z axis direction, and the conductors 110d and 110e are provided as different layers in the conductor clump 110. Between the conductors 110d and 110e, an insulating layer 130 is provided. This allows electric insulation between the conductors 110d and 110e.

See FIG. 8. Each of the conductors 110d and 110e constitutes one current path having no branch. Here, each of the conductors 110d and 110e is provided on the left side with respect to the semiconductor laser element 120. In other words, the conductor 110d has an end portion 110d-1 implanted in the left portion of the inside of the front end of the waveguide section 120b, and has the other end portion positioned on the left side with respect to the waveguide section 120b. Meanwhile, the conductor 110e has an end portion 110e-1 implanted in the left portion of the inside of the front end of the waveguide section 120b, and has the other end portion positioned on the left side with respect to the waveguide section 120b.

In the front end of the waveguide section 120b, the conductor 110f is provided between the end portion 110d-1 of the conductor 110d and the end portion 110e-1 of the conductor 110e. In other words, major parts of the conductors 110d and 110e are insulated by the insulating layer 130; however, the conductors 110d and 110e are electrically connected with each other via the conductor 110f in the front end of the waveguide section 120b.

Figure 11:
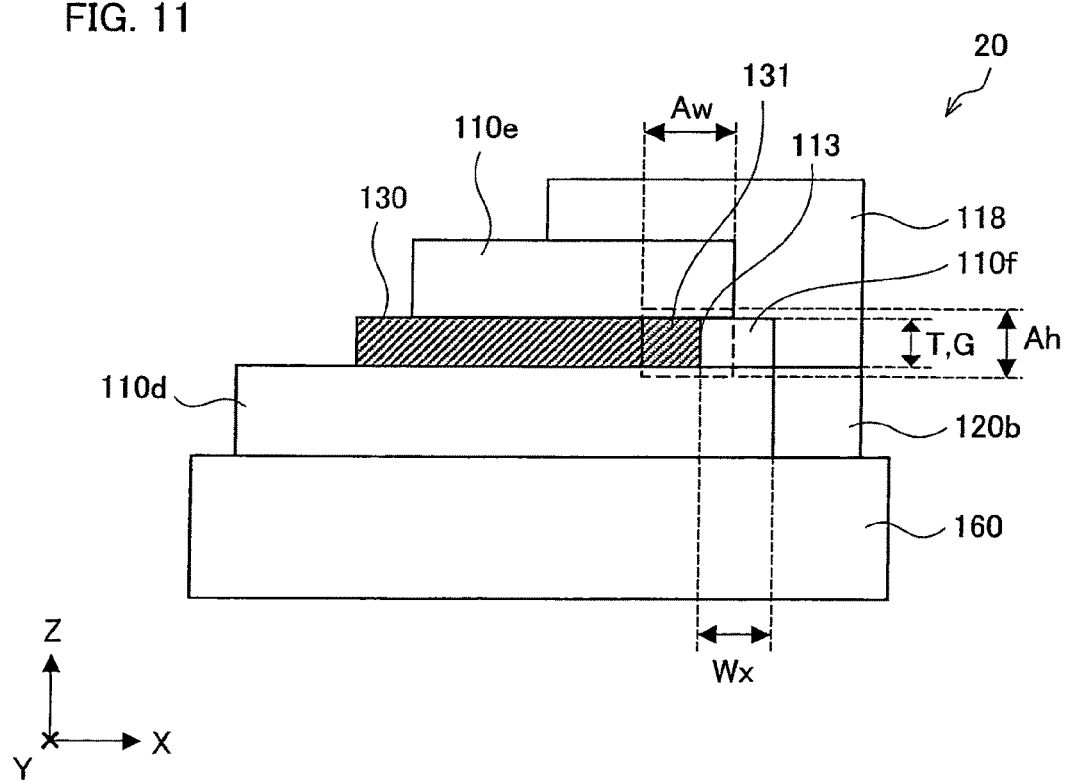
FIG. 11 is a cross sectional view taken along line CX4 shown in FIG. 9.

FIG. 11 is a cross sectional view taken along line CX4 shown in FIG. 8. As shown in FIG. 11, on the substrate 160, the conductor clump 110 is implanted in the front end of the waveguide portion 120b. Therefore, in the present embodiment, the conductor 110d, the insulating layer 130 and the conductor 110f, and the conductor 110e are provided on the substrate 160 in this order from the downward. This allows a current to flow from the conductor 110d to the conductor 110e via the conductor 110f. Note that the direction of the current flowing through the conductor clump 110 may be reverse to the direction described above.

As described above, the conductor 110f is provided between the conductors 110d and 110e, in the front end of the light propagation path portion 120c. In other words, the front end of the light propagation path 120c has a region having no insulating layer 130 but having the conductor 110f.

Further, an insulating layer 118 covers an exposed circumference portion (the right portion and the upper portion) of the conductor 110f. With this, the conductor 110f is insulated from the surroundings.

Note that, it is preferable that the front left side 113 of the conductor 110f be positioned distant away in the left-right (horizontal) direction by $\lambda/ng$ or less from the boundary of the light propagation path portion 120c. (The light propagation path portion 120c shown in FIG. 11 is a cross section, and corresponds to a rectangular region surrounded by broken lines that respectively indicate the height Ah and the width Aw.) Here, indicated by "$\lambda$" is a wavelength of the laser light, and indicated by "ng" is a refractive index of the material of which the waveguide section 120b is made.

In the present embodiment, the conductor 110f has a film thickness T (i.e., the width G of the gap between the conductors 110d and 110e) smaller than the respective thicknesses of the conductors 110d and 110e. Such a conductor 110f confines a current i flowing through the conductor clump 110, with the result that current density is increased. This allows the electromagnetic field generating element 20 to generate of a strong magnetic field B in the laser oscillation side of the laser oscillation section 120a.

Note that, it is preferable that the film thickness T of the conductor 110f be equal to or lower than the height Ah of the active layer 121b. With this, the gap whose gap width G is as large as the film thickness T of the conductor 110f is formed between the conductors 110d and 110e.

Further, in cases where the current i flowing through the conductor clump 110 is large, the confinement section (conductor 110f) is likely to be destroyed due to electric resistance. For this reason, it is preferable that, in cases where the current i is, e.g., approximately 100 mA, the conductor 110f have a cross sectional area S4, a contact surface S5, and a contact surface S6, each of which is larger than approximately 6400 nm$^2$. Defined as the cross sectional area S4 is an area of a cross section, perpendicular to the Z axis, of the conductor 110f; and the cross sectional area S4 corresponds to a region surrounded by broken lines respectively indicating Wx and Wy. Further, the contact surface S2 refers to the contact surface of the conductor 110f with the conductor 110d, and the contact surface S2 refers to the contact surface of the conductor 110f with the conductor 110e. This makes it possible to prevent the contact portions of the conductor clump 110 and the current confinement section (conductor 110f) thereof from emitting heat and being melted due to Joule heat generated when the current i flows.

Note that, it is preferable that the insulating layer 130 be made of a dielectric film whose refractive index is lower than that of the light propagation path portion 120c that corresponds to the central portion of the waveguide section 120b. However, it is preferable that an insulating layer waveguide portion 131 of the insulating layer 130 be made of a dielectric film having the same refractive index as that of the light propagation path portion 120. The insulating layer waveguide portion 131 is a portion which makes contact with the conductors 110*d*, 110*e*, and 110*f*, and which is positioned in the laser oscillation direction with respect to the conductor 110*f*.

This allows prevention of the laser light leakage out of the conductor clump 110, and allows containment of the laser light in the insulating layer waveguide portion 131 of the insulating layer 130. Examples of materials of the dielectric film includes: the IV group semiconductor, the III-V group compound semiconductor, the II-VI group compound semiconductor, the insulator oxide, the insulator nitride, the insulator organic material, and the like.

FIG. 12 is a cross sectional view which illustrates the electromagnetic field generating element 20 of the present embodiment, and which is taken along the line CY shown in FIG. 8. As shown in FIG. 12, the conductor 110*f* projects in such a manner that its front end surface (forefront surface in the Y axis negative direction) is positioned distant away in the Y axis positive direction by distance D from the respective front end surfaces (front end surfaces in the Y axis negative direction) of the conductor 110*d* and 110*e*. With this, the near field can be selectively generated in the vicinity of the front left side 113 of the conductor 110*c*, even in cases where TM mode laser light whose electric field vector is in the Z axis direction is mixed with the laser light emitted from the laser oscillation section. The laser light emitted therefrom is basically TE mode laser light whose electric field vector is in the X axis direction.

For attainment of tighter combination between (i) each of the conductors 110*d*, 110*e*, and 110*f*, and (ii) the substrate 160 or the waveguide section 120*b* of the semiconductor laser element 120, it is preferable that a combining layer made of Zn, Ti, Cr, Al or the like be provided therebetween. This makes it possible to prevent each of the conductors 110*d*, 110*e*, and 110*f* from being detached from the substrate 160 or the waveguide section 120*b* of the semiconductor laser element 120, and accordingly allows improvement of element strength of the electromagnetic field generating element 20.

Figure 14:
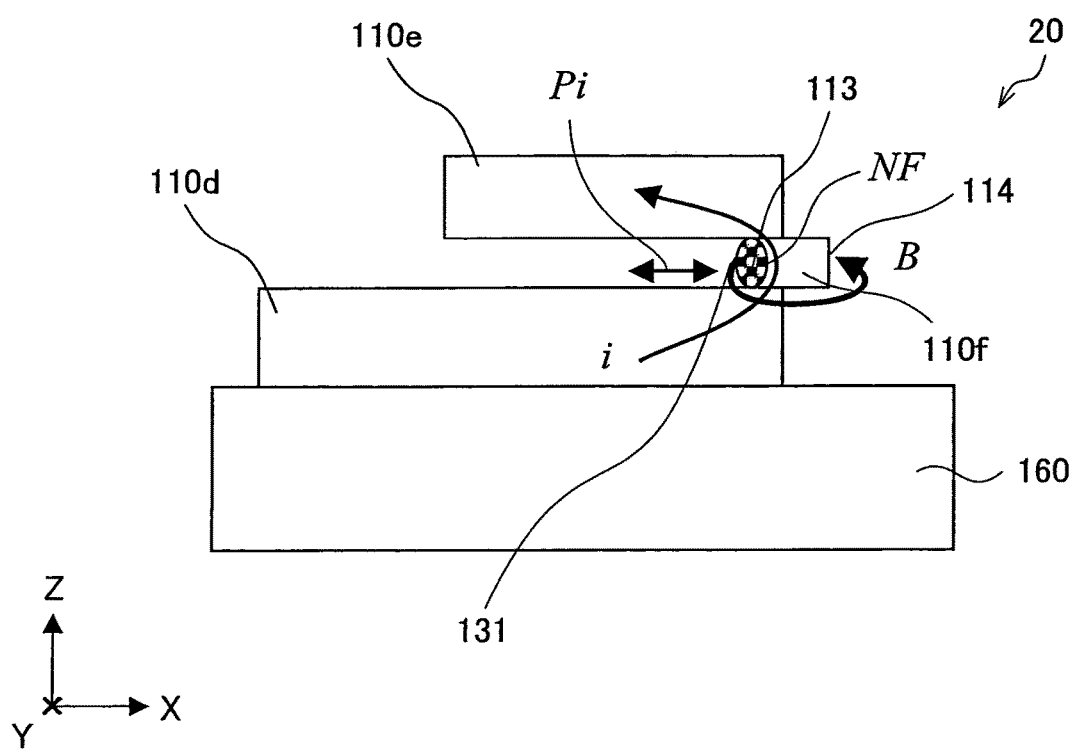
FIG. 14 is a schematic cross sectional view taken along line CX4 shown in FIG. 9.

Explained next is an operation of the electromagnetic field generating element 20 according to the present embodiment. FIG. 14 is a cross sectional view illustrating the electromagnetic field generating element 20 shown in FIG. 9, when viewed from the Y axis positive direction. In cases where the current i is supplied from the conductor 110*d* to the conductor 110*e* via the conductor 110*f*, the current flows in the Z axis positive direction into the conductor 110*f*. Accordingly, according to the corkscrew rule, the magnetic field is generated in the Y axis negative direction (out of the plane of FIG. 14) on the periphery of the front left side 113 of the conductor 110*f*, whereas the magnetic field is generated in the Y axis positive direction (into the plane of FIG. 14) on the periphery of the front right side 114 of the conductor 110*f*.

Here, the electric field B generated on the periphery of the front left side 113 of the conductor 110*f* has a strength H, which is expressed by the following formula:

$H = I/L$, where "I" indicates the supplied current, and "L" $(=2 \times (Wx+Wy))$ indicates the length of a path surrounding the cross sectional area S4 $(=Wx \times Wy)$ of the conductor 110*f*.

So, for example, when "Wx" is 200 nm and "Wy" is 100 nm and "I" is 100 mA, the strength H of the magnetic field B generated along the path surrounding the cross sectional surface S4 of the conductor 110*f* is approximately 167 kA/m (=2100 Oe).

As such, the current flowing through the conductor clump 110, in which the confinement section (conductor 110*f*) is provided in a desired position, causes generation of the strong magnetic field B on the periphery of the front left side 113 of the confinement section (conductor 110*f*) in the current path.

When the semiconductor laser element 120 oscillates laser light Pi, laser light Pi in the TE mode (electric field vector is in the X axis direction) is propagated as a surface plasmon Dsp through the interface between the conductor 110*f* and the insulator layer waveguide portion 131. This allows generation of the near field NF in the vicinity of the front left side 113.

Here, in the electromagnetic field generating element 20 of the present embodiment, the conductor 110*f* serving as the confinement structure of the conductor clump 110, and the light propagation path portion 120*c* of the semiconductor laser element 120 are positioned in one straight line on the same surface of the substrate 160. Further, the front left side 113 of the conductor 110*f* is positioned on the periphery of the boundary with the light propagation path portion 120*c*. Such a structure makes it possible that: the direction of the laser light Pi to be propagated through the light propagation path portion 120*c* is never changed, and the laser light Pi is directly irradiated to the conductor 110*f* constituting the confinement section of the conductor clump 110. This allows restraint of the laser strength attenuation due to the direction change of the laser light Pi. Accordingly, the near field can be generated with high efficiency in the front left side 113 of the conductor 110*f*.

As described above, the electromagnetic field generating element 20 according to the present embodiment makes it possible to generate both the magnetic field B and the near field NF in the front left side 113 of the conductor 110*f*. Therefore, unlike the conventional techniques, the electromagnetic field generating element 20 does not need to use the yoke extension section so as to generate the magnetic field in a desired location, so that the electromagnetic field generating element 20 allows restraint of the magnetic field attenuation or restraint of the delay as compared with the case of using the yoke extension section. For this reason, the electromagnetic field generating element 20 is suitable for the high frequency magnetic recording/reproduction.

As verified by the present embodiment, the confinement section of the conductor clump 110 can be arranged such that a current flows in various directions.

Note that, as is the case with the conductors 110*a* and 110*b* each described in Embodiment 1, the formation of the conductor 110*d* of the present embodiment is carried out by depositing the conductor 110*d* in the Z axis positive direction on the substrate 160, in accordance with the publicly know thin film formation method such as the deposition method. This makes it possible to adjust the front left side 113 of the conductor 110*f* to be positioned at an optimal height, the near field being generated in the front left side 113.

Embodiment 3

The following explains one embodiment of an information recording/reproducing head according to the present invention, with reference to FIG. 15 through FIG. 19. Note that materials having the equivalent functions as those shown in the drawings pertaining to the foregoing embodiments will be given the same reference symbols, and explanation thereof will be omitted here.

Explained in the present embodiment is an information recording/reproducing head obtained by providing a light detector 163 in the electromagnetic field generating element 10 described in Embodiment 1. The light detector 163 serves as an electromagnetic field detector.

Figure 16:
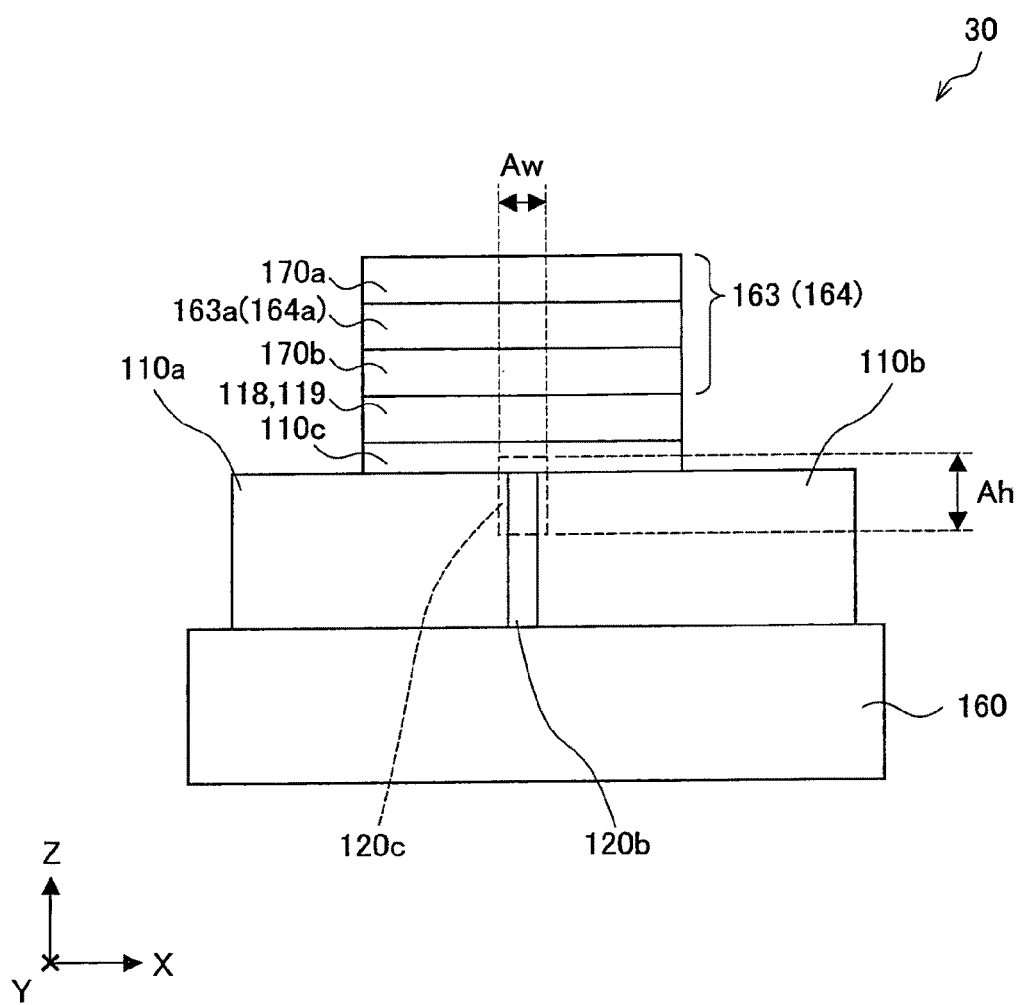
FIG. 16 is a cross sectional view taken along the XZ flat surface of the information recording/reproducing head according to the embodiment of the present invention.

FIG. 16 is a cross sectional view schematically illustrating such an information recording/reproducing head 30 of the present embodiment.

In the information recording/reproducing head 30 of the present embodiment, a soft magnetic layer 119 is provided on the insulating layer 118 of the electromagnetic field generating element 10. Further, the light detector 163 is provided on the soft magnetic layer 119.

The light detector 163 is made up of the following three layers: two electrodes 170a and 170b, and a photodiode layer 163a. The electrodes 170a and 170b are so provided respectively on the upper surface and the lower surface of the photodiode layer 163a as to sandwich the photodiode layer 163a.

Note that it is preferable to use, as a photodiode used for the photodiode layer 163a, a pn junction diode, a pin photodiode, a Schottky photodiode, or an avalanche photodiode.

Further, it is preferable that the electrode 170b be made of a transparent material such as ITO (indium tin oxide) for improvement of light collection efficiency.

In the present embodiment, the soft magnetic layer 119 is provided between the insulating layer 118 and the light detector 163. With this, magnetic flux is converged to the vicinity of the front bottom side 111 of the conductor 110c, when generating the magnetic field B on the periphery of the conductor 110c. Accordingly, magnetic flux density is increased in the vicinity of the front bottom side 111 of the conductor 110c. This allows acquirement of a strong magnetic field B.

Note that, it is preferable that the soft magnetic layer 119 be a soft magnetic insulating layer made of ferrite, garnet, or the like. This allows prevention of eddy current occurring due to a change of the magnetic field B in the soft magnetic layer 119. Accordingly, electric field loss in the high frequency region can be reduced, with the result that the strong magnetic field B can be obtained in the vicinity of the front bottom side 111 of the conductor 110c.

The conductor 110c and the soft magnetic layer 119 are insulated with each other by the insulating layer 118. This makes it possible to prevent the current i from leaking from the conductor 110c to the soft magnetic layer 119, and accordingly allows prevention of reduction of the magnetic field B generated in the vicinity of the front bottom side 111 of the conductor 110c. In this case, it is preferable that the insulating layer 118 have a film thickness of 100 nm or thinner.

The following explains how the information recording/reproducing head 30 of the present embodiment carries out (i) an operation of reading out information stored in an information recording medium or (ii) an operation of writing information thereto.

Figure 15:
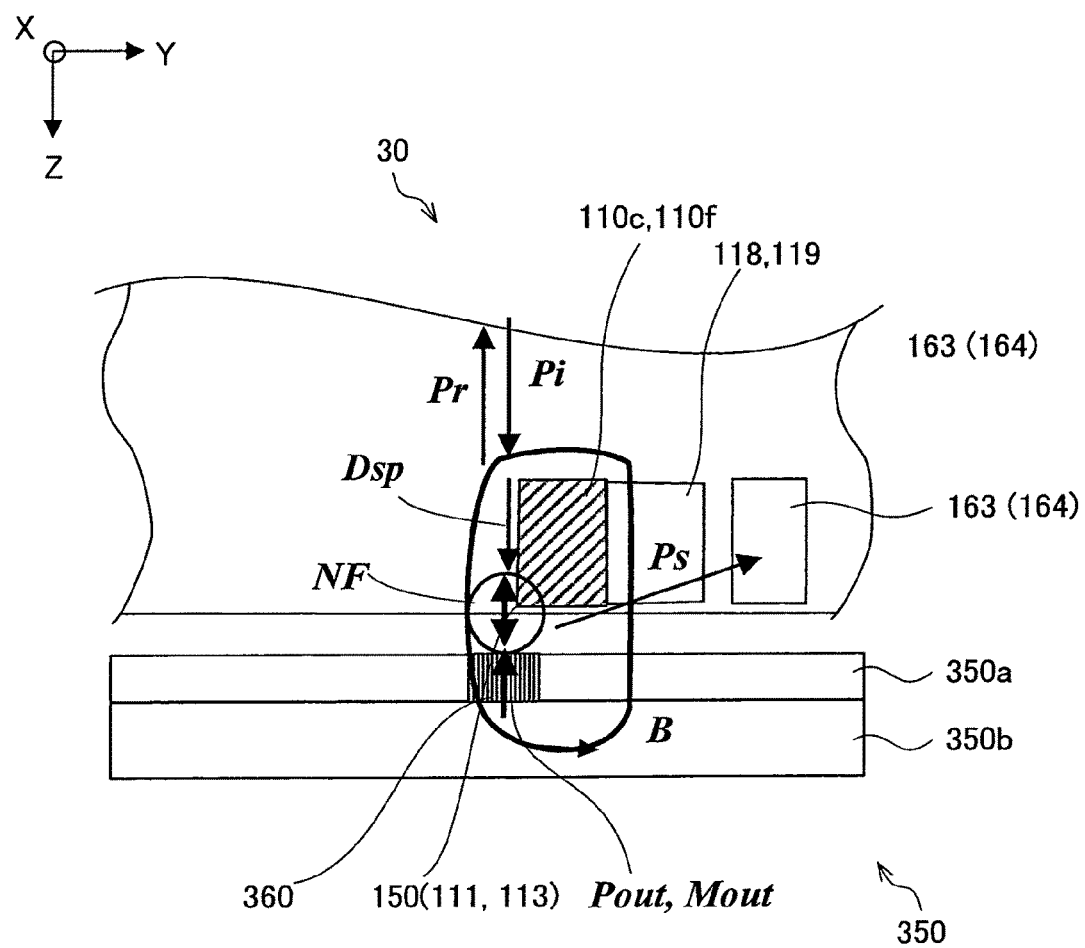
FIG. 15 is a diagram schematically illustrating (i) an information recording/reproducing head according to one embodiment of the present invention, and (ii) an information recording medium.

FIG. 15 is a cross sectional view which illustrates (i) the information recording/reproducing head 30 of the present embodiment and (ii) the information recording medium 350, and which is taken along line perpendicular to the recording surface of the information recording medium 350. The wording "recording surface" refers to a surface onto which information is recorded. Note that the information recording medium 350 is a general magnetic recording medium for use in a hard disk drive or the like. Examples of such an information recording medium 350 include: (i) a CoCrPt system magnetic recording medium, (ii) a rare earth transition magnetic metal recording medium, (iii) an FePt system magnetic recording medium, and (iv) a magnetic recording medium made of an antiferromagnetic material such as a RhFe system. As shown in FIG. 15, the information recording medium 350 has the recording surface 350a, and a substrate 350b.

Figure 17:
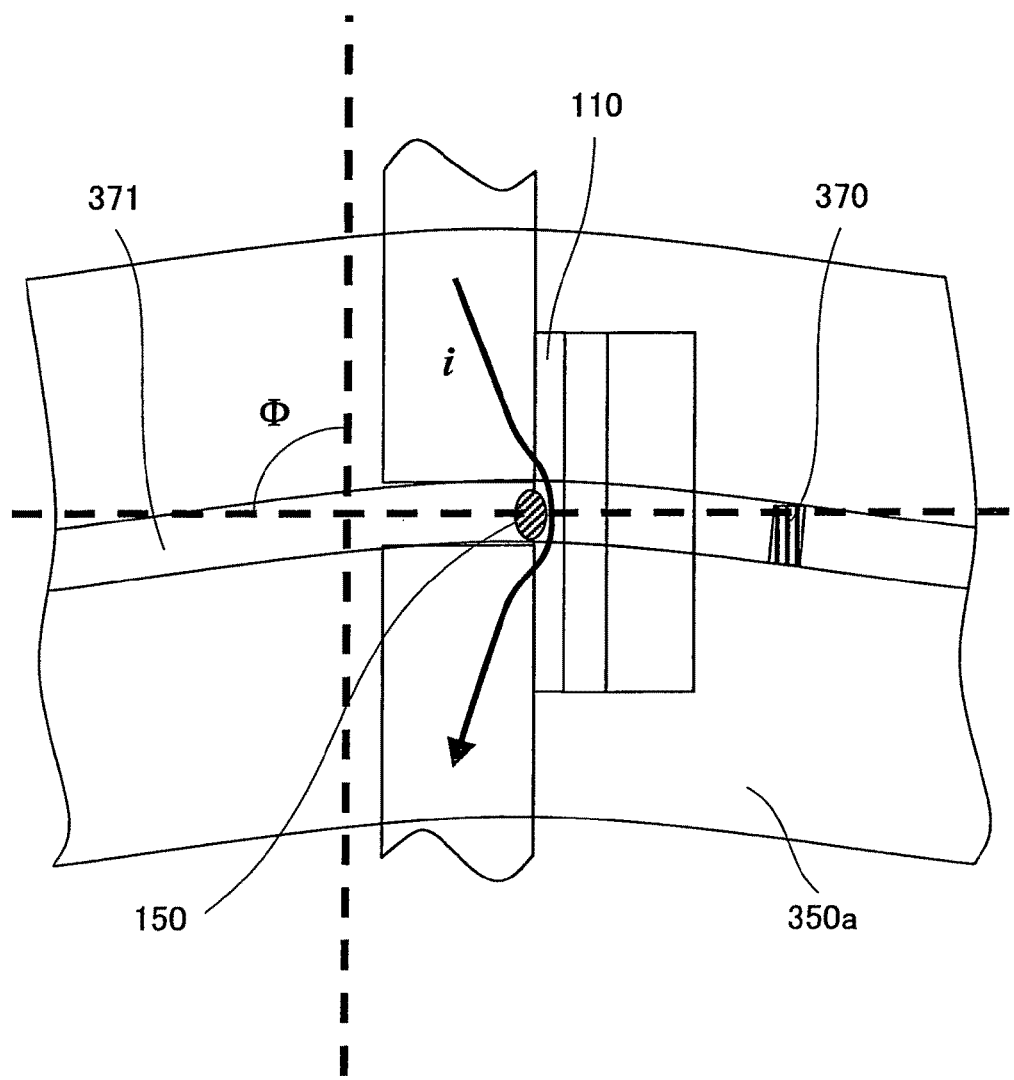
FIG. 17 is a plan view illustrating the information recording/reproducing head according to the embodiment of the present invention and the information recording medium, when viewed from the information recording/reproducing head.

FIG. 17 is a plan view illustrating the information recording/reproducing head 30 and the information recording medium 350 when viewed from the information recording/reproducing head 30. When reading out information stored in a recording mark 370 on a recording track 371 of the information recording medium 350, the information recording/reproducing head 30 irradiates the laser light Pi to the conductor 110c. The laser light Pi has a reproduction level strength, and is so scattered by the front bottom side 111 (hereinafter, also referred to as "electromagnetic generation region 150") as to be scattering light Ps. The scattering light Ps is detected by the light detector 163.

Here, in cases where there is external electric polarization Pout in the vicinity of the electromagnetic field generation region 150, the near field NF irradiated from the electromagnetic field generation region 150 and the external electric polarization Pout work together (interplay; interact) to cause a change in the strength of the scattering light Ps coming from the electromagnetic field generation region 150. The strength change of the scattering light Ps is detected by the light detector 163. This allows detection of the presence of the external electric polarization Pout.

As shown in FIG. 15, the recording surface 350a of the information recording medium 350 is adjacent to the electromagnetic generating region 150 of the information recording/reproducing head 30. Therefore, in accordance with the aforementioned method, the information recording/reproducing head 30 can read out the information stored as the external electric polarization Pout in the recording mark 370 of the information recording medium 350.

Note that the information readout by the information recording/reproducing head 30 may be carried out such that the light detector 163 detects (i) a polarization direction change of the scattering light $P^s$ coming from the electromagnetic generating region 150, and (ii) the strength change thereof.

Specifically, in cases where the external electric polarization Pout and an external magnetic polarization Mout exist in the recording mark 370 of the information recording medium 350, the near field NF irradiated from the electromagnetic field generation region 150 works together with the external electric polarization Pout and the external magnetic polarization Mout so as to cause (i) the polarization direction change of the scattering light Ps coming from the electromagnetic generating region 150, and (ii) the strength change thereof.

The detection of (i) the polarization direction change of the scattering light Ps and (ii) the strength change thereof allows readout of the information stored as the external electric polarization Pout and the external magnetic polarization Mout in the recording mark 370 of the information recording medium 350. The following explains a method for detecting the polarization direction change of the scattering light Ps.

In the event of detecting the polarization direction of the scattering light Ps, a minute current i' is supplied to the conductor clump 110 such that a magnetization direction of the soft magnetic layer 119 of the information recording/reproducing head 30 is fixed. This causes the soft magnetic layer 119 to have different absorption coefficients with respect to left circular polarization light and right circular polarization light.

Such a soft magnetic layer 119 absorbs the incoming scattering light Ps at a rate according to the polarization direction. The light detector 163 detects the strength of such scattering light Ps passing through the soft magnetic layer 119. This allows detection of the polarization direction of the scattering light Ps.

For the detection of the polarization direction change, it is preferable to provide, between the soft magnetic layer 119 and the light detector 163, a material having a large magnetic circular dichroism (a material having very different absorption coefficients with respect to the left circular polarization light and the right circular polarization light). This allows improvement in efficiency of detecting the polarization direction change of the scattering light Ps.

Further, instead of the aforementioned method, the following method may be used to detect the magnetic polarization Mout existing in the recording mark 370 of the information recording medium 350.

When the conductor 110c of the conductor clump 110 meets the recording mark 370 of the information recording medium 350, i.e., meets the magnetic polarization Mout, an induced current is generated in the conductor 110c of the information recording/reproducing head 30. Detection of a change in the induced current allows acquirement of the magnetic information stored in the recording mark 370.

Note that, it is preferable that the light detector 163 of the information recording/reproducing head 30 can detect higher harmonic wave light. Such a light detector 163 capable of detecting the higher harmonic wave light allows removal of a noise signal, which is generated by the light leaking from the semiconductor laser light. Accordingly, the information stored in the information recording medium 350 can be detected with a high S/N (signal-to-noise) ratio.

Explained next is how the information recording/reproducing head 30 operates to write information in the information recording medium 350.

As shown in FIG. 15, the laser light Pi having recording level strength stronger than the reproduction level strength is irradiated to the conductor 110c of the conductor clump 110 of the information recording/reproducing head 30. This causes generation of the near field NF in the vicinity of the front bottom side 111 (electromagnetic field generation region 150) of the conductor 110c.

The near field NF thus generated is irradiated to the recording surface 350a of the information recording medium 350. This causes temperature rise in a region (hereinafter, referred to as "temperature rise region") of the recording surface 350a. Such a temperature rise region has a recording temperature region 360 whose temperature is high enough to allow for the recording.

The temperature of the recording temperature region 360 is higher than those of the other regions of the recording surface 350a as such, so that magnetism inversion can be easily caused therein. Therefore, the information can be written therein by way of such magnetism inversion, which is induced only in the recording temperature region 360 of the information recording medium 350 by generating a magnetic field B having an appropriate magnitude. The generating of the magnetic field is carried out by supplying a current to the conductor 110c of the information recording/reproducing head 30.

In other words, the information recording/reproducing head 30 can carry out the information writing with respect to the region in which the magnetic field B and the recording temperature region 360 generated by the near field NF overlap with each other. As such, the information recording/reproducing head 30 of the present embodiment allows realization of the magnetic recording carried out, with the assistance of the near field NF which exceeds the diffraction limit of light, with respect to such a minute region.

In this case, the information recording/reproducing head 30 of the present embodiment can generate a strong near field NF, so that the information recording/reproducing head 30 can carry out recording or reproduction with respect to an information recording medium 350 having a high coercivity.

Further, no extension using a yoke is done in the information recording/reproducing head 30 of the present embodiment unlike in the conventional techniques, so that the magnetic field attenuation and the magnetic field delay in the yoke extension section never occurs. For this reason, the information recording/reproducing head 30 is suitable for the high frequency magnetic recording/reproduction.

As described above, the information readout by the information recording/reproducing head 30 of the present embodiment is carried out such that the light detector 163 detects the interplay (interaction) between (i) the generated near field NF and (ii) each of the electric polarization Pout and the magnetic polarization Mout in the recording mark 370 of the information recording medium 350. On the other hand, the information writing is carried out such that the electric field B is applied to the region, which is a part of the information recording medium 350 and which has become recordable by the temperature rise caused by the near field NF.

Note that the information recording/reproducing head 30 of the present embodiment can be so rotated as to be at an arbitrary angle with respect to the radial direction of the information recording medium 350.

In the embodiment described above, the upper surface of the substrate 160 of the information recording/reproducing head 30 is substantially parallel to the radial direction of the information recording medium 350. In this case, as shown in FIG. 17, the electromagnetic generation region 150 has an elliptic shape whose width in the rotation direction of the information recording medium 350 is short. This allows information recording and information reproduction even in cases where an interval is short between consecutive data recording positions.

Here, see a case where the information recording/reproducing head 30 is rotated by an angle Φ with respect to an axis that is perpendicular to the recording surface 350a of the information recording medium 350, and that crosses with the center of the electromagnetic field generation region 150. In this case, the electromagnetic field generation region 150 is rotated together with the information recording/reproducing head 30. As the angle Φ is closer to 90°, the elliptic shape of the electromagnetic generation region 150 is changed to an elliptic shape whose width in the radial direction of the information recording medium 350 is short. This allows information recording and information reproduction even in cases where an interval between adjacent tracks is narrow.

As such, it is possible to arbitrarily adjust the angle of the information recording/reproducing head 30 with respect to the radial direction of the information recording medium 350. Such an adjustment of the angle Φ allows improvement of the S/N ratio during the reproduction.

Embodiment 4

Figure 18:
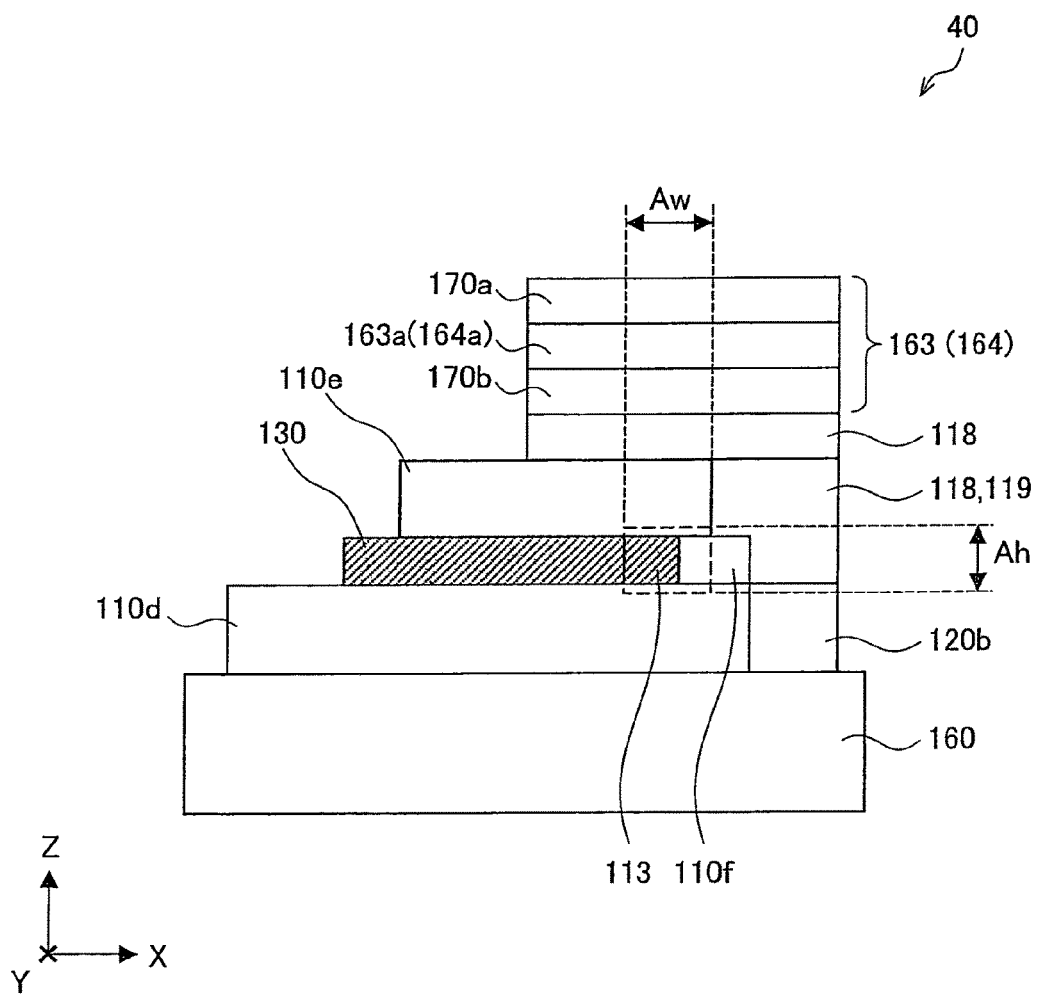
FIG. 18 is a cross sectional view taken along the XZ flat surface of the information recording/reproducing head according to another embodiment of the present invention.
Figure 19:
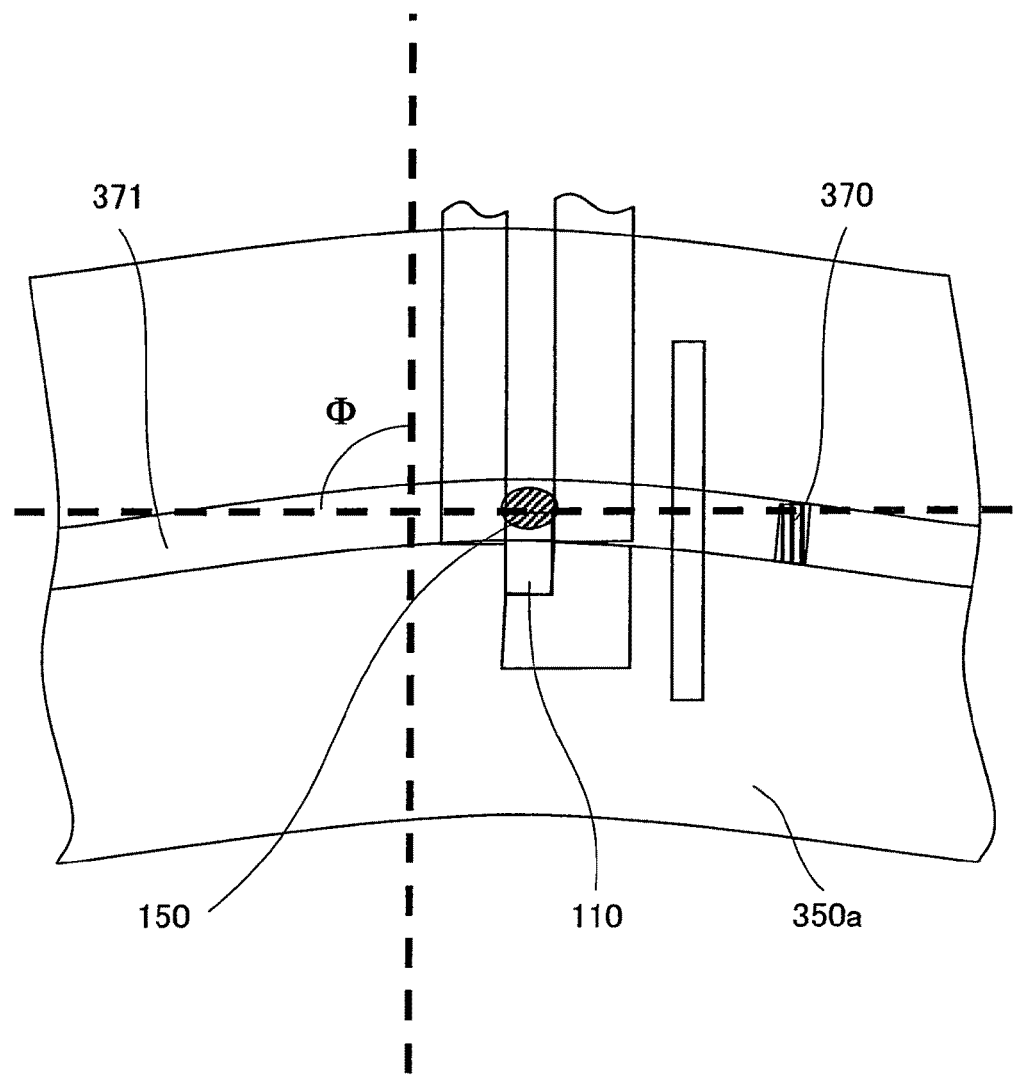
FIG. 19 is a plan view illustrating (i) an information recording/reproducing head according to another embodiment of the present invention and (ii) an information recording medium, when viewed from the information recording/reproducing head.

The following explains another embodiment of the information recording/reproducing head according to the present invention with reference to FIG. 18 and FIG. 19.

An information recording/reproducing head 40 of the present embodiment is obtained by providing the light detector 163 or a magnetic field detector 164 in the electromagnetic field generating element 20 described in Embodiment 2. Note that materials having the equivalent functions as those shown in the drawings pertaining to the foregoing embodiments will be given the same reference symbols, and explanation thereof will be omitted here. Note also that the way of generating the near field NF and the electric field B, the method for detecting the electromagnetic field, and the recording operation and the reproducing operation of the head are the same as those of the foregoing embodiments. For this reason, explanation thereof will be omitted here.

FIG. 18 is a cross sectional view illustrating the information recording/reproducing head 40 of the present embodiment, when viewed from the Y axis positive direction. As shown in FIG. 18, the insulating layer 118 is so provided as to cover the upper surface and the right side surface of the conductor 110f of the electromagnetic field generating element 20. In the vicinity of the insulating layer 118, a soft magnetic layer 119 is provided.

When the current i flows into the conductor 110f, the magnetic field B is generated. On this occasion, the soft magnetic layer 119 causes convergence of the magnetic flux to the vicinity of the front left side 113 of the conductor 110f. Accordingly, magnetic flux density is increased in the vicinity of the front left side 113 of the conductor 110f. This allows generation of a strong magnetic field B.

Provided on (i) the conductor 110e of the electromagnetic field generating element 20 and (ii) the soft magnetic layer 119 are the insulating layer 118 and the light detector 163 or the magnetic field detector 164. As described above, the light detector 163 or the magnetic field detector 164 includes the electrode 170b, the photodiode layer 163a, and the electrode 170a, all of which are provided in this order from the downward.

Here, the insulating layer 118 is sandwiched between (i) the electrode 170b of the light detector 163 or the magnetic field detector 164 and (ii) each of the conductor 110e and the soft magnetic layer 119, so as to insulate the electrode 170b and the conductor 110e with each other. This makes it possible to prevent the current i from leaking from the conductor 110e to the electrode 170b, and accordingly allows prevention of the reduction of the magnetic field B generated in the vicinity of the front left side 113 of the conductor 110c. Note that, it is preferable that the insulating layer 118 have a film thickness of 100 nm or less.

FIG. 19 is a plan view illustrating the information recording/reproducing head 40 of the present embodiment and the information recording medium 350, when viewed from the information recording/reproducing head 40.

As shown in FIG. 19, the electromagnetic generation region 150 of the information recording/reproducing head 40 has an elliptic shape whose width in the radial direction (track direction) of the information recording medium 350 is short. This allows information recording onto a narrow track.

Note that, as is the case with Embodiment 3, the information recording/reproducing head 40 can be rotated with respect to the axis perpendicular to the recording surface 350a of the information recording medium 350. Such appropriate adjustment can be carried out for the acquirement of the optimal S/N ratio during the reproduction.

Embodiment 5

The following explains another embodiment of the information recording/reproducing head according to the present invention.

An information recording/reproducing head 50 of the present embodiment has the same structure as the structure of the information recording/reproducing head 30 of Embodiment 3, except that the information recording/reproducing head 50 includes a laser threshold current detector instead of the electromagnetic field detector. For ease of explanation, materials having the equivalent functions as those shown in the foregoing embodiments will be omitted here.

Note that the laser threshold current detector does not need to be provided in the information recording/reproducing head 50, and may be provided outside the information recording/reproducing head 50 with the conductive path between the information recording/reproducing head 50 and the laser threshold current detector.

The information recording/reproducing head 50 of the present embodiment detects the external electric polarization Pout and the external magnetic polarization Mout by measuring a change of a threshold current for the laser oscillation of the semiconductor laser element 120. The measuring is carried out when reading out information from the information recording medium 350. Details thereof will be explained below.

Firstly, the semiconductor laser element 120 of the information recording/reproducing head 50 irradiates the laser light Pi. This causes generation of the near field NF in the electromagnetic field generation region 150. The near field NF thus generated works together (interplays) with the external electric polarization Pout and the external magnetic polarization Mout each existing in the recording mark 370 of the information recording medium 350.

The interplay causes a polarization direction change and a strength change of reflected light Pr, which is the light Pi irradiated to and reflected by the recording surface 350a of the information recording medium 350.

The reflected light Pr having come back to the semiconductor laser element 120 affects (acts on) the inside of the active layer 121b of the semiconductor laser element 120, with the result that laser oscillation state is changed. Specifically speaking, such a laser oscillation state can be detected as the threshold current for the laser oscillation. The laser threshold current detector detects the threshold current. This allows the information recording/reproducing head 50 of the present embodiment to read out information from the information recording medium.

Embodiment 6

The following explains another embodiment of the information recording/reproducing head according to the present invention. An information recording/reproducing head 60 of the present embodiment has the same structure as (i) the structure of the information recording/reproducing head 30 of Embodiment 3 or (ii) the structure of the information recording/reproducing head 40 of Embodiment 4, except that the information recording/reproducing head 60 includes the magnetic field detector 164 as the electromagnetic field detector. For ease of explanation, materials having the equivalent functions as those shown in the foregoing embodiments will be omitted here.

As shown in FIG. 16, the magnetic field detector 164 is provided on the soft magnetic layer 119 of the information recording/reproducing head 60 of the present embodiment. The magnetic detector 164 is made up of three layers: the electrodes 170a and 170b, and a magnetic resistor element 164a. The electrodes 170a and 170b are respectively provided on the upper surface and the lower surface of the magnetic resistor element 164a so as to sandwich the magnetic resistor element 164a.

In cases where the magnetic field detector 164 is provided as the electromagnetic field detector, it is preferable that each of the electrodes 170a and 170b be made from a soft magnetic layer so as to serve as a magnetic shield.

Information readout by the information recording/reproducing head 60 of the present embodiment is carried out in the following manner. That is, the magnetic field detector 164, provided in the information recording/reproducing head 60, detects the external magnetic polarization Mout existing in the recording surface 350a of the information recording medium 350.

Then, the magnetic resistor element 164a converts (i) the magnetic field generated by the external magnetic polarization Mout, to (ii) an electric signal. In this way, the information recording/reproducing head 60 carries out the information readout.

Embodiment 7

Figure 20:
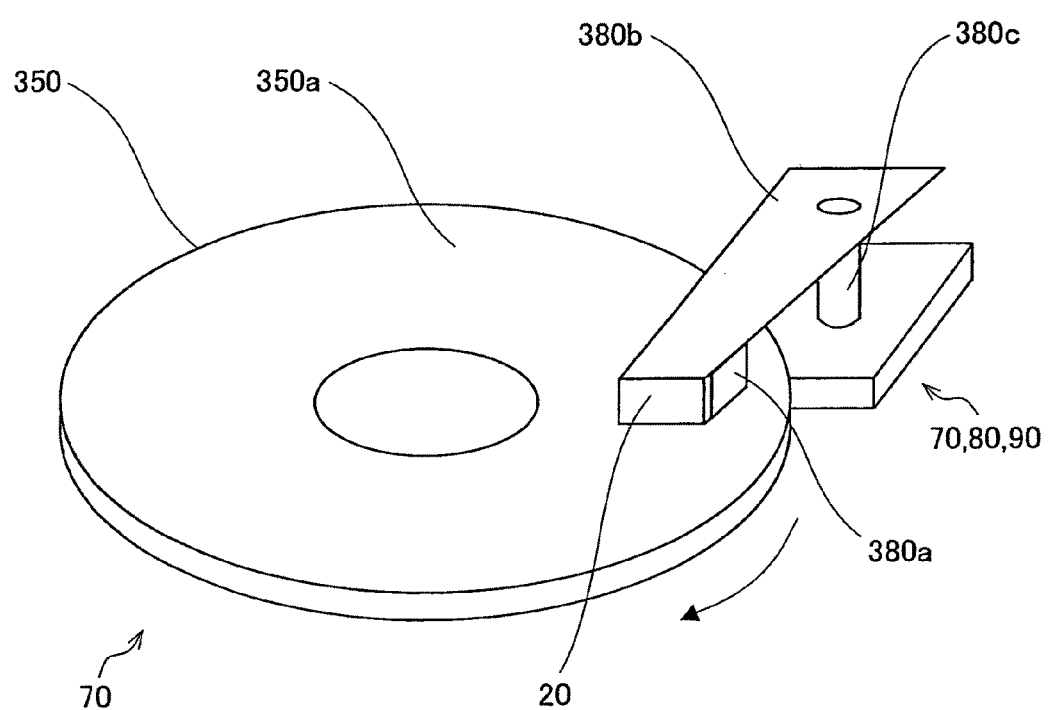
FIG. 20 is a diagram schematically illustrating a structure of an information recording/reproducing apparatus according to one embodiment of the present invention.
Figure 21:
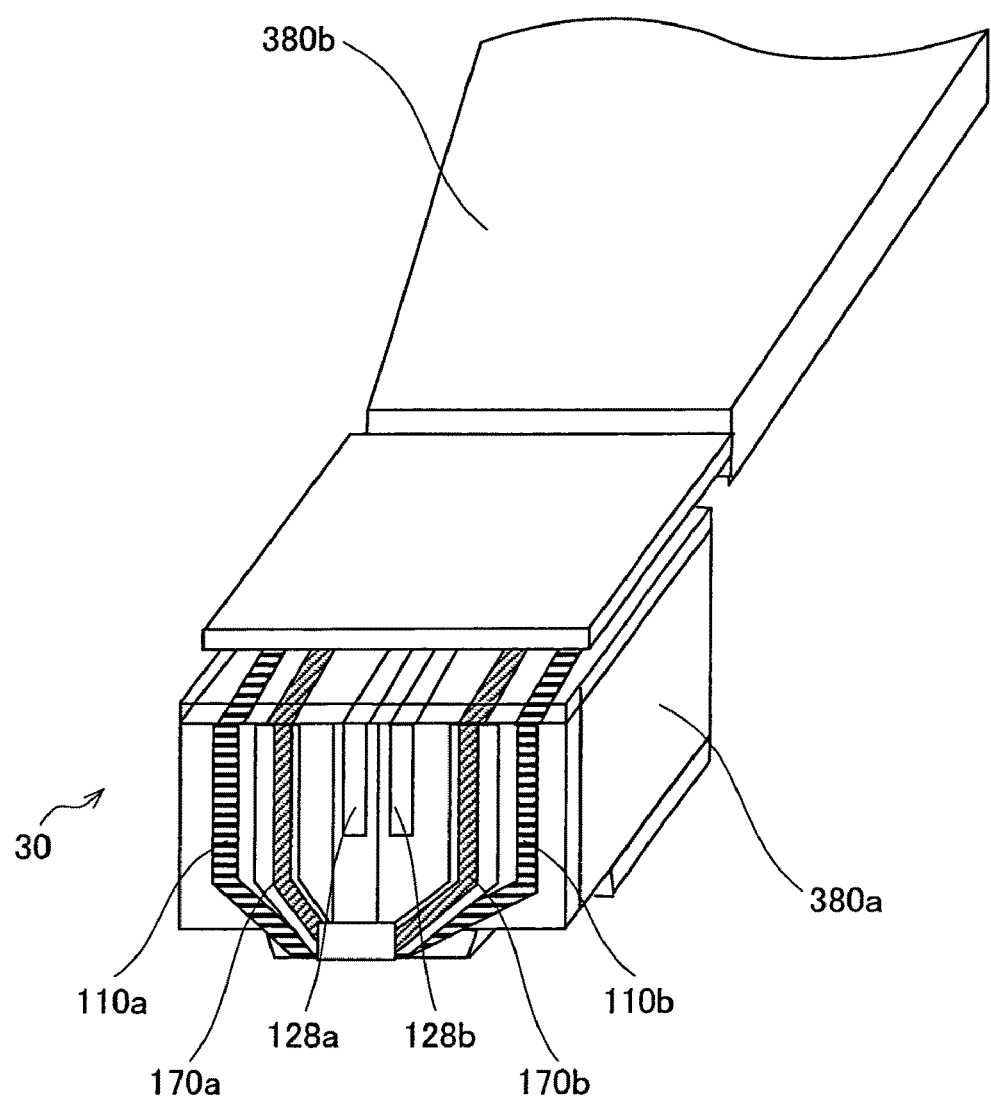
FIG. 21 is an enlarged view illustrating that the information recording head and a slider are installed in an arm, in the information recording/reproducing apparatus according to the embodiment of the present invention.
Figure 22:
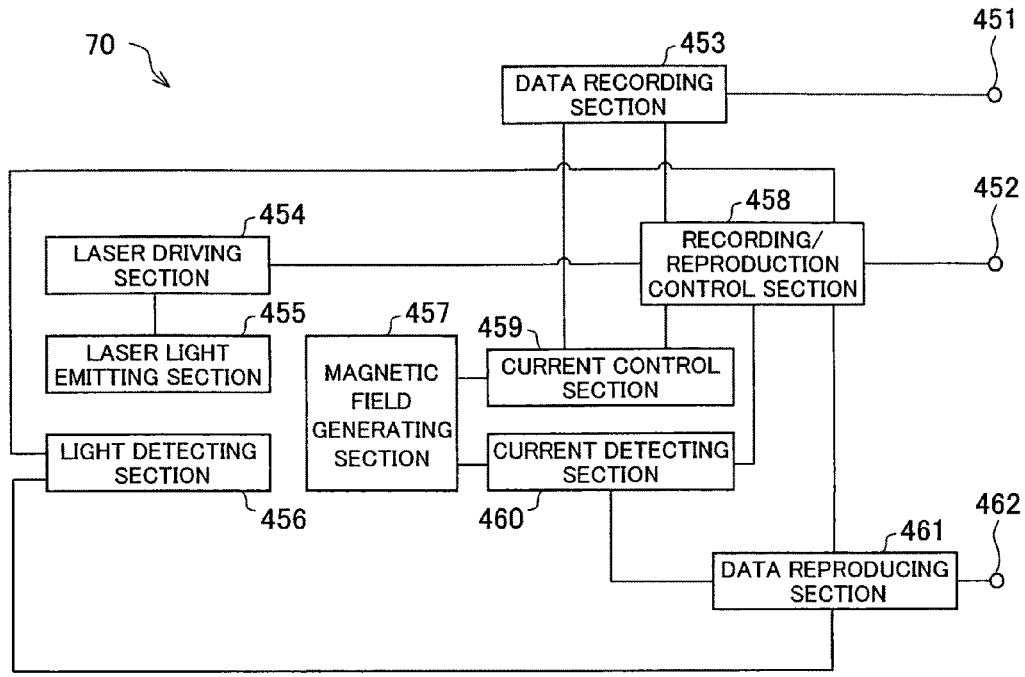
FIG. 22 is a block diagram schematically illustrating a structure of a recording/reproducing system of the information recording/reproducing apparatus according to the embodiment of the present invention.

The following explains one embodiment of the information recording/reproducing apparatus according to the present invention, with reference to FIG. 20 through FIG. 22. Note that materials having the equivalent functions as those shown in the drawings pertaining to the foregoing embodiments will be given the same reference symbols, and explanation thereof will be omitted here.

FIG. 20 is an oblique perspective view illustrating a structure of a major part of an information recording/reproducing apparatus 70 of the present embodiment.

The information recording/reproducing apparatus 70 of the present embodiment includes (i) the information recording/reproducing head 30 of Embodiment 3, or (ii) the information recording/reproducing head 40 of Embodiment 4. The following explains the structure including the information recording/reproducing head 30; however, the information recording/reproducing apparatus 70 may include the information recording/reproducing head 40 instead of the information recording/reproducing head 30.

As shown in FIG. 20, in the information recording/reproducing apparatus 70 of the present embodiment, the information recording/reproducing head 30 is installed in a slider 380*a* such that: scanning is carried out with respect to the recording surface 350*a* (the surface of the information recording medium 350) of the information recording medium 350 while rotating the information recording medium 350, with the use of the near field NF generated from the electromagnetic field generation region 150 of the information recording/reproducing head 30.

Note that distance (flying height) is 100 nm or less between (i) the electromagnetic field generation region 150 of the information recording/reproducing head 30, and (ii) the recording surface 350*a* of the information recording medium 350. This is because the near field NF, used for the scanning of the recording surface 350*a* of the information recording medium 350, is generated merely in the vicinity of the boundary surface (the electromagnetic field generation region 150, in this case).

The slider 380*a* is supported by an arm 380*b*, and an actuator 380*c* serving as transporting means transports the slider 380*a* such that scanning is carried out with respect to the recording track of the information recording medium 350.

FIG. 21 is an enlarged view illustrating (i) the information recording/reproducing head 30 installed in the arm 380*b*, and (ii) the slider 380*a*. In the information recording/reproducing apparatus 70 of the present embodiment, a thin flexible cable is connected to each of (i) the conductors 110*a* and 110*b* of the information recording/reproducing head 30, (ii) the electrodes 128*a* and 128*b* of the semiconductor laser element 120, and (iii) the electrodes 170*a* and 170*b* of the electromagnetic field detector.

The head and the members formed in the vicinity of the head in the information recording/reproducing apparatus 70 are manufactured in accordance with the following process. Firstly, the information recording/reproducing head 30 is manufactured by forming, on the substrate 160, (i) the electromagnetic field generating element 10 including the semiconductor laser element 120, and (ii) the electromagnetic field detector. The information recording/reproducing head 30 thus manufactured is adhered to an AlTiC substrate for use in formation of a slider of a conventional magnetic head.

Thereafter, dividing is carried out with respect to the conventional AlTiC substrate to which the substrate including the semiconductor laser element 120 is adhered. Then, the AlTiC substrate thus divided is processed to have an air bearing side surface such that the slider 380*a* including the information recording/reproducing head 30 is formed.

The manufacturing process above is similar to the manufacturing process of the conventional magnetic head, so that the manufacturing process of the conventional magnetic head can be used for the manufacturing process of the information recording/reproducing head 30. This allows productivity improvement in the manufacturing of (i) the head of the information recording/reproducing apparatus 70, and (ii) the members formed in the vicinity of the head.

The electrodes 128*a* and 128*b* each serving as the laser element driving terminal, the conductors 110*a* and 110*b* each serving as the magnetic field generating current terminal, and the electrodes 170*a* and 170*b* of the electromagnetic field detector are provided on the substrate 160 including the semiconductor laser element 120, which is incorporated with the slider 380*a*. This allows easy access from outside to the terminals, with the result that the productivity is improved.

Explained next is a recording system or a reproducing system of the information recording/reproducing apparatus 70 of the present embodiment, with reference to a schematic block diagram of FIG. 22.

The information recording/reproducing apparatus 70 of the present embodiment includes: a recording/reproduction control section 458, a data recording section 453, and a data reproducing section 461.

In order to control various below-mentioned sections of the information recording/reproducing apparatus 70, the recording/reproduction control section 458 receives, from a superior apparatus via a recording/reproduction control terminal 452, a signal for controlling the recording or the reproduction.

From the superior apparatus via an input terminal 451, the data recording section 453 receives data to be recorded, and converts the data to a recording signal, and transmits the recording signal.

The data reproducing section 461 receives an electric signal read out by the information recording/reproducing apparatus 70, and converts the electric signal to a data signal, and transmits the data signal to the superior apparatus via an output terminal 462.

The information recording/reproducing apparatus 70 of the present embodiment further includes: (i) a laser light emitting section 455 for generating the near field NF; (ii) a laser driving section 454 for controlling a current for driving the laser light emitting section 455; (iii) a magnetic field generating section 457 for generating the magnetic field B; (iv) a current control section 459 for controlling a current for driving the magnetic field generating section 457; (v) a light detecting section 456 for detecting the strength of the scattering light so as to read out information; and (vi) a current detecting section 460 for detecting the induced current so as to read out information.

The laser light emitting section 455 irradiates the laser light Pi for the purpose of generating the near field NF required for the information writing and information readout. The laser light emitting section 455 corresponds to the semiconductor laser element 120 described in the foregoing embodiments. In order to adjust the strength of the laser light to be irradiated from the laser light emitting section 455, the laser driving section 454 controls the current to be supplied to the laser light emitting section 455.

The magnetic field generating section 457 uses the current flowing therethrough, so as to generate the magnetic field B required for the writing. The magnetic field generating section 457 corresponds to the conductor 110c described in the foregoing embodiments. In order to adjust the strength of the magnetic field B to be generated by the magnetic field generating section 457, the current control section 459 controls the current to be supplied to the magnetic field generating section 457.

The light detecting section 456 detects the polarization direction change of the scattering light Ps and the strength change thereof in accordance with the aforementioned method so as to read out information from the information recording medium. The light detecting section 456 corresponds to the light detector 163 described in the foregoing embodiments.

The current detecting section 460 detects the induced current generated when the magnetic polarization of the information recording medium meets the magnetic field generating section 457. With this, information is read out from the information recording medium.

Note that the information recording/reproducing apparatus 70 of the present embodiment includes both the light detecting section 456 and the current detecting section 460; however, the information recording/reproducing apparatus 70 may include only one of the light detecting section 456 and the current detecting section 460.

Explained next is how the information recording/reproducing apparatus 70 of the present embodiment carries out the recording operation.

Firstly in the recording, the control signal for the recording is sent from the superior apparatus to the recording/reproduction control section 458 via the recording/reproduction control terminal 452. In response to the reception, the recording/reproduction control section 458 controls the laser driving section 454, the data recording section 453, and the current control section 459 in the following manner.

The recording/reproducing control section 458 carries out control such that the laser driving section 454 drives the laser light emitting section 455 with the use of a current larger than a current for the reproduction. This causes irradiation of the laser light Pi having strength stronger than the strength of the laser light Pi for the reproduction, with the result that the strong near field NF is generated in the electromagnetic field generation region by the surface plasmon Dsp. This allows generation of the temperature rise area in the information recording medium, i.e., allows generation of the area in which information can be written.

Further, the recording/reproduction control section 458 carries out control such that: the data recording section 453 receives the recording data from the superior apparatus via the input terminal 451, and transmits the received recording data to the current control section 459 in the form of the recording signal. In accordance with (i) the recording signal transmitted from the data recording section 453 and (ii) the signal transmitted from the recording/reproduction control section 458, the current control section 459 supplies the magnetic field generating section 457 with a current according to the recording signal. The magnetic field generating section 457 generates the magnetic field B with the use of the current thus supplied. The magnetic field B thus generated inverse the magnetism of the information recording medium, with the result that information is recorded in the information recording medium.

As such, the information recording/reproducing apparatus 70 of the present embodiment carries out the recording by generating the near field, and by continuously generating the magnetic field B according to the recording data.

Explained next is how the information recording/reproducing apparatus 70 of the present embodiment carries out the reproducing operation.

Firstly in the reproduction, the control signal for the reproduction is sent from the superior apparatus to the recording/reproduction control section 458 via the recording/reproduction control terminal 452. Here, in cases where information is read out by the light detecting section 456, the recording/reproduction control section 458 controls the laser driving section 454, the data reproducing section 461, and the light detecting section 456 in the following manner.

The recording/reproducing control section 458 carries out control such that the laser driving section 454 drives the laser light emitting section 455 with the use of the current smaller than the current for the recording. This causes irradiation of the laser light Pi having the strength weaker than the strength of the laser light Pi for the recording, with the result that the weak near field NF is generated in the electromagnetic field generation region by the surface plasmon Dsp. This causes the near field NF to interplay with (i) the electric polarization Pout in the recording mark of the information recording medium, and (ii) the magnetic polarization Mout therein.

Further, the recording/reproduction control section 458 carries out control such that the light detecting section 456 detects the scattering light Ps whose strength is changed due to the interplay with the near field NF. This allows the light detecting section 456 to read out information from the information recording medium, and transmits the information to the data reproducing section 461 in the form of the electric signal.

Note that, in cases where the light detecting section 456 detects the polarization direction change of the scattering light Ps, the recording/reproduction control section 458 carries out control such that the current control section 459 supplies an appropriate current to the magnetic field generating section 457. With this, the magnetic field generating section 457 generates the magnetic field B, with the result that the magnetization direction of the soft magnetic layer 119 is fixed. Thereafter, the light detecting section 456 detects the polarization direction change of the scattering light Ps as described above.

On the other hand, in cases where the information recording/reproducing apparatus 70 reads out information with the use of the induced current generated by the electromagnetic induction, the recording/reproducing control section 458 controls the current detecting section 460 in the following manner.

The induced current is generated in the magnetic field generating section 457 by the electromagnetic induction occurring when the magnetic polarization Mout in the information recording medium meets the magnetic field generating section 457. The meeting is done while rotating the information recording medium. The induced current thus generated is detected by the current detecting section 460, and the current detecting section 460 transmits the induced current to the data reproducing section 461 in the form of the electric signal.

The recording/reproduction control section 458 carries out control such that: the data reproducing section 461, which received the electric signal from the light detecting section 456 or the current detecting section 460, converts the electric signal to the data signal, and transmits the data signal to the superior apparatus via the output terminal 462.

In this way, the information recording/reproducing apparatus 70 of the present embodiment reproduces information from the information recording medium.

As described above, unlike the conventional techniques, the information recording/reproducing apparatus 70 does not need to use the yoke extension section so as to generate the magnetic field in a desired location, so that the electromagnetic field generating element 20 allows restraint of the magnetic field attenuation or of the magnetic field delay as compared with the case of using the yoke extension section. For this reason, the information recording/reproducing apparatus 70 is suitable for the high frequency magnetic recording/reproduction. Further, the information recording/reproducing apparatus 70 allows the magnetic recording to be carried out, with the assistance of the near field NF which exceeds the diffraction limit of light, with respect to the minute region.

Further, the use of the information recording/reproducing head 30 allows acquirement of the strong near field. With this, the recording and the reproducing can be carried out with respect to an information recording medium having a high coercivity.

Embodiment 8

Figure 23:
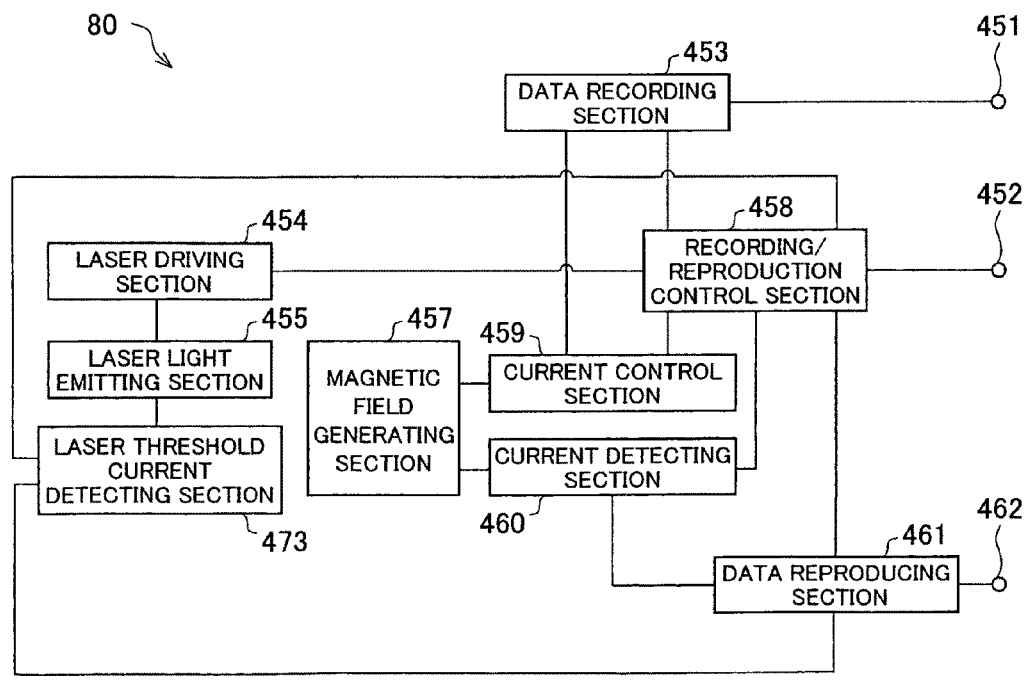
FIG. 23 is a block diagram schematically illustrating a structure of a recording/reproducing system of an information recording/reproducing apparatus according to another embodiment of the present invention.

The following explains another embodiment of the information recording/reproducing apparatus according to the present invention with reference to FIG. 23.

FIG. 23 is a block diagram schematically illustrating a recording system or a reproducing system of an information recording/reproducing apparatus 80 of the present embodiment. The information recording/reproducing apparatus 80 of the present embodiment includes the information recording/reproducing head 50 of Embodiment 5, and has the same structure as the structure of the information recording/reproducing apparatus 70 of Embodiment 7, except that a laser threshold current detecting section 473 is provided instead of the light detecting section. Note that, for ease of explanation, materials having the equivalent functions as those shown in the foregoing embodiments will be omitted here. Further, the laser threshold current detecting section 473 of the present embodiment corresponds to the laser threshold current detector of the information recording/reproducing head 50 of Embodiment 5.

The following explains how the information recording/reproducing apparatus 80 carries out the reproducing operation.

Firstly in the reproduction, the control signal for the reproduction is sent from the superior apparatus to the recording/reproduction control section 458 via the recording/reproduction control terminal 452. Here, in cases where information is read out by the laser threshold current detecting section 473, the recording/reproduction control section 458 controls the laser driving section 454, the data reproducing section 461, and the laser threshold current detecting section 473 in the following manner.

The recording/reproducing control section 458 carries out control such that the laser driving section 454 drives the laser light emitting section 455 with the use of a current smaller than a current for the recording. This causes irradiation of the laser light Pi having strength weaker than the strength of the laser light Pi for the recording, with the result that the weak near field NF is generated in the electromagnetic field generation region by the surface plasmon Dsp. The near field NF thus generated interplays with (i) the electric polarization Pout in the recording mark of the information recording medium, and (ii) the magnetic polarization Mout therein.

The laser light Pi indirectly irradiated to the information recording medium is reflected by the information recording medium, with the result that the laser light Pi becomes reflected light Ps. The reflected light Ps is affected by the aforementioned interplay, with the result that the polarization direction of the reflected light Ps and the strength thereof are changed. When the reflected light Ps comes back to the laser light emitting section 455, the state of the laser oscillation of the laser light emitting section 455 is changed.

The laser threshold current detecting section 473 detects, from the laser light emitting section 455, the laser oscillation state as the threshold current, and transmits the laser oscillation state to the data reproducing section 461 in the form of the electric signal.

The recording/reproduction control section 458 carries out control such that: the data reproducing section 461, which received the electric signal from the laser threshold current detecting section 473, converts the electric signal to the data signal, and transmits the data signal to the superior apparatus via the output terminal 462.

In this way, the information recording/reproducing apparatus 80 of the present embodiment reproduces information from the information recording medium.

As described above, the information recording/reproducing apparatus 80 of the present embodiment detects the state change of the laser oscillation by detecting the laser threshold current, when reading out information. This allows highly sensitive light detection. Further, the laser threshold current detection section has a structure simpler than the respective structures of the aforementioned light detecting section and the magnetic field detecting section. This allows simplification of the structure of the information recording/reproducing apparatus 80, and accordingly allows realization of an inexpensive and highly reliable information recording/reproducing apparatus.

Embodiment 9

Figure 24:
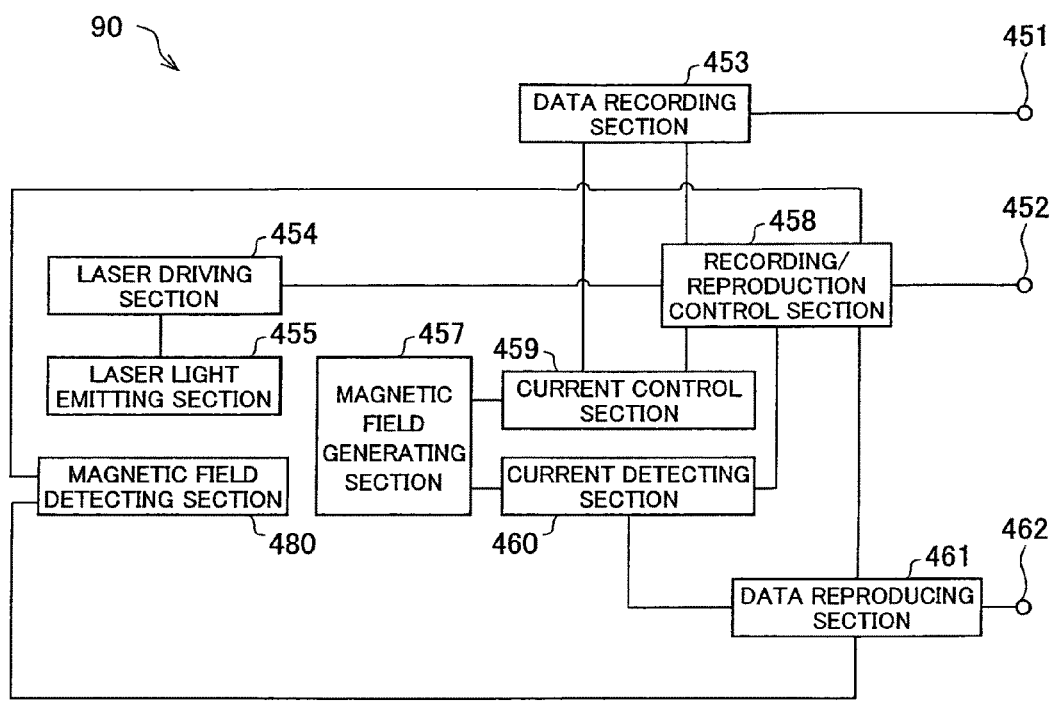
FIG. 24 is a block diagram schematically illustrating a structure of a recording/reproducing system of an information recording/reproducing apparatus according to still another embodiment of the present invention.

The following explains still another embodiment of the information recording/reproducing apparatus according to the present invention with reference to FIG. 24.

The information recording/reproducing apparatus 90 of the present embodiment includes the information recording/reproducing head 60 of Embodiment 5, and has the same structure as the structure of the information recording/reproducing apparatus 70 of Embodiment 7, except that a magnetic field detecting section 480 is provided instead of the light detecting section. Note that, for ease of explanation, materials having the equivalent functions as those shown in the foregoing embodiments will be omitted here. Further, the magnetic field detecting section 480 of the present embodiment corresponds to the magnetic field detector 164 of the information recording/reproducing head 60 of Embodiment 6.

The following explains how the information recording/reproducing apparatus 90 carries out the reproducing operation.

Firstly in the reproduction, the control signal for the reproduction is sent from the superior apparatus to the recording/reproduction control section 458 via the recording/reproduction control terminal 452. Here, in cases where the information is read out by the magnetic field detecting section 480, the recording/reproduction control section 458 controls such that the magnetic field detecting section 480 detects the magnetic flux leaking from the recording mark of the information recording medium.

Further, the recording/reproduction control section 458 carries out control such that: the data reproducing section 461, which received the electric signal from the magnetic field detecting section 480, converts the electric signal to the data signal, and transmits the data signal to the superior apparatus via the output terminal 462.

In this way, the information recording/reproducing apparatus 90 of the present embodiment reproduces information from the information recording medium.

Note that, it is preferable that a magnetic field detector having a small magnetic spacing be used as the magnetic field detecting section 480 of the information recording/reproducing apparatus 90 of the present embodiment. This allows high spatial resolution magnetic field detecting. Accordingly, the high density magnetic field recording medium can be reproduced.

Embodiment 10

One embodiment of the present invention will be described below with reference to FIG. 25 through FIG. 55.

Figure 25:
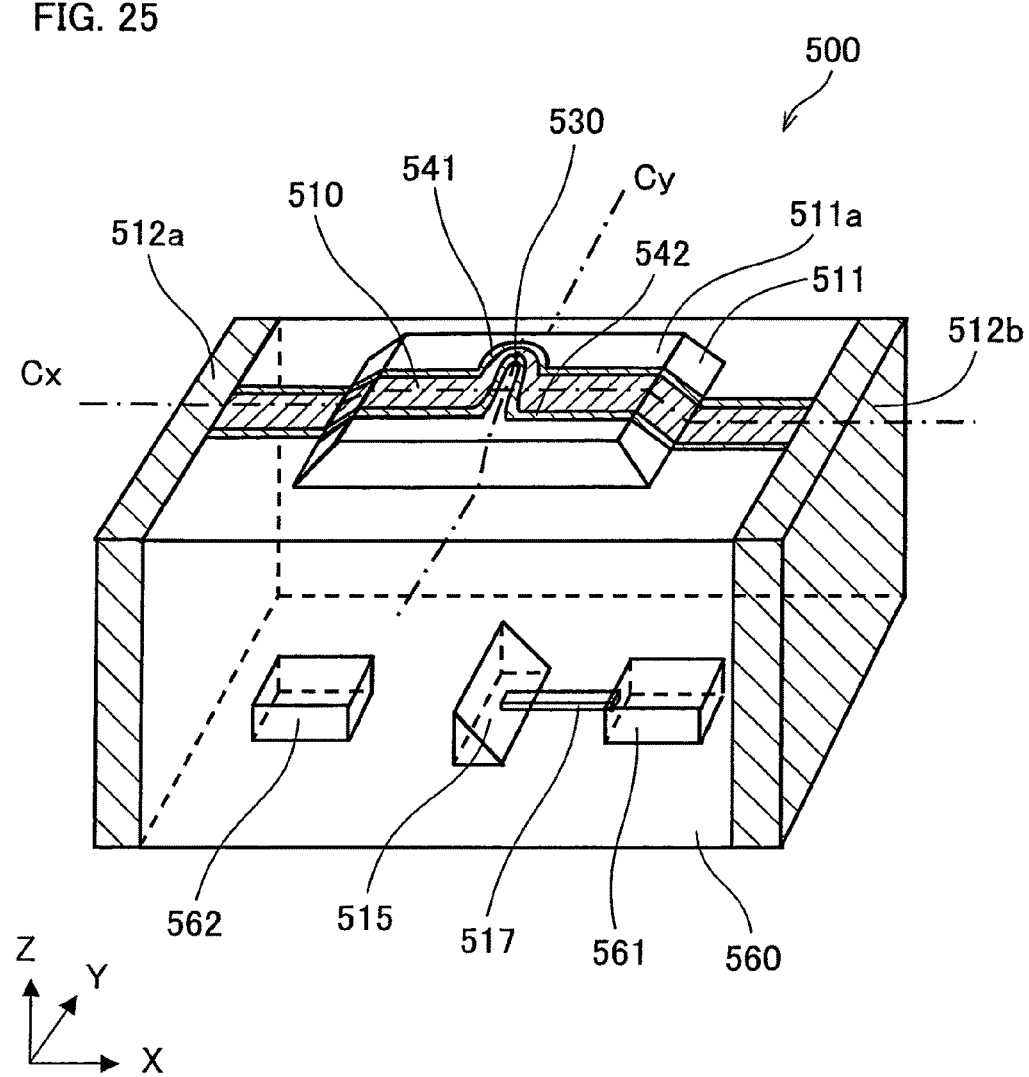
FIG. 25 is an explanatory diagram illustrating a structure of an electromagnetic field generating element according to one embodiment of the present invention.

FIG. 25 is an explanatory diagram schematically illustrating an electromagnetic field generating element (hereinafter, also referred to as simply "present element") of the present embodiment. In the present element 500, a conductor 510 in the form of a band is so provided as to be implanted in the substrate 560. In order to supply a current i (see FIG. 32) to the conductor 510, an electrode 512a is provided on one side surface of the substrate 560, and an electrode 512b is provided on the other side surface thereof.

The conductor 510 has a surface having edge portions projecting in the form of a bank. Hereinafter, such projecting portions having the bank-like structure are referred to as bank-like portions (bank-like structure portions) 541 and 542, respectively. Further, the conductor 510 includes a confinement portion 530 for confining a current i. Note that, here, the bank-like portions 541 and 542 each formed by swelling up the edge portions of the surface of the conductor 510 extend entirely along the conductor 510; however, the bank-like portions 541 and 542 may be formed only in the vicinity of the confinement portion 530 by swelling up edge portions of the surface in the vicinity of the confinement section 530. Alternatively, a single bank-like portion may be formed in one edge portion of the confinement portion 530.

Here, each of the conductor 510, the electrodes 512a and 512b is made of (i) a metal having a high electric conductivity or (ii) a carbon nano tube. In view of the high frequency responsiveness, it is particularly preferable that each of the conductor 510, the electrodes 512a and 512b be made of any of Au, Pt, Ag, Cu, Al, Ti, W, Ir, Pd, and the like. Each of these materials is a non-magnetic metal.

On the other hand, it is preferable that the substrate 560 be made of (i) a IV group semiconductor, (ii) a III-V group compound semiconductor, (iii) a II-VI group compound semiconductor, (iv) an insulator oxide, (v) an insulator nitride, (vi) glass, or (vii) plastic. Examples of the IV group semiconductor include: Si, Ge, and the like. Examples of the III-V group compound semiconductor include: GaAs, AlGaAs, GaN, InGaN, InSb, GaSb, and AlN. Examples of the II-VI group compound semiconductor include: ZnTe, ZeSe, ZnS, ZnO, and the like. Examples of the insulator oxide include: ZnO, $Al_2O_3$, $SiO_2$, $TiO_2$, $CrO_2$, $CeO_2$, and the like. Examples of the insulator nitride include: SiN, and the like.

For attainment of tighter combination between the conductor 510 and the substrate 560 made of the insulator oxide or the insulator nitride, it is preferable that a combining layer (intermediating metal layer; second metal film 518) made of Zn, Ti, Cr, Al or the like be provided therebetween. This makes it possible to prevent the conductor 510 from being detached from the substrate 560, and accordingly allows improvement of element strength of the present element 500.

Figure 26:
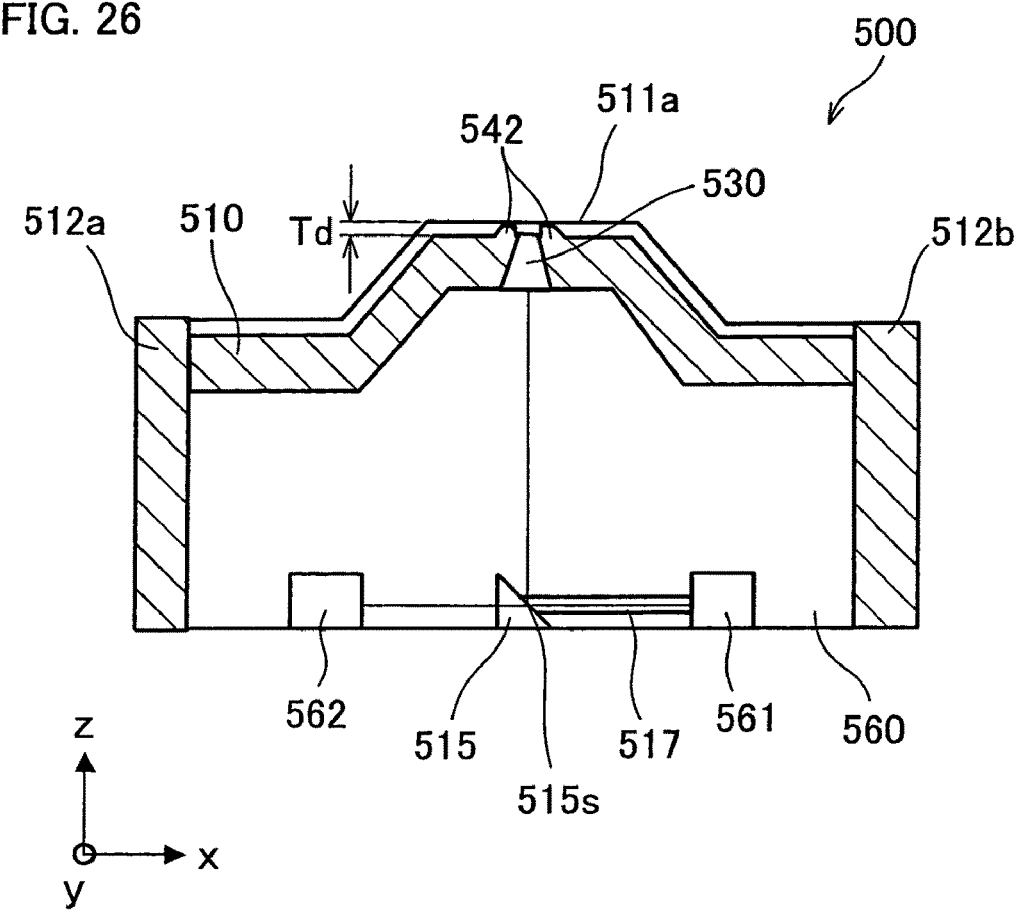
FIG. 26 is a cross sectional view which illustrates the electromagnetic field generating element and which is taken along line Cx.

FIG. 26 is a cross sectional view which illustrates the present element 500 and which is taken along line CX shown in FIG. 25. Provided in the substrate 560 are: (i) a laser generating source 561 serving as a light source; (ii) a light waveguide (propagation means) 517, (iii) an optical element (propagation means) 515, and (iv) a light detector 562. The optical element 515 is formed by digging in the form of a triangular prism, the underside surface of the substrate 560. The optical element 515 has a leaning surface 515s, which is coated with a plurality of dielectric thin films or on which a metal film is formed.

Light Pi from the laser generating source 561 passes through the light waveguide 517, and is reflected by the leaning surface 515s of the optical element 515, with the result that the light Pi is propagated to the interface between the conductor 510 and the substrate 560, which interface is within a distance of 10 μm from the confinement portion 530. Moreover, the light Pi is branched by the optical element 515, and the light detector 562 detects the light Pi whose propagation direction is not changed. In accordance with the detection of the light Pi by the light detector 562, a control section (not shown) carries out control such that desired light Pi is sent (irradiated) from the laser generating source 561.

Further, the optical element 515 may be arranged such that the leaning surface 515s of the optical element 515 is curved so as to branch the light and collect a larger amount of the light to the vicinity of the confinement portion 530.

Further, it is preferable that the light waveguide 517 provided between the laser generating source 561 and the optical element 515 be made of a material having a refractive index higher than that of the substrate 560. This makes it possible that the light Pi is restrained from being spread on the underside surface of the substrate 560, and that the light Pi is irradiated to a desired location of the optical element 515. This allows restraint of spread of the region, to which the light Pi is irradiated, of the confinement portion 530.

Further, as shown in FIG. 25 and FIG. 26, the laser generating source 561 and the substrate 560 are formed in one piece. This allows generation of a near field NF in the vicinity of the confinement portion 530, with the use of the light Pi irradiated from the laser generating source 561 serving as a light source. This allows realization of (i) reliability improvement of the present element 500 and (ii) the productivity improvement thereof.

Figure 27:
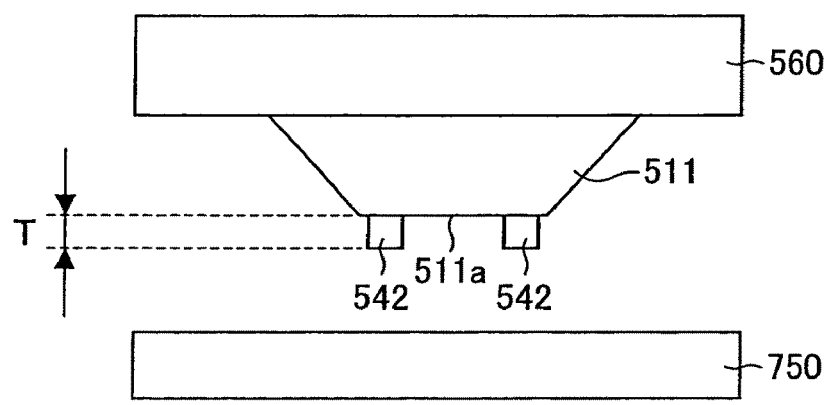
FIG. 27 is a diagram schematically illustrating a cross section of the electromagnetic field generating element.

Further, on the surface of the substrate 560, a projecting portion 511 is formed, projecting higher than the surface of the substrate 560 as shown in FIG. 25. The bank-like portions 541 and 542 are formed in the confinement portion 530 such that there is a distance T (see FIG. 27) of 50 nm or shorter from (i) the reference surface (projection surface) 51a of the projecting portion 511 to (ii) each head of the bank-like portions 541 and 542 of the confinement portion 530. As shown in FIG. 27, the bank-like portions 541 and 542 may project higher from the projecting portion 511. In this case, the bank-like portions 541 and 542 are coated with the same material as the material of which the substrate 560 is made.

Here, the projecting portion 511 refers to a portion having a projecting surface which is parallel to a horizontal plane and which corresponds to the average height of a region projecting upward the most when the underside surface of the substrate 560 is positioned in the downward direction. In other words, the projecting portion 511 refers to a structure (see FIG. 27) of a portion of the present element 500, which portion has a surface that faces the information recording medium 750 and that is substantially parallel to and adjacent to the information recording medium 750 when the present element 500 and the information recording medium 750 face each other. Note that the object facing the present element 500 is not limited to the information recording medium 750, and another object may face the present element 500.

Figure 28:
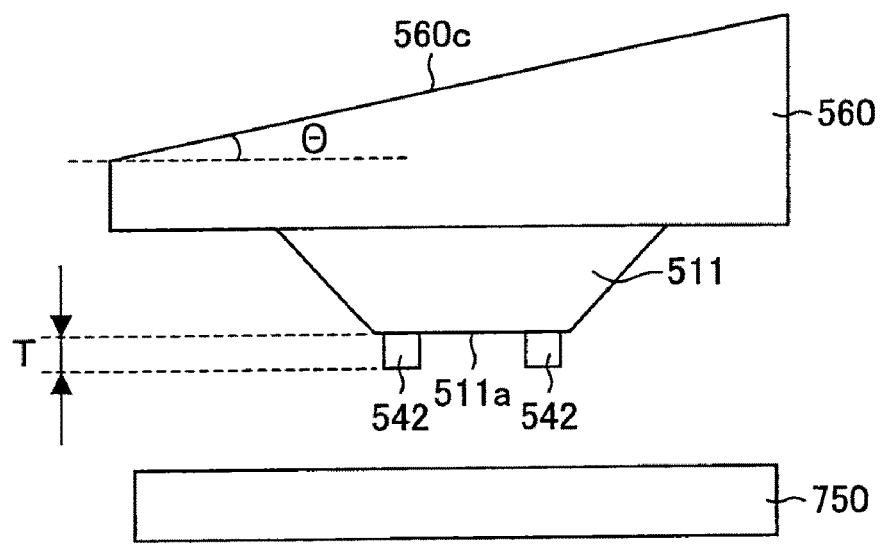
FIG. 28 is a cross sectional view schematically illustrating how the underside surface of the electromagnetic field generating element leans with respect to the horizontal plane.

The reference surface 511a of the projecting portion 511 has a surface roughness (Ra) of 10 nm or less. Further, the underside surface of the substrate 560 may lean at an angle θ with respect to the horizontal plane as shown in FIG. 28, as long as $0° \leqq θ \leqq 90°$ is satisfied.

Figure 29:
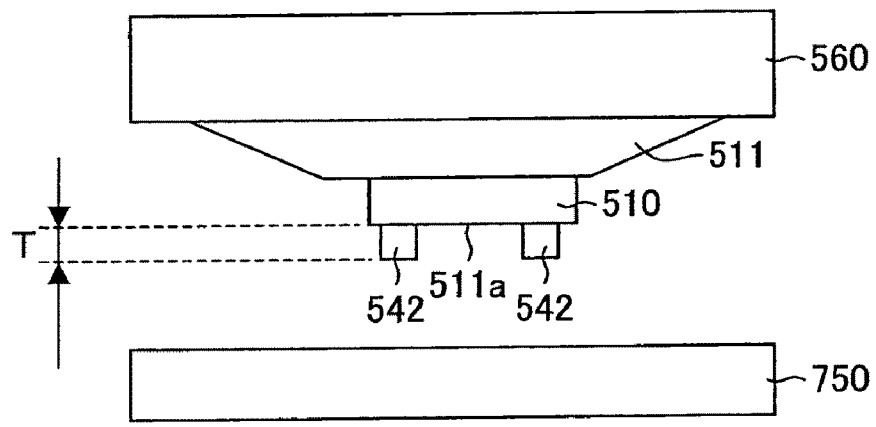
FIG. 29 is a cross sectional view schematically illustrating that the conductor of the electromagnetic field generating element is not implanted in the substrate.

Further, the conductor 510 does not need to be implanted in the substrate 560, and may be layered in the order of the substrate 560, the projecting portion 511, and the conductor 510 as shown in FIG. 29. In this case, the aforementioned projection surface 511a is defined as a surface of the conductor 510, which surface faces the information recording medium 750. Further, also in this case, each of the bank-like portions 541 and 542 is coated with the same material as the material of which the substrate 560 is made.

Figure 30:
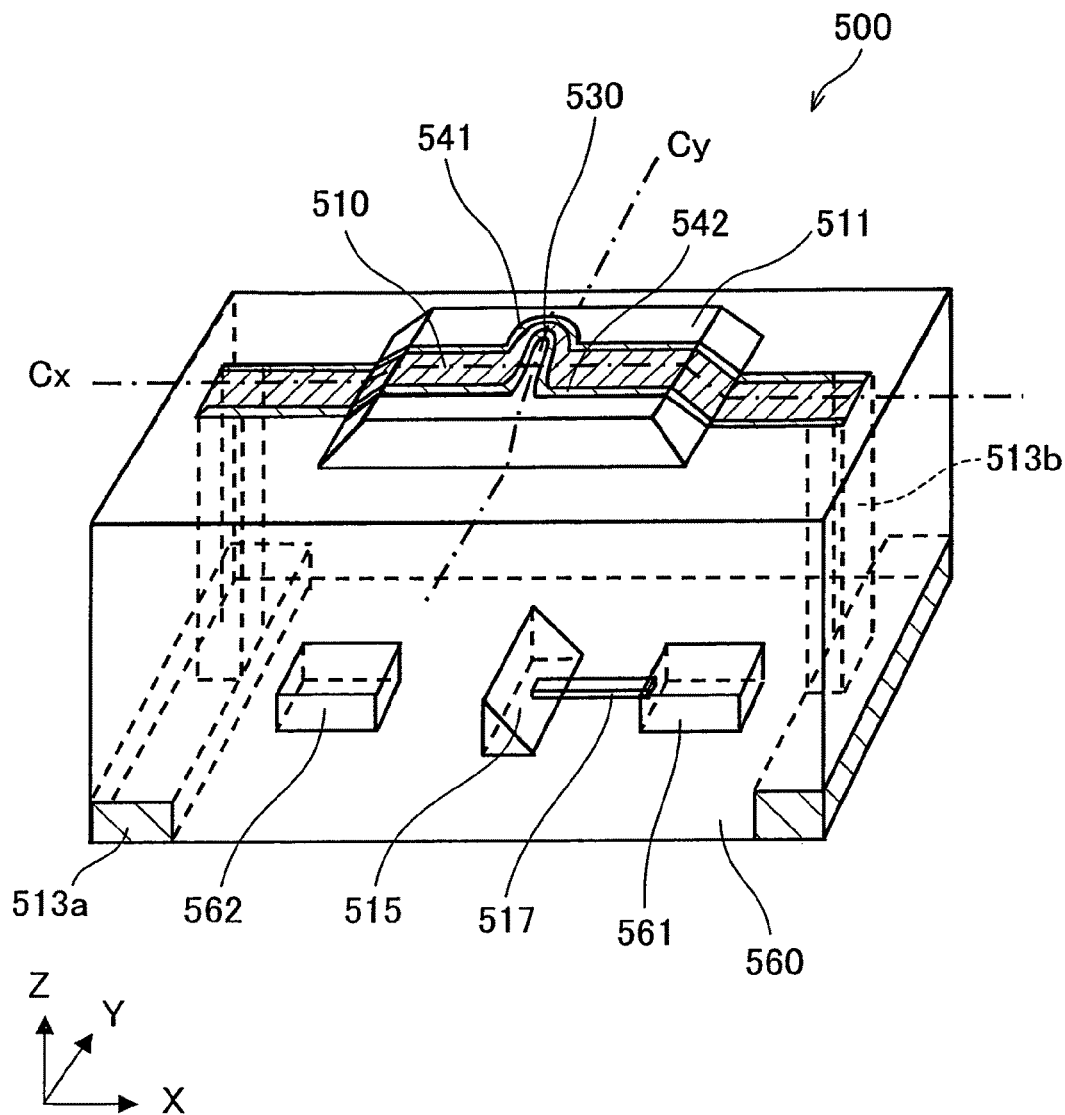
FIG. 30 is an explanatory view illustrating a structure of an electromagnetic field generating element according to one embodiment of the present invention, the structure being different from the structure of the electromagnetic field generating element shown in FIG. 25.
Figure 31:
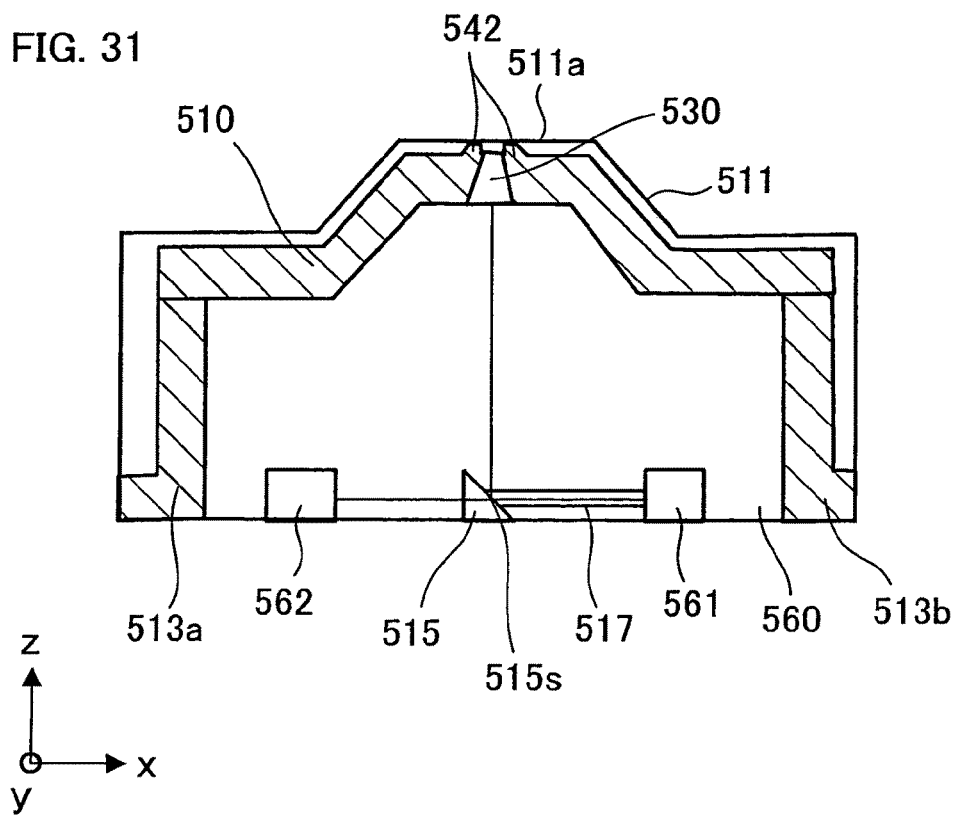
FIG. 31 is a cross sectional view which illustrates the electromagnetic field generating element shown in FIG. 30, and which is taken along the line Cx.

Note that the electrodes 512a and 512b are respectively provided on the side surfaces of the substrate 560; however, the present invention is not limited to this, and there may be formed, in a through hole formed in the substrate 560 in the Z direction, electrodes 513a and 513b each extending from the underside surface of the substrate 560 to the surface (upper surface) of the substrate 560 as shown in FIG. 30. FIG. 31 is a cross sectional view which illustrates the present element 500 and which is taken along line Cx shown in FIG. 30. Thus, it is easy to allow for connection with a flexible cable in which a wire is printed. Accordingly, operation efficiency is improved when assembling the present element 500 as a device.

Explained next are (i) the structure of the confinement portion 530 formed in the conductor 510 having the band-like shape, and (ii) the magnetic field generated in the confinement portion 530, with reference to FIG. 32 through FIG. 36.

Figure 32:
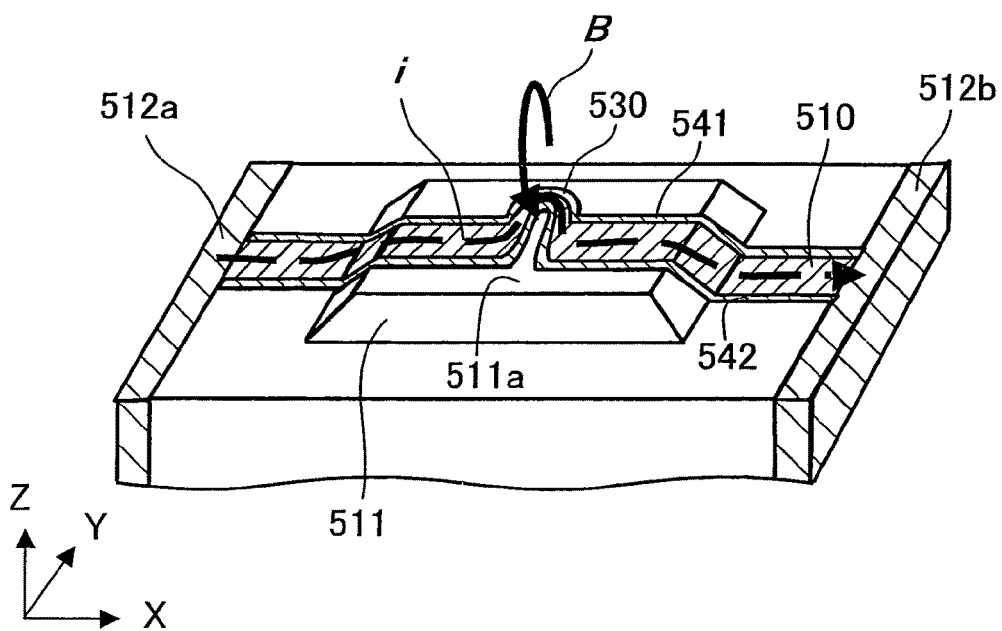
FIG. 32 is an explanatory diagram illustrating (i) the vicinity of the projecting portion in the electromagnetic field generating element shown in FIG. 25, (ii) a current flowing through the conductor, and (iii) a magnetic field generated in the confinement portion.
Figure 33:
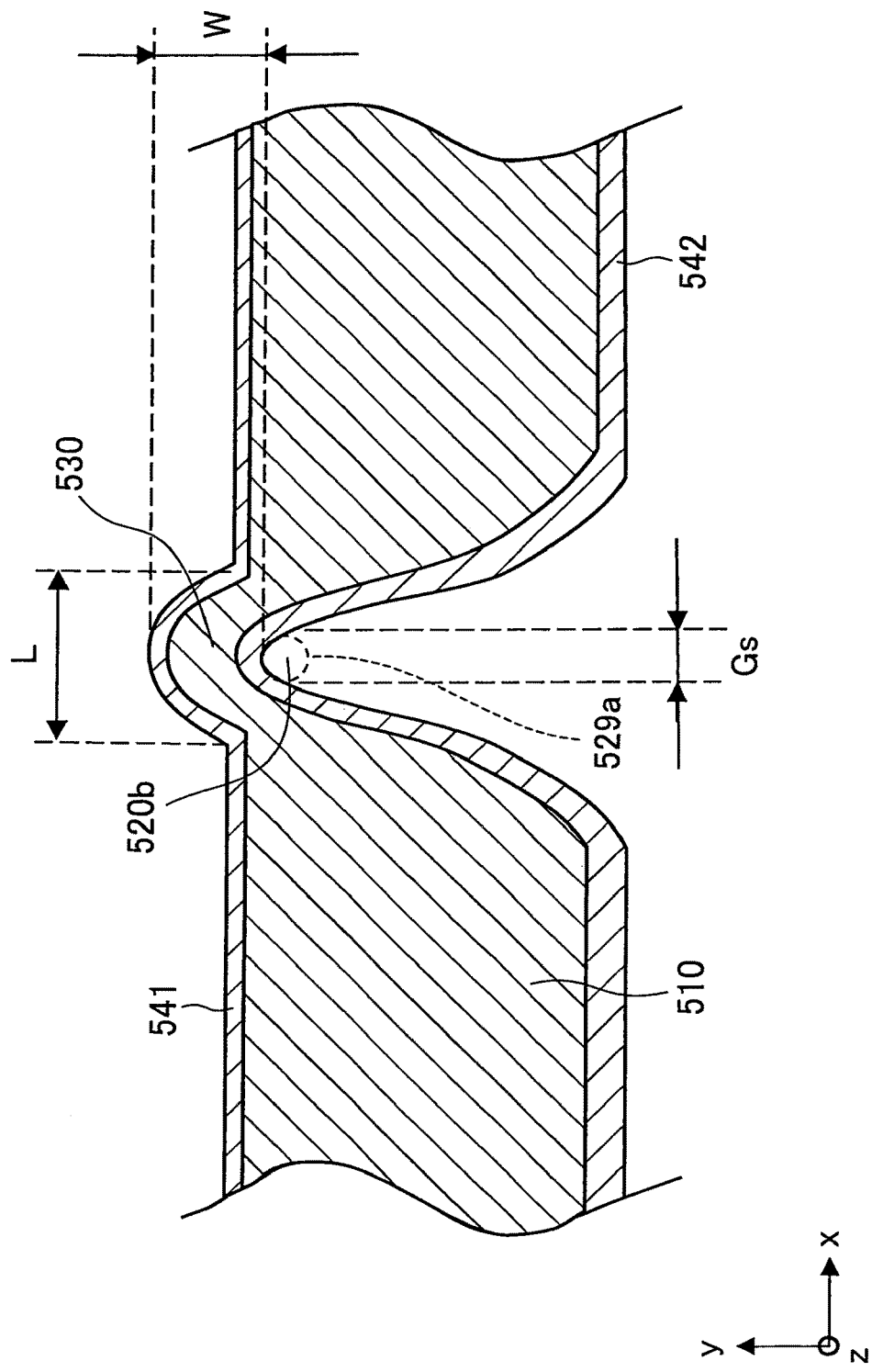
FIG. 33 is an enlarged view illustrating the vicinity of the confinement portion (see FIG. 32) in the electro magnetic field generating element.
Figure 34:
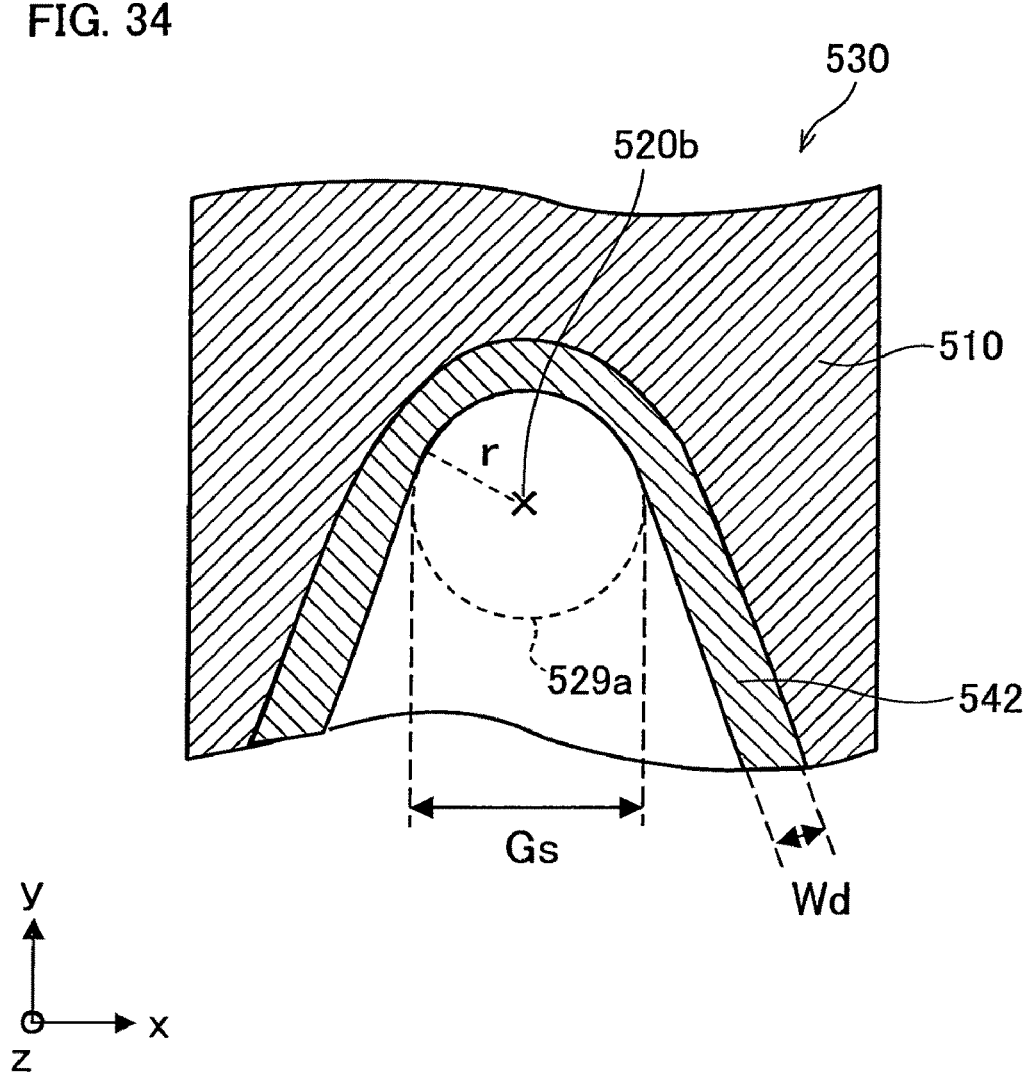
FIG. 34 is a further enlarged view illustrating the vicinity of the confinement portion shown in FIG. 33.

FIG. 32 is a simplified diagram schematically illustrating (i) the vicinity of the projecting portion 511 of the present element, (ii) the flow of the current i through the present element 500 shown in FIG. 25, and (iii) the generation of the magnetic field B. FIG. 33 is an enlarged view illustrating the vicinity of the confinement portion 530 shown in FIG. 32. FIG. 34 is a further enlarged view illustrating the vicinity of the confinement portion 530 shown in FIG. 33.

As shown in FIG. 33, the confinement portion 530 of the conductor 510 having the band-like shape is a portion obtained by compressing a part of the conductor 510 in the direction (Y direction) orthogonal to the longitudinal direction (X direction) of the conductor 510. Therefore, the confinement portion 530 has a line width W thinner than the line width of the other parts of the conductor 510. In other words, the confinement portion 530 of the conductor 510 having the band-like shape has such a substantially half-round shape that: one edge (inner circumferential edge) of the conductor 510 penetrates into the vicinity of the other edge (outer circumferential edge), and the outer circumferential edge overhangs. The aforementioned line width W refers to distance, in the narrowest portion of the conductor 510, between (i) the inner circumferential edge of the conductor 510 and (ii) the outer circumferential edge thereof.

The confinement portion 530 has an inner circumferential length that corresponds to the diameter Gs of a circle (see a circle 529a shown in FIG. 34) meeting the inner circumferential edge, i.e., that corresponds to a length twice as large as distance r from the center 520 of the circle to the inner circumferential edge of the conductor 510.

Thus, as shown in FIG. 33, the confinement portion 530 of the conductor 510 having the band-like shape is a portion obtained by compressing a part of the conductor 510 in the direction (Y direction) orthogonal to the longitudinal direction (X direction) of the conductor 510. The confinement portion 530 has a line width W thinner than the line width of the other parts of the conductor 510. In other words, the confinement portion 530 of the conductor 510 having the band-like shape has such a substantially half-round shape that: one edge (inner circumferential edge) of the conductor 510 penetrates into the vicinity of the other edge (outer circumferential edge), and the outer circumferential edge overhangs.

Here, the aforementioned line width W indicates distance, in the narrowest portion of the conductor 510, between (i) the inner circumferential edge of the conductor 510 and (ii) the outer circumferential edge thereof. Moreover, the inner circumferential length Gs of the confinement portion 530 corresponds to a length of 2r, which is the length of the diameter of the circle 529 meeting the inner circumferential edge of the confinement portion 530. In other words, the inner circumferential length Gs of the confinement portion 530 is a length twice as large as the distance r from the center 520 of the circle to the inner circumferential edge of the conductor 510 (more precisely speaking, the inner circumferential edge of the bank-like portion 542). Further, the confinement portion 530 has an outer circumferential length L corresponding to the length of the diameter of a circle that is formed within the region through which the current i flows and which has the line width W, and that meets the outer circumferential edge of the confinement portion 530 having the substantially half-round shaped portion.

Further, the confinement portion 530 of the conductor 510 has a thickness equal to or thinner than the wavelength of the light Pi to be irradiated from the laser generating source 561.

Further, each of the bank-like portions 541 and 542 has a height Td (see FIG. 26) of 100 nm or less, and has a width Wd of 100 nm or less. The height Td of each of the bank-like portions 541 and 542 is measured from the flat surface of the central portion of the conductor 510, i.e., the portion positioned in the vicinity of the bank-like portions 541 and 542. Further, in cases where the confinement portion 530 has the substantially half-circle shape as shown in FIG. 33, the outer circumferential length L of the confinement portion 530 corresponds to the length of the diameter of the circle that is formed within the region through which the current flows and which has the line width W, and that meets the outer circumferential edge of the confinement portion 530 having the substantially half-round shaped portion.

When the current i (see a broken line in FIG. 32) flows through the conductor 510, the current i flows in a substantially U manner, i.e., flows along the circumferential edges of the confinement portion 530. Accordingly, in the surroundings of the confinement portion 530, a magnetic field B is generated, according to the corkscrew rule, in proportion to the current i thus supplied. A solid line indicator shown in FIG. 32 indicates an orientation of the magnetic field B thus generated.

The flow of the current i from the electrode 512a to the electrode 512b via the conductor 510 causes generation of (i) the magnetic field B whose orientation is in the Z axis positive direction, in the vicinity of the outer circumferential edge of the confinement portion 530; (ii) the magnetic field B whose orientation is in the Y axis negative direction, in the central portion of the confinement portion 530 on the surface of the projecting portion 511; and (iii) the magnetic field B whose orientation is in the Z axis negative direction, in the vicinity of the inner circumferential edge of the confinement portion 530.

The strength H of the magnetic field B is increased in the vicinity of the bank-like portions 541 and 542 of the conductor 510, as the conductor 510 comes closer to the reference surface 511*a* of the projecting section. Specifically, magnetic flux lines are converged to the vicinity of the center 520*b* of the circle 529*a* (see FIG. 33 and FIG. 34) meeting the inner circumferential edge of the substantially U-shaped portion (confinement portion 530) of the conductor 510 through which the current i flows. This allows strength increase of the magnetic field B.

By using the inner circumferential length Gs, the line width W, and the current i (I), the following formula 1 expresses the strength H of the magnetic field B generated in or in the vicinity of the center 520*b* of the circle 529*a* meeting the inner circumferential edge of the substantially U-shaped portion of the conductor 510:

$$H = \frac{1}{4W} \ln\left(\frac{W + Gs/2}{Gs/2}\right)$$ [Formula 1]

For example, when the confinement portion 530 has the inner circumferential length Gs of 1 μm and has the line width W of 1 μm and the current i (I) is 100 mA, the strength H of the magnetic field B is 17.3 kA/m (=218 Oe) in the vicinity of the center 520*b* of the circle 529*a* meeting the inner edge of the confinement portion 530.

The magnetic field B is distributed along the inner circumferential edge of the confinement portion 530, in the vicinity of the center 520*b* of the circle 529*a* meeting the inner circumferential edge of the confinement portion 530. So, formed along the inner circumferential edge of the conductor 510 is a substantially half-roundly curved line of the magnetic field B having the same strength.

On the other hand, the magnetic field B is weak in the vicinity of the outer circumferential edge of the U-shaped portion of the conductor 510 because the magnetic flux lines are diffused as compared with the magnetic flux lines in the inner circumferential edge thereof. Thus, the strong magnetic field B can be selectively generated in the vicinity of the center 520*b* of the circle 529*a* meeting the inner circumferential edge of the confinement portion 530.

Further, as apparent from the formula above, the smaller the line width W of the confinement portion 530 is, the stronger magnetic field B can be generated in the vicinity of the confinement portion 530. For this reason, it is preferable that the line width W of the confinement section 530 be 1 μm or less. However, in cases where a large current i flows through the conductor 510, the confinement portion 530 is likely to be destroyed due to electric resistance.

For the prevention of the destruction, it is preferable that, in cases where the current i is, e.g., approximately 100 mA, the confinement section 530 has a cross sectional area larger than approximately 6400 nm². Moreover, in this case, it is also preferable that the outer circumferential length L be 20 μm or less because a confinement portion 530 having a long outer circumferential length L generates heat and is melted due to Joule heat generated when the current i flows.

The following explains examples of modifying the shape of the confinement portion 530 of the conductor 510, with reference to FIG. 37 through FIG. 44. Each of FIG. 37 through FIG. 44 is a plan view illustrating such a confinement portion 530. That is, the shape of the confinement portion 530 is not limited to the one explained above, and the confinement portion 530 may have each of the shapes illustrated in FIG. 37 through FIG. 44. Note that the bank-like portions 541 and 542, and the conductor 510 are illustrated by way of hatching in each plan view of FIG. 37 through FIG. 44.

Figure 37:
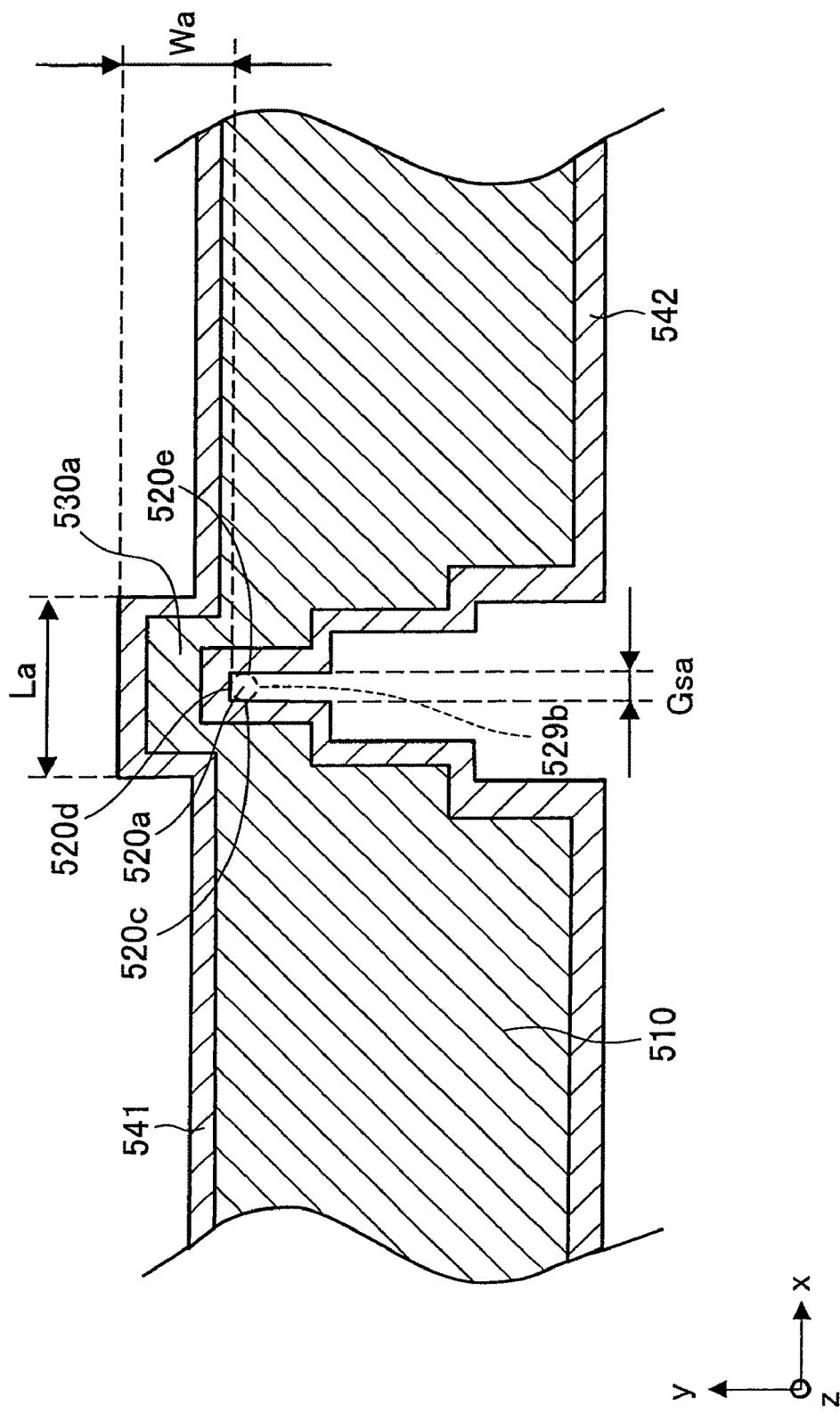
FIG. 37 is a/diagram illustrating an example of modifying the shape of the confinement portion.
Figure 44:
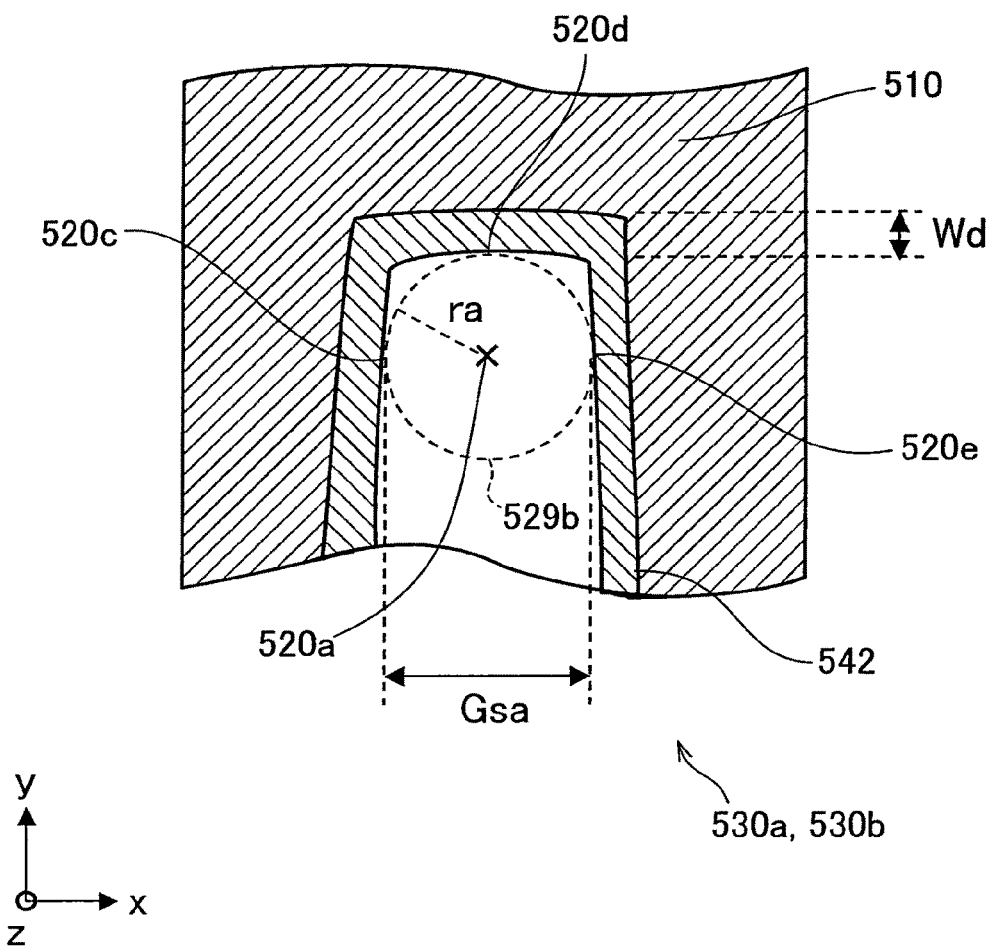
FIG. 44 is an enlarged view illustrating the inner circumferential edge of the confinement portion shown in FIG. 37.

For example, the confinement portion 530 may have such a shape as the shape of a confinement portion 530*a* shown in FIG. 37. Specifically, the confinement portion 530*a* is so formed that: the outer circumferential edge of the conductor 510 forms a substantially rectangle-like shape, and the inner circumferential edge thereof also forms a substantially rectangle-like shape. The confinement portion 530*a* has an outer circumferential length La that corresponds to the length, in the X direction, of a region which has a line width Wa and through which the current flows. FIG. 44 is an enlarged plan view illustrating the confinement portion 530*a* shown in FIG. 37.

As shown in FIG. 44, the confinement portion 530*a* has an inner circumferential length Gsa that corresponds to the diameter Gsa of a circle 529*b* meeting three sides 520*c*, 520*d*, and 520*e* constituting the inner circumferential edge of the confinement portion 530. In other words, the confinement portion 530*a* has the inner circumferential length Gsa that corresponds to a length twice as long as the distance ra from the center 520*a* of the circle 529*b* to the inner side edge of the conductor 510.

When the current i is supplied to the conductor 510 having the confinement portion 530*a* that has such a substantially rectangular shape, magnetic flux lines are converged to the center 520*a* of the circle 529*b* meeting the sides 520*c*, 520*d*, and 520*e* constituting the inner circumferential edge of the confinement portion 530*a*. Accordingly, the magnetic field is generated in the vicinity of the center 520*a* of the circle 529*b* meeting the confinement portion 530*a*, and is distributed in a rectangle-like manner, along the rectangle-shaped confinement portion 530*a*. Therefore, the magnetic field, which is generated in the confinement portion 530*a* having the rectangular shape, is distributed in the rectangle-like manner as compared with the magnetic field generated in the aforementioned confinement portion 530.

Figure 38:
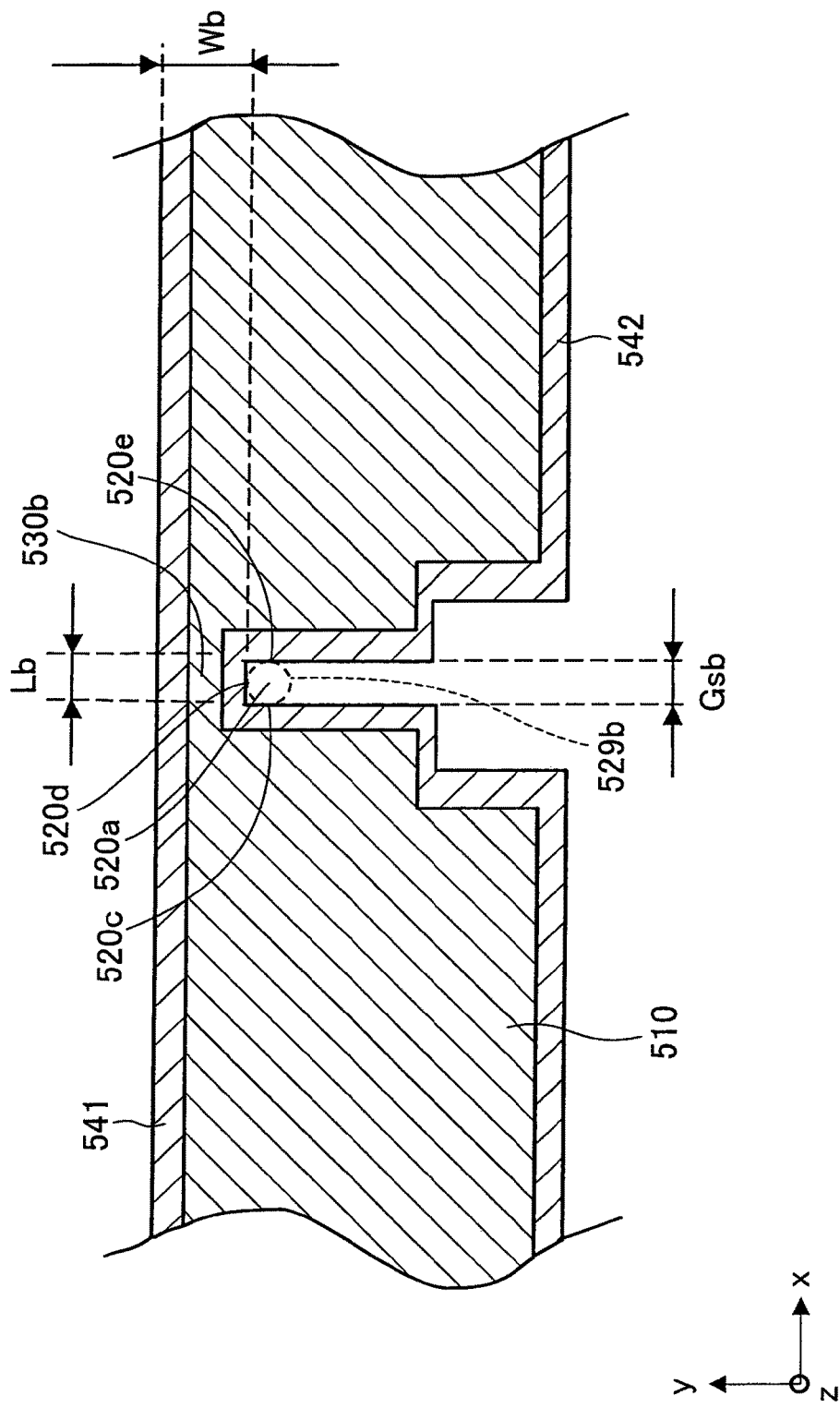
FIG. 38 is a diagram illustrating another example of modifying the shape of the confinement portion.

Further, the confinement portion 530 may have such a shape as the shape of a confinement portion 530*b* shown in FIG. 38. Specifically, the confinement portion 530*b* is so formed that the inner circumferential edge of the conductor 510 forms a substantially rectangle-like shape, and the outer circumferential edge thereof forms substantially straight line. Moreover, the confinement portion 530*c* shown in FIG. 39 has a line width Wc, which is defined in a similar manner that the line width Wa (see FIG. 37) is defined. Further, the confinement portion 530*b* has an inner circumferential length Gsb that corresponds to the diameter Gsb of a circle 529*b* meeting three sides 520*c*, 520*d*, and 520*e* constituting the inner circumferential edge of the confinement portion 530. In other words, the confinement portion 530*b* has the inner circumferential length Gsb that corresponds to a length twice as lone as the distance ra from the center 520*a* of the circle 529*b* to the inner circumferential edge of the conductor 510. Further, the outer circumferential length Lc of the confinement portion 530*c* is as long as the inner circumferential length Gsc thereof.

Figure 39:
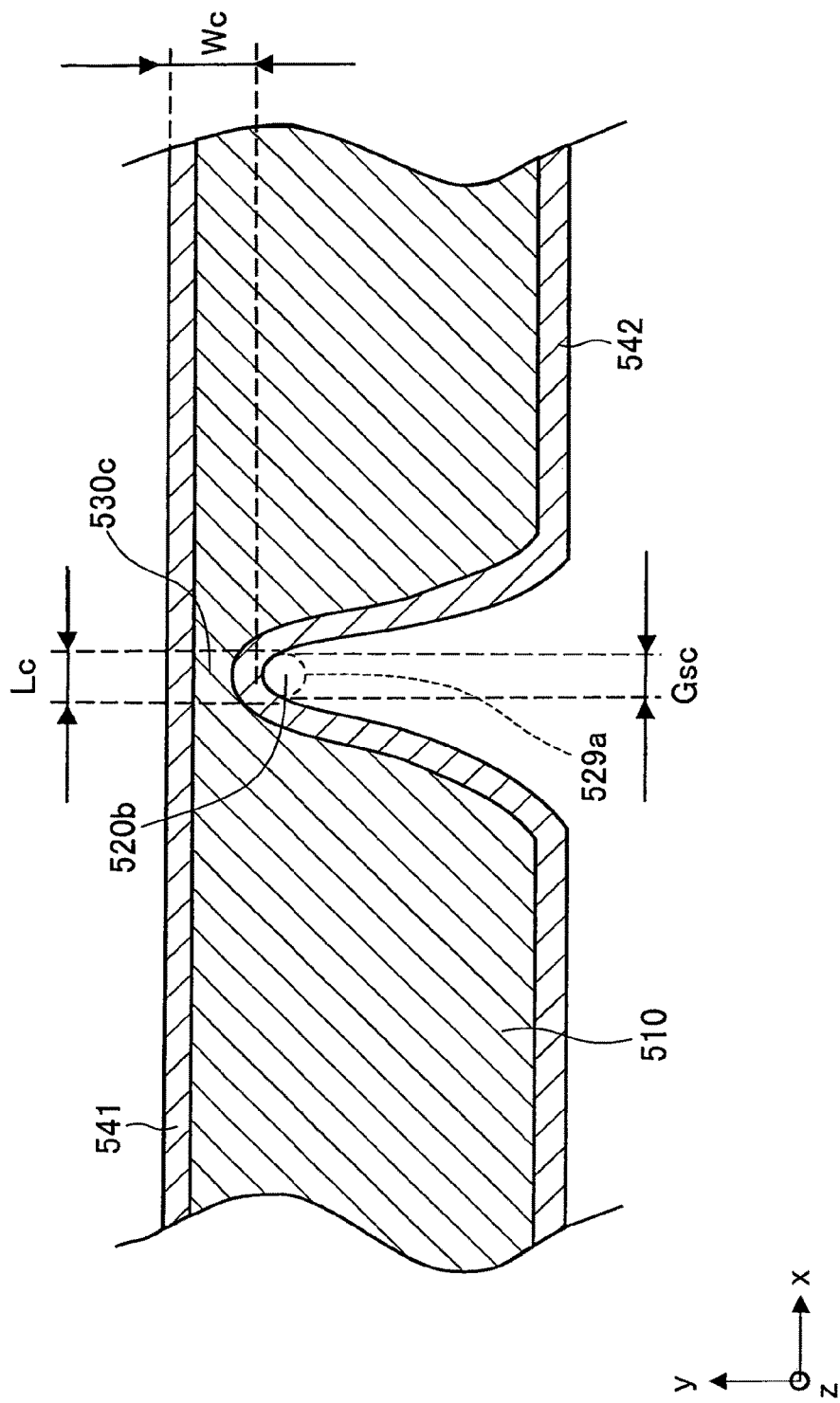
FIG. 39 is a diagram illustrating still another example of modifying the shape of the confinement portion.

Further, the confinement portion 530 may have such a shape as the shape of a confinement portion 530*c* shown in FIG. 39. Specifically, the confinement portion 530*c* is so formed that: the inner circumferential edge of the conductor 510 forms a substantially half-round-like shape, and the inner circumferential edge thereof forms substantially straight line. Moreover, the confinement portion 530*c* shown in FIG. 38 has a line width Wb, which is defined in a similar manner that the line width Wa (see FIG. 37) is defined. Further, the confinement portion 530*c* has an inner circumferential length Gsc that corresponds to the diameter Gsc of a circle 529*a* meeting three sides 520*c*, 520*d*, and 520*e* constituting the inner circumferential edge of the confinement portion 530. In other words, the confinement portion 530c has the inner circumferential length Gsc that corresponds to a length twice as lone as the distance r (see FIG. 34) from the center 520b of the circle 529a to the inner circumferential edge of the conductor 510. Further, the confinement portion 530b has a outer circumferential length Lc that is as long as the inner circumferential length Gsc thereof.

Figure 40:
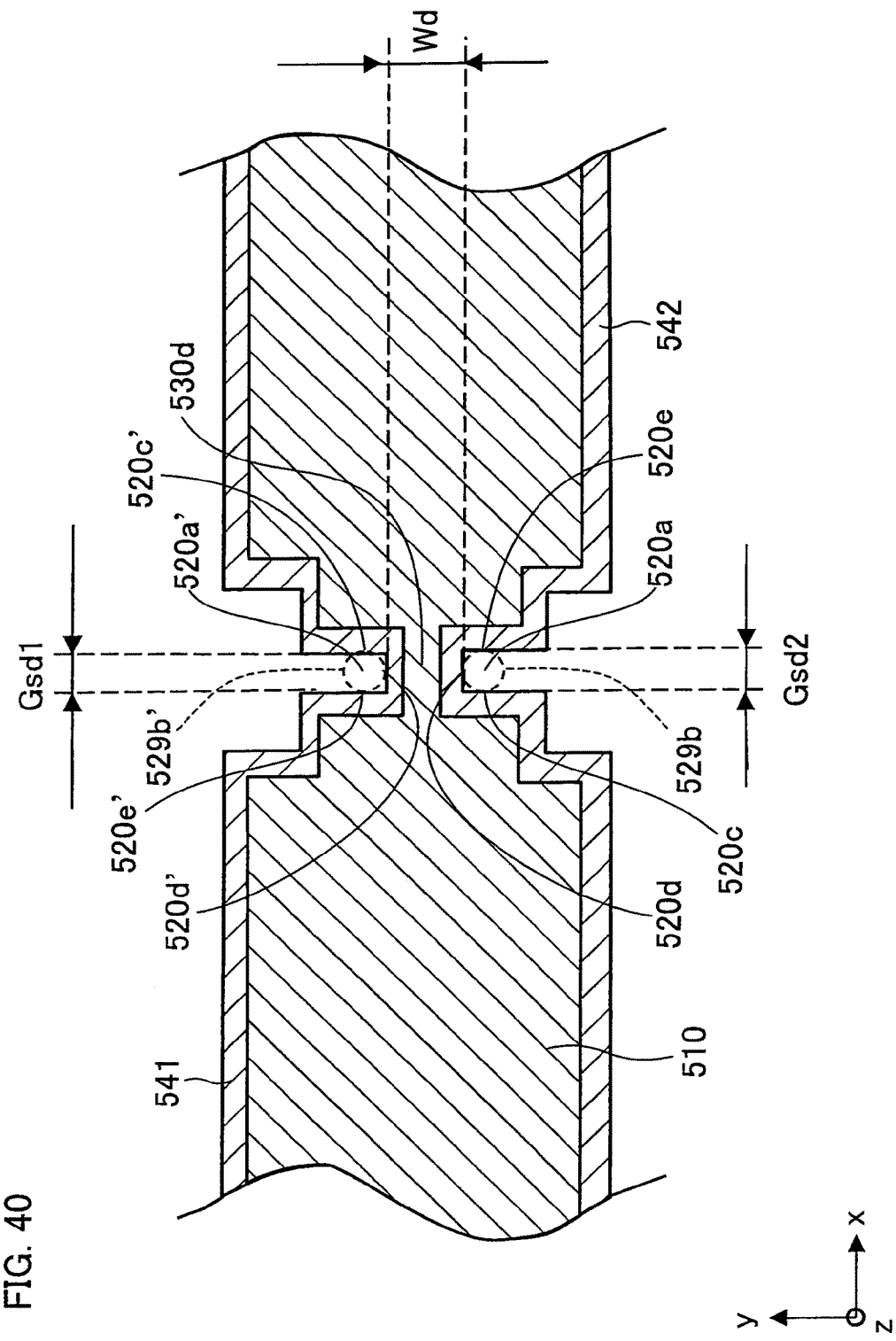
FIG. 40 is a diagram illustrating yet another example of modifying the shape of the confinement portion.

Further, the confinement portion 530 may have such a shape as the shape of a confinement portion 530d shown in FIG. 40. Specifically, the confinement portion 530d is so formed that the edge of the conductor 510 on the side of the bank-like portion 542 forms a substantially rectangle-like shape, and the other edge on the side of the bank-like portion 541 also forms a substantially rectangle-like shape, and a straight line connecting the respective centers of circles 529b and 529b' is parallel to the Y axis. The circle 529b meets the edge of the conductor 510 on the side of the bank-like portion 541, and the circle 529b' meets the other edge of the conductor 510, i.e., the edge on the side of the bank-like portion 542.

Further, such a confinement portion 530d has an inner circumferential length Gsd1 that is the length of the edge positioned on the side of the bank-like portion 541, and that corresponds to the diameter 2ra (see FIG. 44) of the circle 529b' meeting three sides 520c', 520d', and 520e' constituting the inner circumferential edge of the confinement portion 530d. Likewise, the confinement portion 530d has an inner circumferential length Gsd2 that is the length of the edge positioned on the side of the bank-like portion 542, and that corresponds to the diameter 2ra (see FIG. 44) of the circle 529b meeting three sides 520c, 520d, and 520e constituting the inner circumferential edge of the confinement portion 530d. Moreover, the confinement portion 530d has a line width Wd, which is defined in a similar manner that the line width Wa (see FIG. 37) is defined.

Further, the confinement portion 530d has an outer circumferential length Ld (not shown) which is as long as the shorter one of the inner circumferential lengths Gsd1 and Gsd2. Note that the inner circumferential lengths Gsd1 and Gsd2 may be the same or be different. Making a difference between the inner circumferential lengths Gsd1 and Gsd2 makes it possible to control a strength ratio of (i) the magnetic field B generated in the bank-like portion 541 within the confinement portion 530d, and (ii) the magnetic field B generated in the bank-like portion 542 within the confinement portion 530d. Note that the respective orientations of the magnetic fields B generated in the bank-like portions 541 and 542 are substantially antiparallel (reverse to each other).

Figure 41:
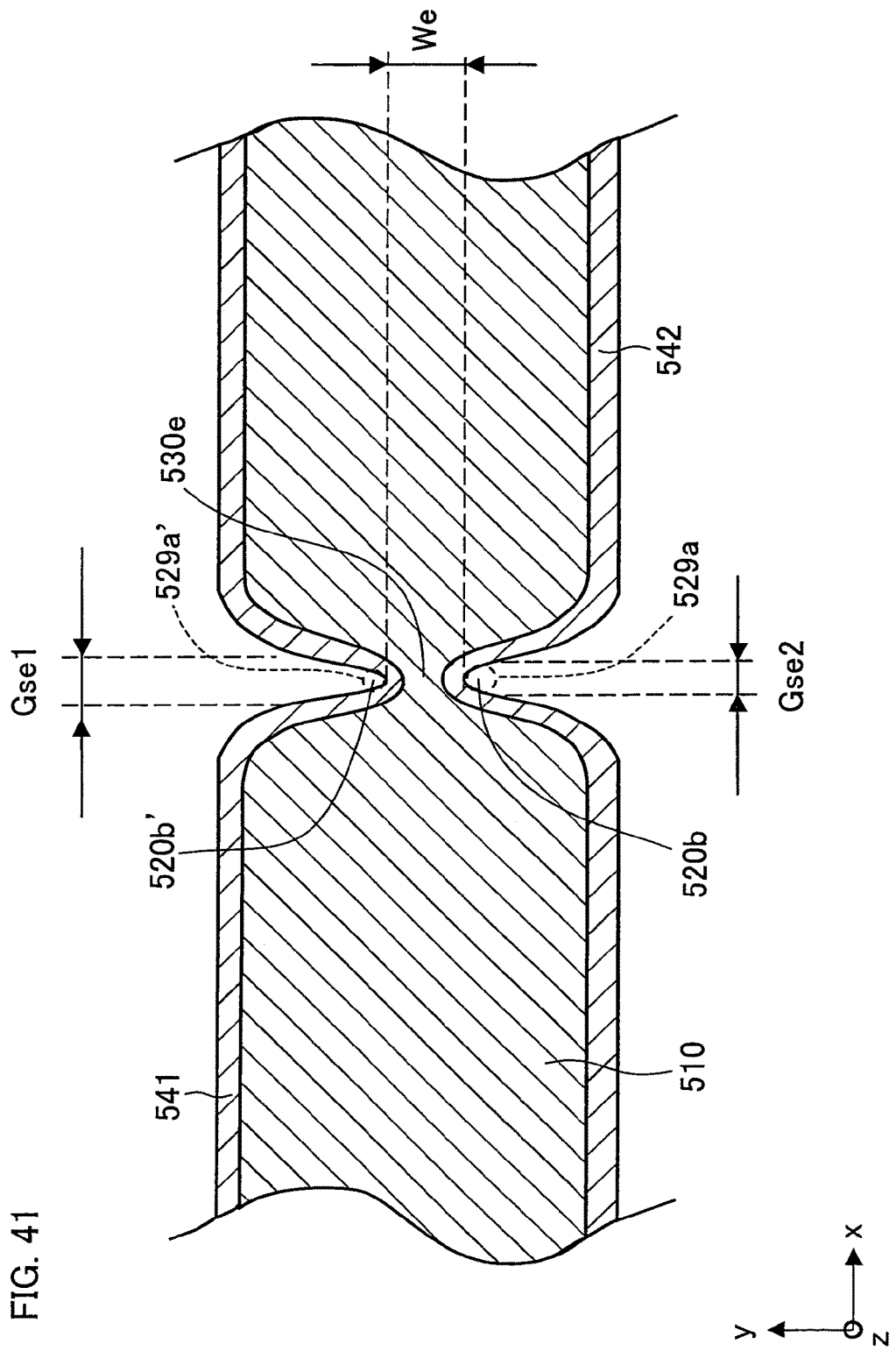
FIG. 41 is a diagram illustrating still another example of modifying the shape of the confinement portion.

Further, the confinement portion 530 may have such a shape as the shape of a confinement portion 530e shown in FIG. 41. Specifically, the confinement portion 530e may be so formed that the edge of the conductor 510 on the side of the bank-like portion 542 forms a substantially half-round-like shape, and the other edge on the side of the bank-like portion 541 forms a substantially half-round-like shape, and a straight line connecting the respective centers of circles 529a and 529a' is parallel to the Y axis. The circle 529a meets the edge of the confinement portion 530 on the side of the bank-like portion 542, and the circle 529a' meets the other edge of the confinement portion 530 on the side of the bank-like portion 541.

Further, such a confinement portion 530e has an inner circumferential length Gse1 that is the length of the edge positioned on the side of the bank-like portion 541, and that corresponds to the diameter 2r (see FIG. 34) of the circle 529a' meeting the inner circumferential edge of the confinement portion 530e. Likewise, the confinement portion 530e has an inner circumferential length Gse2 that is defined in a similar manner that the inner circumferential length Gse1 is defined. Note that the confinement portion 530e has a line width We, which is defined in a similar manner that the line width Wa (see FIG. 37) is defined.

Further, the confinement portion 530e has an outer circumferential length Le (not shown) which is as long as the shorter one of the inner circumferential lengths Gse1 and Gse2. Note that the inner circumferential lengths Gse1 and Gse2 may be the same or be different. Making a difference between the inner circumferential lengths Gse1 and Gse2 makes it possible to control a strength ratio of (i) the magnetic field B generated in the bank-like portion 541 of the confinement portion 530e, and (ii) the magnetic field B generated in the bank-like portion 542 of the confinement portion 530e. Note that the orientations of the respective magnetic fields B generated in the bank-like portions 541 and 542 are substantially antiparallel (reverse to each other).

Figure 42:
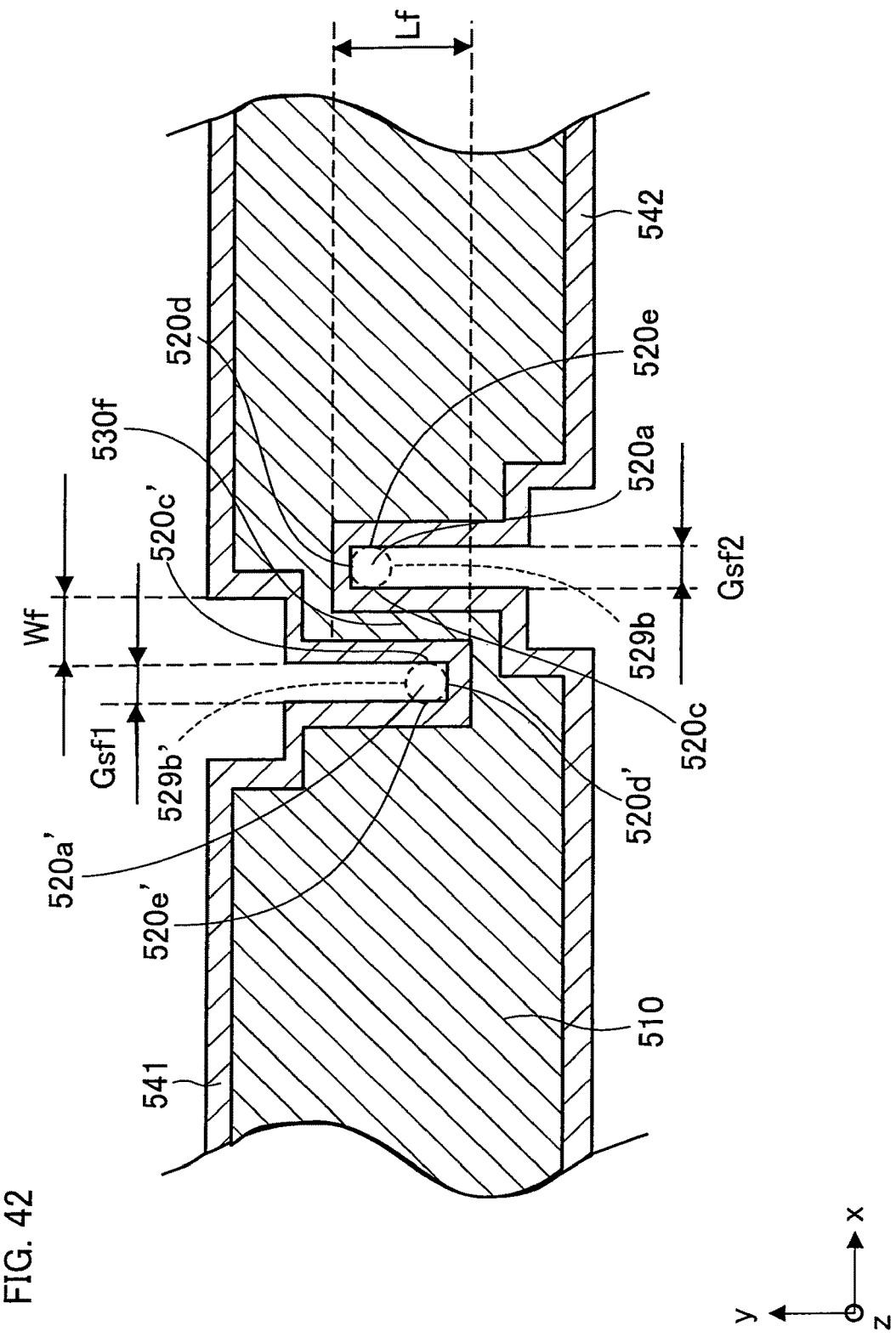
FIG. 42 is a diagram illustrating yet another example of modifying the shape of the confinement portion.
Figure 43:
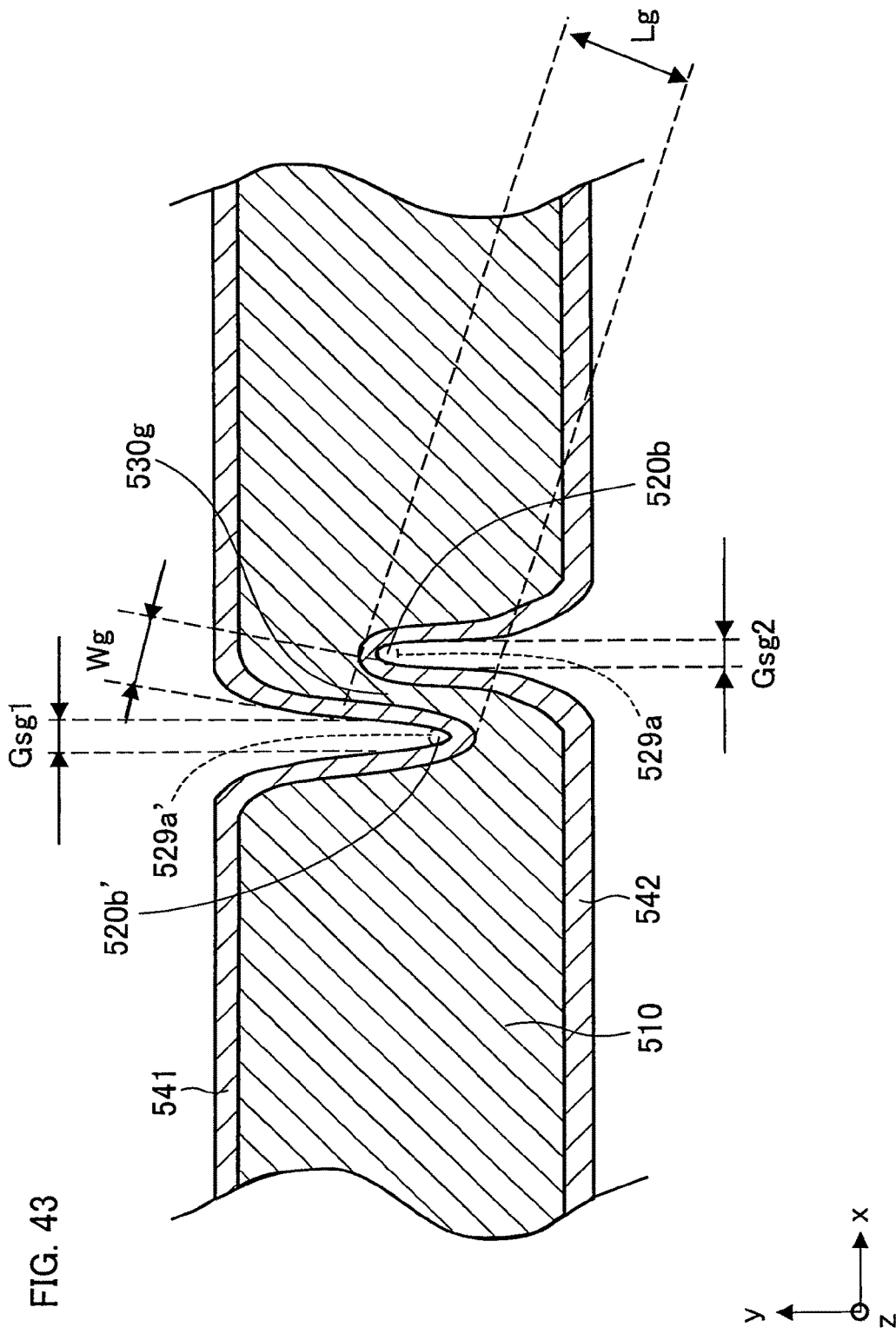
FIG. 43 is a diagram illustrating still another example of modifying the shape of the confinement portion.

Further, the confinement portion 530 may have such a shape as the shape of a confinement portion 530f shown in FIG. 42. Specifically, the confinement portion 530f may be so formed that the edge of the conductor 510 on the side of the bank-like portion 542 forms a substantially half-round-like shape, and the other edge on the side of the bank-like portion 541 also forms a substantially rectangle-like shape, and a straight line connecting the respective centers of circles 529b' and 529b is not parallel to the Y axis. The circle 529b meets the edge of the confinement portion 530f on the side of the bank-like portion 542, and the circle 529b' meets the other edge of the confinement portion 530f on the side of the bank-like portion 541.

Further, such a confinement portion 530f has an inner circumferential length Gsf1 that is the length of the edge positioned on the side of the bank-like portion 541 of the confinement portion 530f, and that corresponds to the length of the diameter of the circle 529b' meeting three sides 520c', 520d', and 520e' constituting the inner circumferential edge of the confinement portion 530f. Likewise, the confinement portion 530f has an inner circumferential length Gsf2 that corresponds to the length of the diameter of the circle 529b meeting three sides 520c, 520d, and 520e constituting the inner circumferential edge in the confinement portion 530f. Note that the confinement portion 530f has a line width Wf, which is defined in a similar manner that the line width Wa (see FIG. 37) is defined.

Further, the confinement portion 530f has an outer circumferential length Lf that corresponds to the length of a region which has a line width Wf and through which the current flows. Making a difference between the inner circumferential lengths Gsf1 and Gsf2 makes it possible to control a strength ratio of (i) the magnetic field B generated in the center 520a of the circle 529b on the side of the bank-like portion 541, and (ii) the magnetic field B generated in the center 520a' of the circle 529b' on the side of the bank-like portion 541. Note that the respective orientations of the magnetic fields B generated in the center 520a' of the circle 529b' and the center 520a of the circle 529b are substantially antiparallel (reverse to each other). Note also that the inner circumferential lengths Gsf1 and Gsf2 may be the same. Further, the confinement portion 530 may have such a shape as the shape of a confinement portion 530g shown in FIG. 43. Specifically, the confinement portion 530g may be so formed that the edge of the conductor 510 on the side of the bank-like portion 542 forms a substantially half-round-like shape, and the other edge on the side of the bank-like portion 541 forms substantially half-round-like shape, and a straight line connecting the respective centers of circles 529a and 529a' is parallel to the Y axis. The circle 529a meets the edge of the confinement portion 530g on the side of the bank-like portion 542, and the circle 529a' meets the other edge of confinement portion 530g on the side of the bank-like portion 541. Further, the confinement portion 530g has an inner circumferential length Gsg1 that is the length of the edge positioned on the side of the bank-like portion 541, and that corresponds to the length of the diameter of the circle 529a' meeting the inner circumferential edge of the confinement portion 530g.

Likewise, the confinement portion 530g has an inner circumferential length Gsg2 that is the length of the edge positioned on the side of the bank-like portion 542, and that corresponds to the length of the diameter of the circle 529a meeting the inner circumferential edge of the confinement portion 530g. Moreover, the confinement portion 530g has a line width Wg, which is defined in a similar manner that the line width W (see FIG. 37) is defined. Further, the confinement portion 530g has an outer circumferential length Lg that corresponds to the length of the region which has the width Wg, and through which the current flows.

Further, making a difference between the inner circumferential lengths Gsg1 and Gsg2 makes it possible to control a strength ratio of (i) the magnetic field B generated in the center 520b of the circle 529a on the side of the bank-like portion 542, and (ii) the magnetic field B generated in the center 520a' of the circle 529b' on the side of the bank-like portion 541. Note that the respective orientations of the magnetic fields B generated in the center 520a' of the circle 529b' and the center 520a of the circle 529b are substantially anti-parallel (reverse to each other). Note also that the inner circumferential lengths Gsg1 and Gsg2 may be the same or be different.

Explained next is (i) excitation of the surface plasmon Dsp, and (ii) the generation of the near field NF, with reference to FIG. 35 and FIG. 36. The excitation and the generation are caused when the light Pi is irradiated from (i) the laser generating source 561 serving as a light source, to (ii) the vicinity of the confinement portion 530 of the conductor 510.

Figure 35:
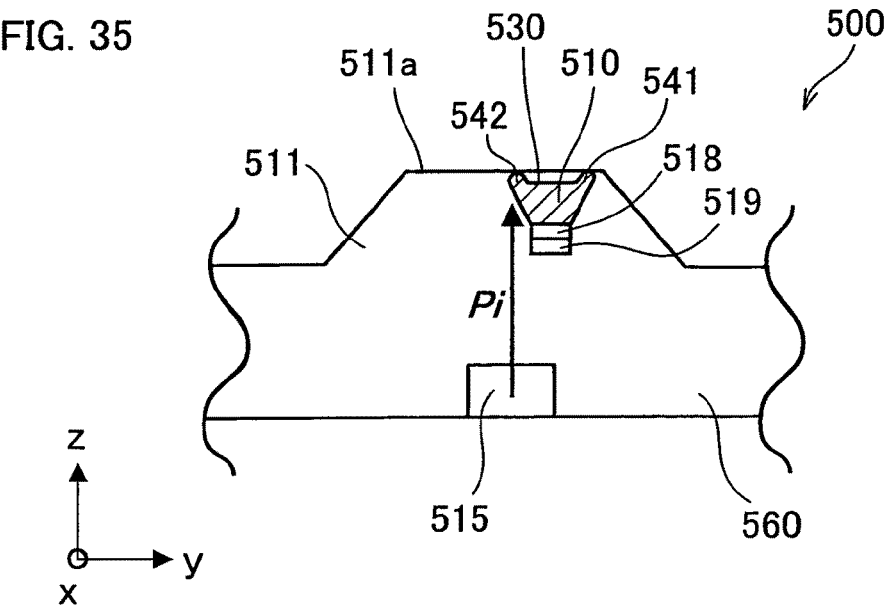
FIG. 35 is a cross sectional view that illustrates the electromagnetic field generating element shown in FIG. 25, and that is taken along line Cy.

FIG. 35 is a cross sectional view that illustrates the present element 500 shown in FIG. 25, and that is taken along line Cy. FIG. 36 is an enlarged view illustrating (i) the vicinity of the confinement portion 530 of the present element 500 shown in FIG. 35, and (ii) how the light Pi is irradiated or propagated to the confinement portion 530 of the conductor 510. The light Pi irradiated from the laser generating source 561 (see FIG. 25) is reflected by the optical element 515 such as a prism, and the light Pi reflected to a region within a distance of 10 μm or less from the confinement portion 530 is propagated to the confinement portion 530 via the conductor 510. Thus, the light Pi is irradiated to the confinement portion 530.

The irradiation of the light Pi to the confinement portion 530 causes excitation of the surface plasmon Dsp in the interface 510a between the substrate 560 and the conductor 510. The surface plasmon Dsp thus excited has an electric field vector Ve that is substantially perpendicular to the interface 510a. This causes generation of the near field NF in the confinement portion 530. Note that, the wording "near field NF" encompasses (i) the surface plasmon Dsp (surface-plasmon polariton), which is a surface electromagnetic wave generated on a surface of a material and generated in the vicinity of the interface 510a; (ii) the localized surface plasmon Dlsp (localized surface-plasmon polariton) which is locally excited in a solitary fine particle, a tip of a minute metal needle, etc.; and the like.

Figure 36:
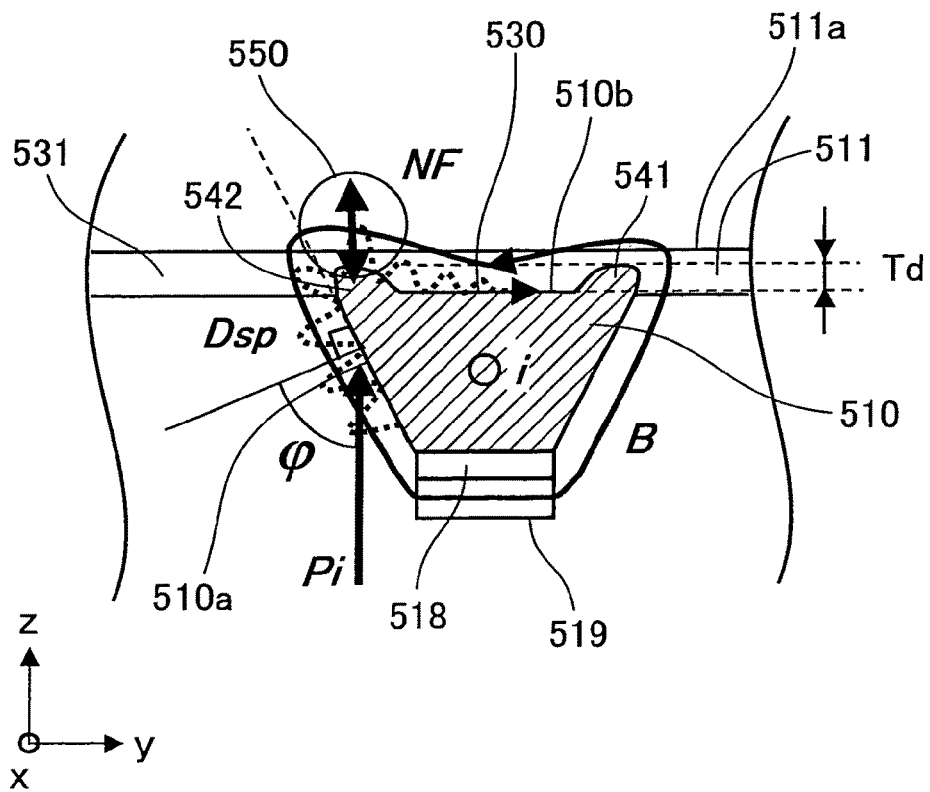
FIG. 36 is an enlarged view illustrating (i) the vicinity of the conductor of the electromagnetic field generating element shown in FIG. 35, and (ii) how the light is irradiated to the confinement portion of the conductor.

Note that, for ease of explanation, FIG. 36 illustrates that the near field NF is generated merely in the bank-like portion 542 of the confinement portion 530; however, the near field NF is actually generated also in the bank-like portion 541 of the confinement portion 530. The near field NF generated on the inner circumferential side of the confinement portion 530 has strength different from the strength of the near field NF generated on the outer circumferential side of the confinement portion 530. Further, when only either of the bank-like portions 541 or 542 is provided, it is preferable that the confinement portion 530 have at least the bank-like portion 542. This is because magnetic field generated when the bank-like portion 542 is provided is stronger than magnetic field generated when the bank-like portion 541 is provided, and because the strength of near field NF described below is accordingly increased.

It is preferable that the interface 510a between the confinement portion 530 of the conductor 510 and the substrate 560 never cross at the right angle with the reference surface 511a of the projecting portion 511. In other words, as shown in FIG. 36, it is preferable that the conductor 510 have a surface that is not parallel to the optical axis of the light Pi irradiated or propagated to the interface 510a positioned in the edges constituting the confinement portion 530 of the conductor 510.

This allows increase of an area of the interface 510a which is between the conductor 510 and the substrate 560, and in which the light Pi received by the conductor 510 is converted into the surface plasmon Dsp. This allows strength increase of the surface plasmon Dsp, which is to be propagated to the bank-like portion 542 formed in the edge constituting the confinement portion 530 of the conductor 510.

With this, a near field NF having desired strength is generated in the bank-like portion 542 by irradiating the light Pi to the interface 510a, which is between the conductor 510 and the substrate 560, and in which the light Pi is converted into the surface plasmon Dsp. This allows simplification of alignment of the respective optical axes of the laser generating source 561 and a desired electromagnetic field generation region 550. Accordingly, reliability improvement and productivity improvement of the present element 500 is realized.

Further, the implant of the conductor 510 in the substrate 560 allows formation of the interface 510a with very tight combination secured between the conductor 510 and the substrate 560. This allows restraint of the scattering of the surface plasmon Dsp in the inward direction of the interface 510a. Accordingly, propagation efficiency of the surface plasmon Dsp is improved. This allows improvement in efficiency of generating the near field NF in the bank-like portion 542 formed in the edge constituting the confinement portion 530 of the conductor 510. The efficiency of generating the near field NF is efficiency with respect to the strength of the light Pi irradiated from the laser generating source 561.

The light Pi irradiated or propagated to the bank-like portion 542 causes excitation of the localized surface plasmon Dlsp in the bank-like portion 542. The localized surface plasmon Dlsp thus excited (hereinafter, also referred to as simply "localized surface plasmon") is coupled with the surface plasmon Dsp propagated via the interface 510a, with the result that the near field NF is strengthened in the electromagnetic field generation region 550.

Specifically, the electric field is substantially perpendicular to the surface of the metal or the interface 510a between the metal and the dielectric material. This causes the electric field to be concentrated in the projecting structure of the metal, with the result that the surface plasmon Dsp is strengthened in the bank-like portions 541 and 542. Further, when the projecting structure has a nanometer size, the localized surface plasmon Dlsp is excited in the surface of the projecting structure or the interface 510a, unlike when the projecting structure has a bulk size.

Further, as described above, it is preferable that, for the attainment of the tighter combination between the conductor 510 and the substrate 560, the combining layer be provided between the conductor 510 and the substrate 560 made of an insulator oxide or an insulator nitride. In cases where a second metal film 518 is formed between the conductor 510 and the substrate 560, the second metal film 518 reflects, to the bank-like portion 542 again, a component of the surface plasmon Dsp, which is propagated from the conductor 510 in the direction opposite to the bank-like portion 542.

With this, the surface plasmon Dsp thus reflected by the second metal film 518 allows increase of the surface plasmon Dsp in the bank-like portion 542. It is preferable that the second metal film 518 be made of a metal having a plasma oscillation frequency higher than that of the metal of which the conductor 510 is made.

On the other hand, in cases where a soft magnetic layer 519 is provided between the conductor 510 and the substrate 560, the soft magnetic layer 519 allows convergence of the magnetic flux which is generated in the confinement portion 530 by the current i supplied to the conductor 510. This causes increase of the magnetic flux density in the vicinity of the confinement portion 530, with the result that the strong magnetic field B can be obtained. Moreover, in cases where the soft magnetic layer 519 is a soft magnetic insulator made of ferrite or the like, generation of an eddy current due to a change of the magnetic field B can be restrained in the soft magnetic layer 519. Accordingly, electric field loss in the high frequency region can be reduced, with the result that the strong magnetic field B can be obtained in the vicinity of the confinement portion 530.

Further, in cases where the soft magnetic layer 519 is a conductive metal layer made of a conductive material, an insulating layer (not shown) is provided between the soft magnetic layer 519 and the conductor 510 so as to block the current i from being injected from the conductor 510 to the soft magnetic layer 519. This makes it possible to prevent the current i from leaking from the conductor 510 to the soft magnetic layer 519, and accordingly allows restraint of reduction of the magnetic field B generated in the vicinity of the confinement portion 530. That is, the insulating layer allows prevention of the leaking of the current i to the soft magnetic layer 519, so that magnetic field loss can be reduced and the strong magnetic field B is acquired by the conductive metal layer. Further, it is preferable that the insulating layer have a film thickness of 100 nm or thinner.

As described above, the projecting portion 511 projects higher than the surface of the substrate 560, and the bank-like portions 541 and 542 of the confinement portion 530 is so formed that the respective fronts of the bank-like portions 541 and 542 are positioned within a distance of 50 nm or less from the reference surface of the projecting portion 511.

With this, the following effect can be obtained when the near field NF generation region (electromagnetic field generation region 550) selectively comes close to (i) a surface, facing the near field NF generation region, of a sample; or (ii) a surface, facing the near field NF generation region, of a medium. That is, the near field NF is restrained from being generated, due to the scattering light or the leaking light (stray light) within the element, in a region other than the selected region. This makes it possible to selectively detect scattering light Ps or reflected light Pr, each of which is scattered or reflected by a region of the surface of the target sample or a region of the surface of the target medium, and each of which is generated by the interplay with the near field NF.

For the excitation of the surface plasmon Dsp in the interface 510a between the conductor 510 and the substrate 560, it is desirable that the light Pi be p wave whose electric field vector Ve is perpendicular to the interface 510a. The interface 510a is positioned in the vicinity of the confinement portion 530.

Figure 45:
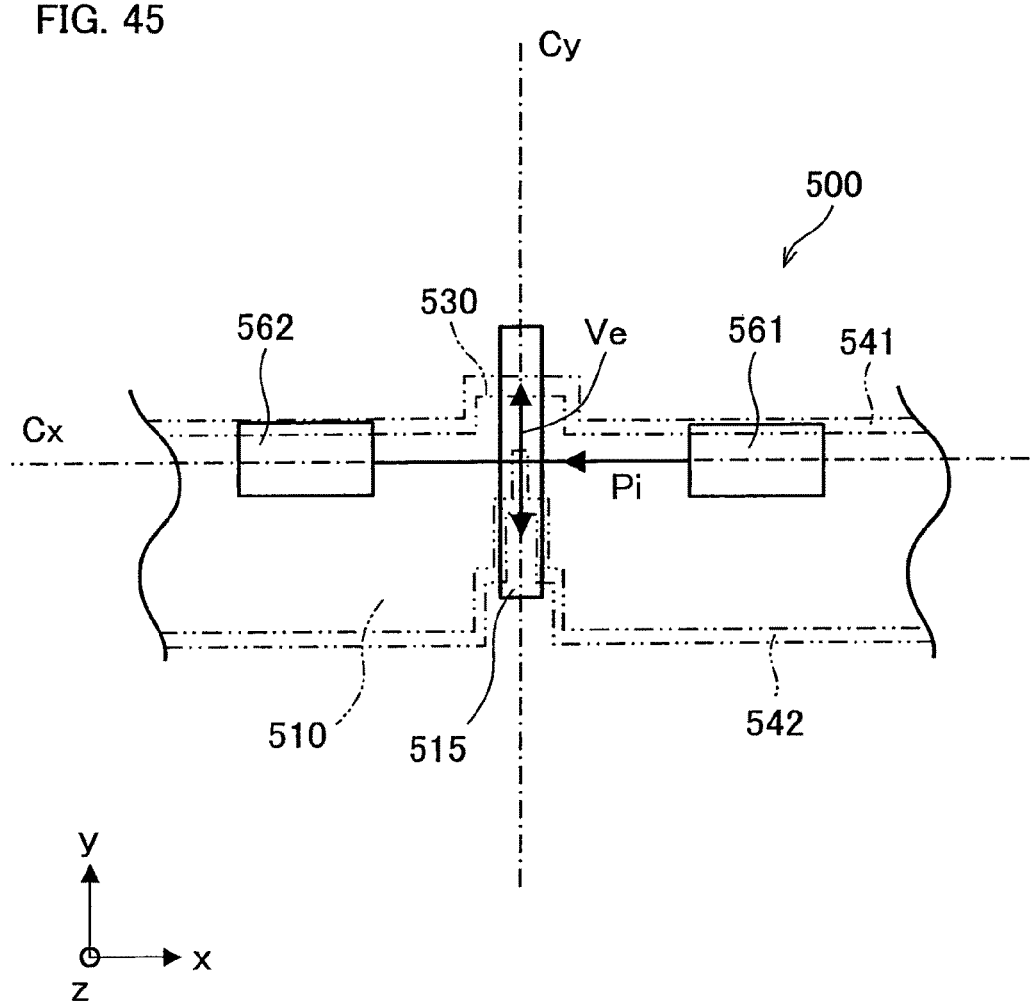
FIG. 45 is an explanatory diagram illustrating layout of a laser generating source, an optical element, and a light detector in the electromagnetic field generating element.
Figure 46:
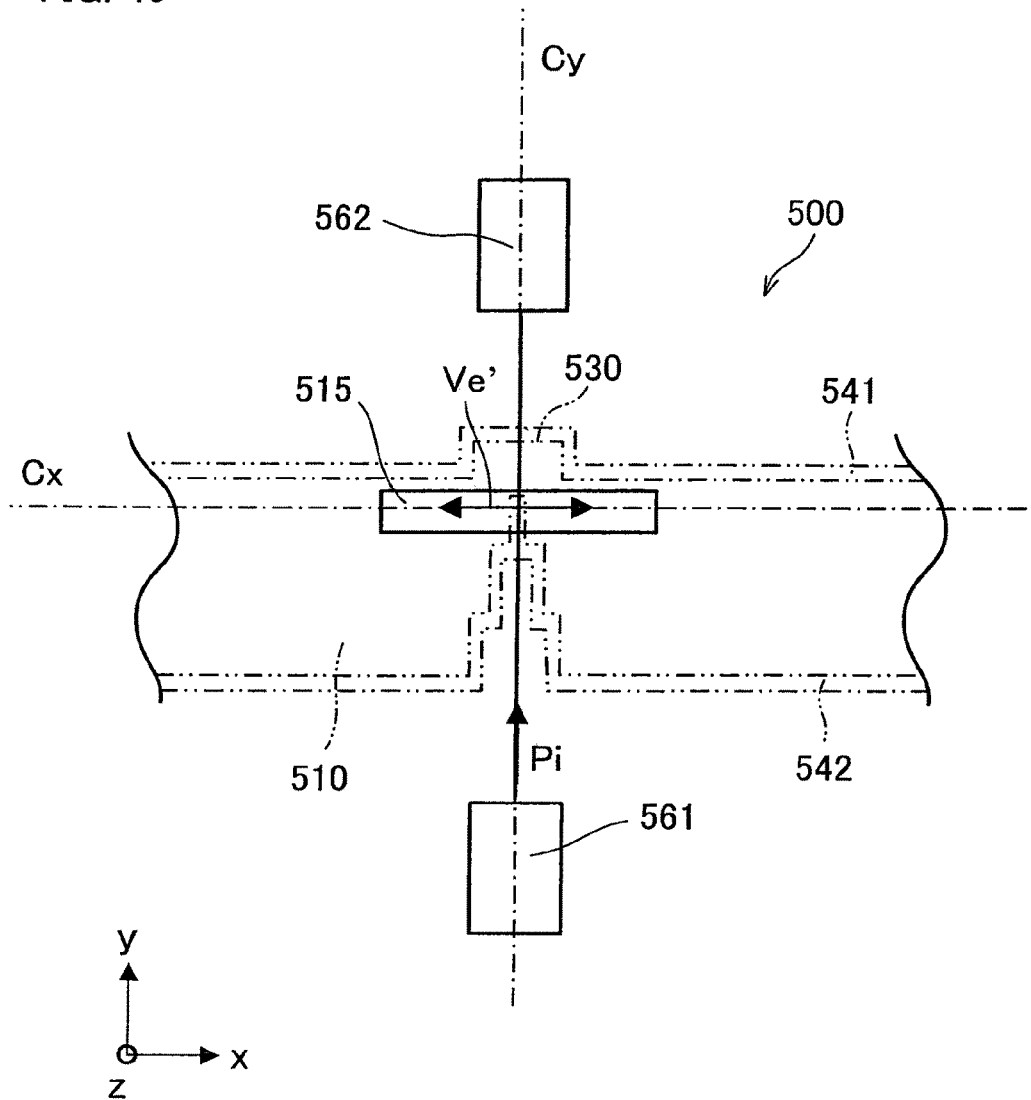
FIG. 46 is an explanatory diagram illustrating another layout of the laser generating source, the optical element, and the light detector in the electromagnetic field generating element.
Figure 47:
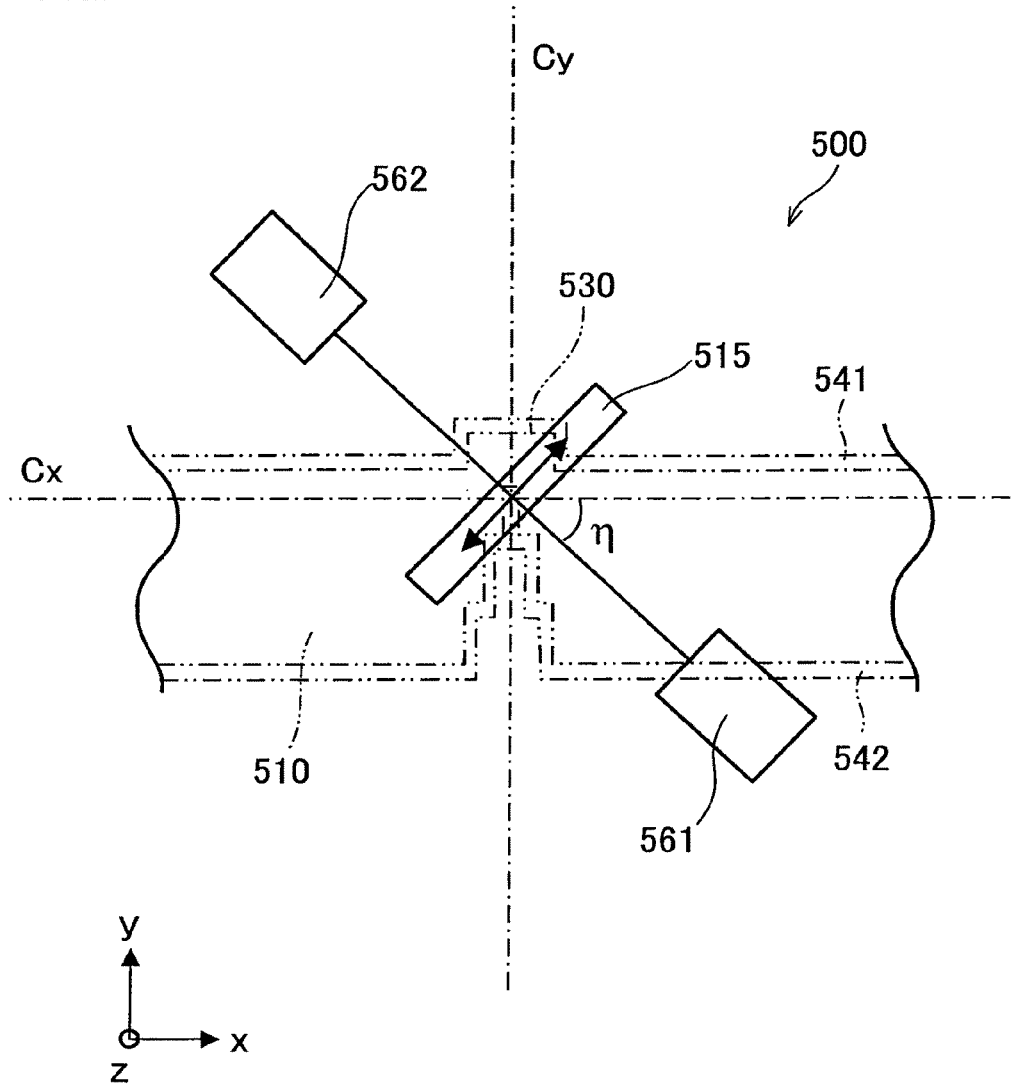
FIG. 47 is an explanatory diagram illustrating still another layout of the laser generating source, the optical element, and the light detector in the electromagnetic field generating element.

Each of FIG. 45 through FIG. 47 is a perspective view illustrating how the laser generating source 561, the optical element 515, and the light detector 562 are provided in the present element 500 shown in FIG. 25, when viewed from the Z axis positive direction. In FIG. 45, the conductor 510 formed in the substrate 560 is illustrated by way of chain double-dashed line, and each of the Cx line and the Cy line is illustrated by way of dashed line.

As described above, in the substrate 560 of the present element 500, the laser generating source 561, the optical element 515, and the light detector 562 are provided on the surface opposite to the surface in which the conductor 510 is formed. The optical element 515 reflects the light Pi such that the light Pi is irradiated or propagated to the confinement portion 530 of the conductor 510. The light detector 562 detects the output of the light Pi.

Here, the laser generating source 561 generates TE mode light. Therefore, when such light Pi coming from the laser generating source 561 is reflected by the optical element 515, the propagation direction of the light Pi is changed to the Z axis positive direction.

On this occasion, the polarization light of the light Pi is almost retained in cases where the confinement portion 530 has a substantially rectangular shape (see FIG. 37 and so on). Therefore, the light Pi to be propagated has an electric field vector Ve substantially perpendicular to the side 520d of the inner circumferential edge of the confinement portion 530. This allows selective excitation of the surface plasmon in the interface 510a (see FIG. 36) whose edge corresponds to the side 520d of the inner circumferential edge. Accordingly, the near field NF is selectively generated in the bank-like portion 542 adjacent to the side 520d of the inner circumferential edge. Note that this is not only the layout that the laser generating source 561, the optical element 515, and the light detector 562 are provided, and the layout may be as follows.

FIG. 46 illustrates another layout in which the laser generating source 561, the optical element 515, and the light detector 562 are provided. The layout is obtained by clockwisely rotating the layout shown in FIG. 45 by 90°. In the layout, the light Pi in the TE mode is irradiated from the laser generating source 561, and is reflected by the optical element 515 such that the propagation direction of the light Pi is changed to the Z axis positive direction; however, the light Pi has an electric field vector Ve' substantially perpendicular to the sides 520c and 520e of the inner circumferential edge of the confinement portion 530. This allows the surface plasmon Dsp to be selectively excited in the interface 510a (see FIG. 36) whose edges correspond to the sides 520c and 520e of the inner circumferential edge. Accordingly, the near field NF is selectively generated in the bank-like portion 542 adjacent to the sides 520c and 520e of the inner circumferential edge.

FIG. 47 illustrates still another layout in which the laser generating source 561, the optical element 515, and light detector 562 are provided such that one optical axis (see FIG. 45) determined by the laser generating source 561, the optical element 515, and light detector 562 crosses with the line Cx of the confinement portion 530 at an angle η. By controlling the angle η upon manufacturing the present element 500, the polarization direction of the light Pi coming into the confinement portion 530 can be changed. This allows the surface plasmon Dsp to be selectively excited in the interface 510a (see FIG. 36) whose edges correspond to the sides 520c, 520d, and 520e of the inner circumferential edge. Accordingly, the near field NF is selectively generated in the bank-like portion 542 adjacent to the any sides 520c, 520d, and 520e of the inner circumferential edge.

The confinement portion 530 needs to have a thickness smaller than an intake length d of the surface plasmon Dsp such that the surface plasmon Dsp is excited in the vicinity of the projecting portion 511 facing the interface 510a between the substrate 560 and the conductor 510. Here, the wording "intake length d of the surface plasmon" refers to a length from the interface 510a to a location in which an electric field component falls within a range from 1 to 0.368 (=$e^{-1}$), in the case where the electric field component is 1 at the boundary surface to which the light is irradiated.

A complex refractive index condition for generating the surface plasmon Dsp, and the intake length d of the surface plasmon Dsp are expressed by using: (i) a complex refractive index Nmetal of the metal (conductor 510 in this case), (ii) a complex refractive index Ni of the layer (the substrate 560 in this case) meeting the metal, (iii) a wavelength λ of the irradiated light (the light Pi in this case), and (iv) an incident angle φ of the light. Here, the complex refractive index Nmetal of the metal can be expressed by the following formula: Nmetal=nmetal+ikmetal, where "nmetal" indicates the refractive index of the metal, the refractive index being a real part; and "kmetal" indicates an extinction coefficient of the metal, the extinction coefficient being an imaginary part; and "i" indicates an imaginary unit. The complex refractive index Ni of the layer meeting the metal is expressed by the following formula: Ni=ni+iki (ki≦ni≦0), where "ni" indicates a refractive index that is a real part, and "ki" indicates a coefficient that is an imaginary part, and "i" indicates an imaginary unit.

The extinction coefficient ki is 0 because the substrate 560 is transparent for the light Pi. So, the complex refractive index condition for generating the surface plasmon Dsp is expressed by the following formula 2:

$$n_i^2 \sin^2\phi - k_{metal}^2 + n_{metal}^2 < O$$

Meanwhile, in cases where the above complex refractive index condition for generating the surface plasmon Dsp is realized, the intake length d of the surface plasmon Dsp can be expressed by the following formula 3:

$$d = \frac{\lambda}{2\pi} \sqrt{k_{metal}^2 + 2n_{metal}k_{metal} - n_{metal}^2 - n_i^2 \sin^2\phi}$$ [Formula 3]

For example, see a case where the wavelength λ of the light Pi is 780 nm, the incident angle φ of the light Pi is 85°, and the refractive index ni of the substrate 560 is 2.3 (e.g. ZnS). In this case, when the conductor 510 is made of a metal whose refractive index nmetal is less than 1 and whose extinction coefficient kmetal is larger than 3, the intake length d of the surface plasmon Dsp is approximately 450 nm. Specific examples of such a metal include Au and Ag. On the other hand, when the conductor 510 is made of a metal whose refractive index nmetal is larger than 1 and whose extinction coefficient kmetal is larger than 3, the intake length d of the surface plasmon Dsp is approximately 770 nm, which is on the order of the wavelength of the light Pi. Specific examples of such a metal include Ti, Pt, Al, and Pd.

Further, see a case where the wavelength λ of the light Pi is 400 nm, and the incident angle φ of the light Pi is 85°. In this case, when the conductor 510 is made of Au or Ag, the intake length d of the surface plasmon Dsp is approximately 230 nm. Meanwhile, when the conductor 510 is made of Ti, Pt, Al, or Pd, the intake length d of the surface plasmon Dsp is approximately 395 nm. Here, the confinement portion 530 has such a line width W by which the area of the cross sectional surface of the confinement portion 530 is approximately 6400 nm$^2$ or larger. This is to prevent the confinement portion 530 from being destroyed due to the supply of the current i to the conductor 510.

The following exemplifies the minimum line width W. See the case where: the confinement portion 530 has a rectangular cross sectional shape, and the wavelength λ of the light Pi is 780 nm, and the incident angle φ of the light Pi is 85°, and the refractive index ni of the substrate 560 is 2.3 (e.g. ZnS). In this case, when the conductor 510 is made of Au or Ag, the confinement portion 530 has a line width W of approximately 15 nm. On the other hand, when the conductor 510 is made of Ti, Pt, Al, or Pd, the confinement portion 530 has a line width W of approximately 9 nm. In the meanwhile, see the case where the wavelength λ of the light Pi is 400 nm and the incident angle φ of the light Pi is 85°. In this case, when the conductor 510 is made of Au or Ag, the confinement portion 530 has a line width W of approximately 28 nm. On the other hand, when the conductor 510 is made of Pt, Al, or Pd, the confinement portion 530 has a line width W of approximately 17 nm.

When the light Pi is irradiated to the confinement portion 530 having such a thickness shorter than the intake length d of the surface plasmon Dsp, the surface plasmon Dsp is excited in (i) the interface 510a between the confinement portion 530 and the substrate 560, and (ii) an interface 510b opposite to the interface 510a. This causes generation of the near field NF in the vicinity of the projection section 511 facing the interface 510a between the confinement portion 530 and the substrate 560.

Further, the following effect is attained in cases where the projecting portion 511 positioned in the vicinity of the interface 510a is coated with a coating layer 131 made of a material having the same refractive index as the substrate 560 has. That is, a phase gap becomes less, at least in the confinement portion 530, between (i) the surface plasmon Dsp excited in the interface 510a between the confinement portion 530 and the substrate 560, and (ii) the surface plasmon Dsp excited in the interface 510b between the confinement portion 530 and the coating layer 131. This allows efficient resonance of (i) the surface plasmon Dsp excited in the interface 510a between the confinement portion 530 and the substrate 560, and (ii) the surface plasmon Dsp excited in the interface 510b between the confinement portion 530 and the coating layer 131. Accordingly, a stronger near field NF is generated in the projecting portion 511 coated with the coating layer 131.

As described above, in the present element 500, the supply of the current i to the conductor 510 causes generation, in the vicinity of the confinement portion 530, of the magnetic field B substantially perpendicular to the surface of the projecting portion 511. Moreover, the irradiation or the propagation of the light Pi from the substrate 560 to the confinement portion 530 causes excitation of the surface plasmon Dsp in the interface 510a between the confinement portion 530 and the substrate 560. Accordingly, the near field NF, which has the electric field vector Ve substantially perpendicular to the surface of the projecting portion 511, is generated in the electromagnetic field generation region 550 (see FIG. 36) of the projecting portion 511. The electromagnetic field generation region 550 is positioned in the vicinity of the confinement portion 530.

According to the structure, unlike the conventional techniques, the present element 500 of the present embodiment does not need to use the yoke extension section so as to generate the magnetic field in a desired location, so that the present element 500 allows restraint of magnetic field reduction or restraint of magnetic field delay. As such, the present element 500 suitable for the high frequency magnetic recording/reproduction can be provided.

Further, the magnetic field B is generated in the vicinity of the confinement portion 530 by supplying the current to the conductor 510, and the near field NF is generated in the vicinity of the confinement portion 530 by irradiating the light Pi to the confinement portion 530. In other words, the present element 500 allows generation of the magnetic field B and the near field NF in substantially the same location. As such, the use of the conductor 510 having such a simple structure makes it possible to provide the present element 500 allowing generation of the magnetic field B and the near field NF in a desired location.

Not only the present element 500 can generate the magnetic field B and the near field NF in substantially the same location, i.e., in the vicinity of the confinement portion 530, but also the present element 500 can control whether or not the magnetic field B is to be generated, or whether or not the near field NF is to be generated.

Explained next is another example of modifying (i) the projecting portion 511 formed on the substrate 560, and (ii) the confinement portion 530 in the projecting portion. The explanation is made with reference to FIG. 48 through FIG. 55, each of which is an enlarged cross sectional view that illustrates the confinement portion 530 shown in FIG. 25 when viewed in the Y direction, and that is taken along the line Cx. Note that materials having the equivalent functions as to those shown in the aforementioned drawings will be given the same reference symbols, and explanation thereof will be omitted here.

Figure 48:
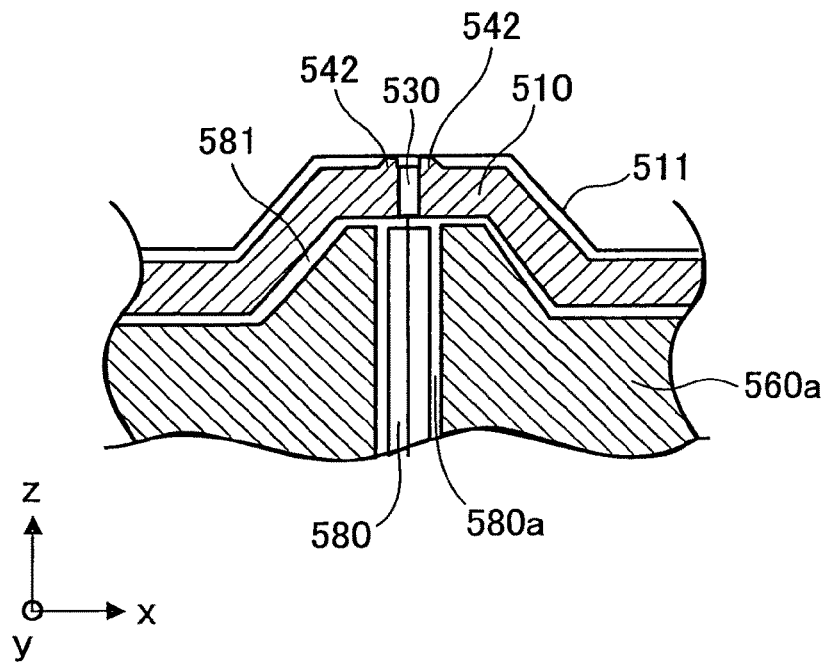
FIG. 48 is a cross sectional view illustrating an electromagnetic field generating element using an opaque substrate having a hole.
Figure 49:
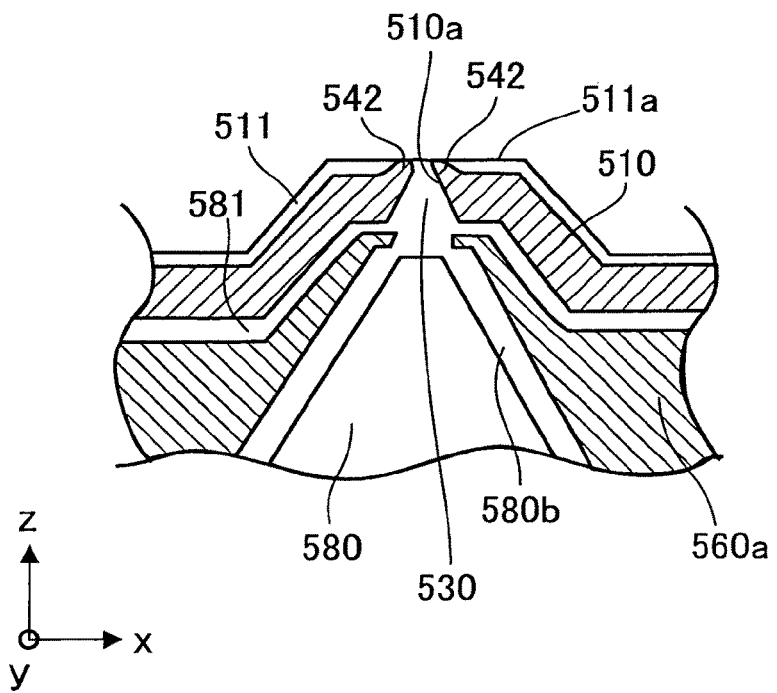
FIG. 49 is a cross sectional view illustrating an electromagnetic field generating element using an opaque substrate having a hole whose shape is different from that of the hole of the electromagnetic field generating element shown in FIG. 48.
Figure 50:
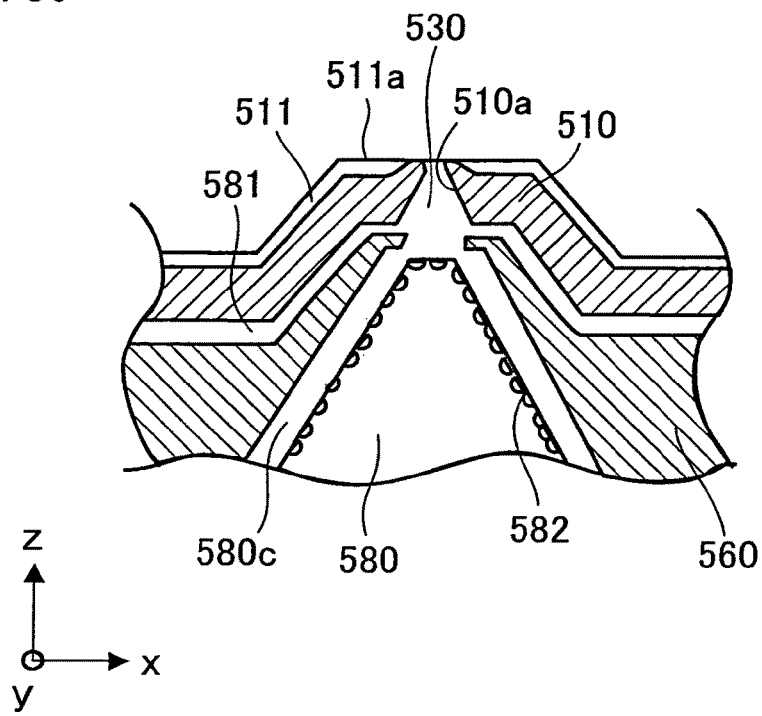
FIG. 50 is a cross sectional view illustrating that metal fine particles are provided in the hole of the opaque substrate of the electromagnetic field element shown in FIG. 49.

Specifically, although the above explanation assumes that the substrate 560 is transparent, an opaque substrate may be used as shown in FIG. 48 through FIG. 50. However, for the propagation of the light Pi from the laser light source 561 to the confinement portion 530 in such an opaque substrate 560a, a hole 580 needs to be formed in a part of the opaque substrate 560a shown in FIG. 48.

The hole 580 of the opaque substrate 560a is formed in accordance with either (i) etching using solution, or (ii) the RIE (reactive ion etching). It is preferable that the hole 580 thus formed be filled with a transparent insulator. The insulator filling the hole 580 serves as a heat sink, so that temperature rise can be restrained in the confinement portion 530.

In cases where the opaque substrate 560a is made of, e.g., Si, a $SiO_2$ film is formed on a hole wall 580a of the hole 580 as the result of oxidation of the opaque substrate 560a. So, in cases where the hole 580 is filled with a transparent insulator oxide having a higher refractive index, the hole 580 serves as a waveguide, with the result that the light Pi can be efficiently propagated to the confinement portion 530. Specific examples of such a transparent insulator oxide include: ZnO, $Al_2O_3$, $SiO_2$, $TiO_2$, $CrO_2$, and the like. Note that, in cases where the opaque substrate 560a is made of an oxide material, the oxide film formed in the hole wall 580a is absorbed in the opaque substrate 560.

FIG. 49 illustrates a shape of another hole 580 formed by carrying out the selective anisotropic etching with respect to the opaque substrate 560a. The hole 580 thus formed by carrying out the selective anisotropic etching with respect to the opaque substrate 560a has a hole wall 580b whose side surface leans at an angle of 90° or greater with respect to the reference surface 511a of the projecting portion 511. Further, the selective anisotropic etching can be used to form the conductor 510 such that the interface 510a between the conductor 510 and the opaque substrate 560a leans at an angle of 90° or greater with respect to the reference surface of the projecting portion 511. This allows increase of the area for receiving the light Pi.

Further, metal fine particles 582 may be provided on the hole 580 as shown in FIG. 50. Specifically, the metal fine particles 582 dissolved in a solution are applied to the hole 580, with the result that the metal fine particles 582 are provided on a hole wall 580c of the hole 580. Alternatively, the sputtering film forming is carried out so as to form the metal film, i.e., the metal fine particles 582 on the hole wall 580c of the hole 580. In the metal fine particles 582, surface plasmons Dlsp are locally excited by the light Pi propagated to the hole 580, and the localized surface plasmons Dlsp excited in the respective metal fine particles 582 are coupled. The localized surface plasmon thus strengthened is propagated to the confinement portion 530. It is preferable that each of the metal fine particles 582 has a size of 100 nm or less.

The metal fine particle 582 is made of a metal having a high electric conductivity. Especially, in the view of the high frequency responsiveness, it is preferable that the metal fine particle 582 be made of Au, Pt, Ag, Cu, Al, Ti, W, Ir, Pd, or the like. Each of these materials is a non-magnetic metal. Moreover, the metal fine particles 582 may be connected to one another. In this case, the localized surface plasmons Dlsp are propagated as the surface plasmon Dsp.

Figure 51:
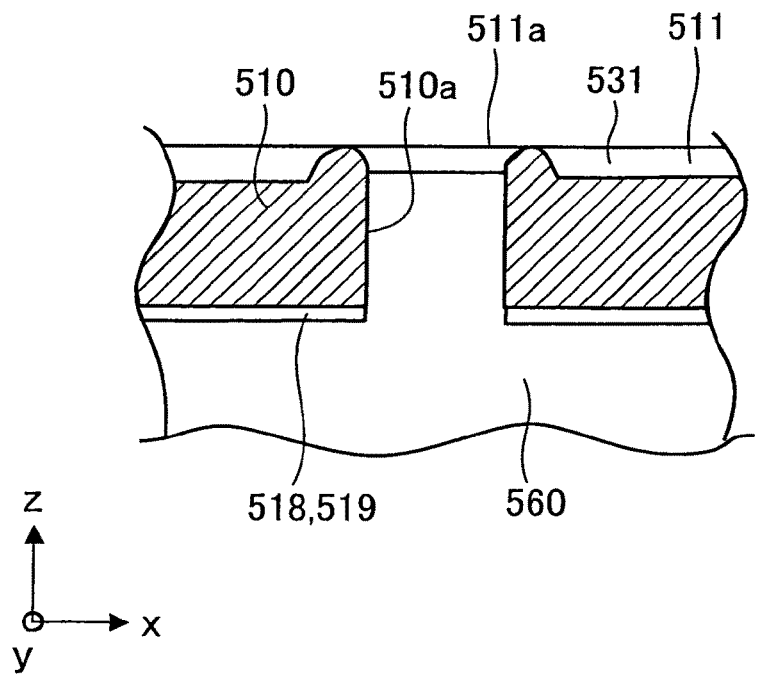
FIG. 51 is a cross sectional view illustrating the electromagnetic field generating element in which the conductor is implanted after etching the substrate in accordance with the RIE.

Each of FIG. 51 through FIG. 55 is a further enlarged cross sectional view illustrating the structure on the periphery of the confinement portion 530. FIG. 51 is a diagram illustrating the structure in which the conductor 510 is implanted after etching the substrate 560 in accordance with the RIE. In this case, the interface 510a between the conductor 510 and the substrate 560 is substantially perpendicular to the reference surface 511a of the projecting portion 511.

Figure 52:
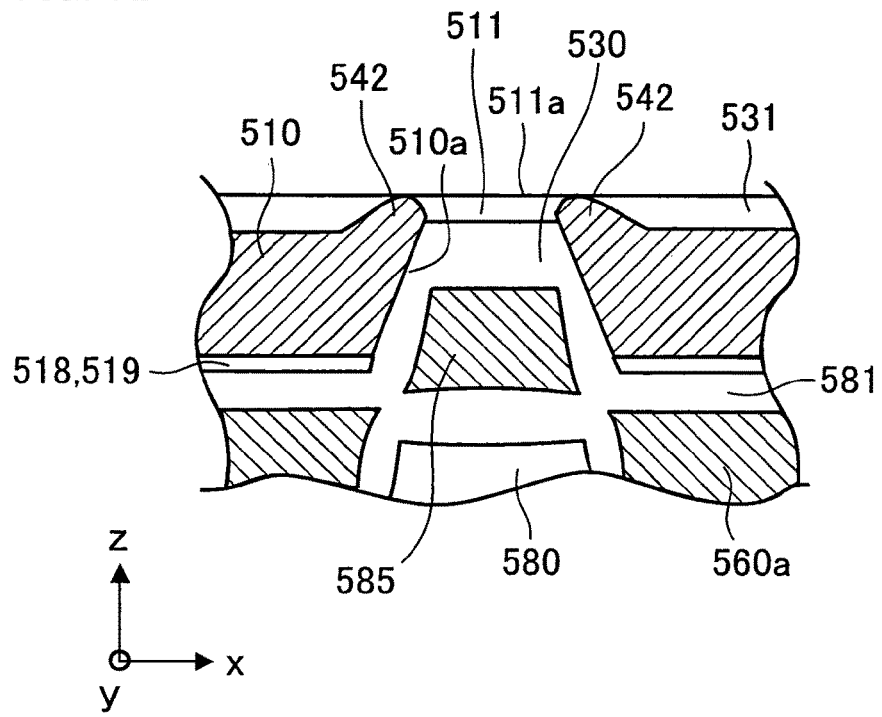
FIG. 52 is a cross sectional view illustrating the electromagnetic field generating element in which the conductor is implanted after carrying out the anisotropic etching with respect to a Si substrate for the purpose of forming a surface leaning at an angle of 90° or greater with respect to the reference surface of the projecting portion.

FIG. 52 is a diagram illustrating the structure in which the conductor 510 is implanted after carrying out the anisotropic etching with respect to the substrate 560 so as to form the interface 510a leaning at an angle of 90° or greater with respect to the reference surface of the projecting portion 511. In this case, e.g., a Si (001) substrate is used for the substrate 560. Formed in the interface 510a between the substrate 560 and the conductor 510 is $SiO_2$. Moreover, in the vicinity of the confinement portion 530, a speck 585 made of Si remains even after the oxidation, as shown in FIG. 52.

Figure 53:
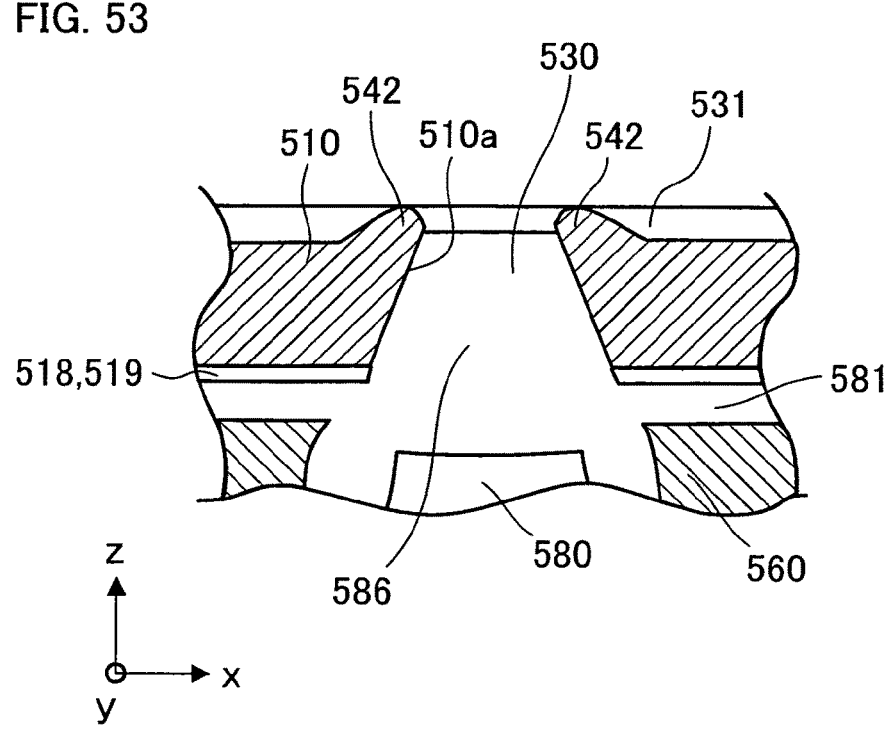
FIG. 53 is a diagram illustrating that a speck shown in FIG. 52 is entirely turned to be an oxide by promoting oxygen spreading with respect to the Si substrate in accordance with the heat oxidation method.

The speck 585 limits the propagation path, so that the light Pi is propagated, as the surface plasmon Dsp, to the confinement portion 530 only via the interface 510a between the conductor 510 and the substrate 560 (oxide film). FIG. 53 is a diagram illustrating that such a speck 585 shown in FIG. 52 is entirely turned to be an oxide 586 by promoting oxygen spreading with respect to the (Si) substrate 560 in accordance with the heat oxidation method. In this case, the light Pi is directly propagated to the bank-like portions 541 and 542 formed in the confinement portion 530, with the result that the localized surface plasmon Dlsp can be excited in the bank-like portions 541 and 542.

Figure 54:
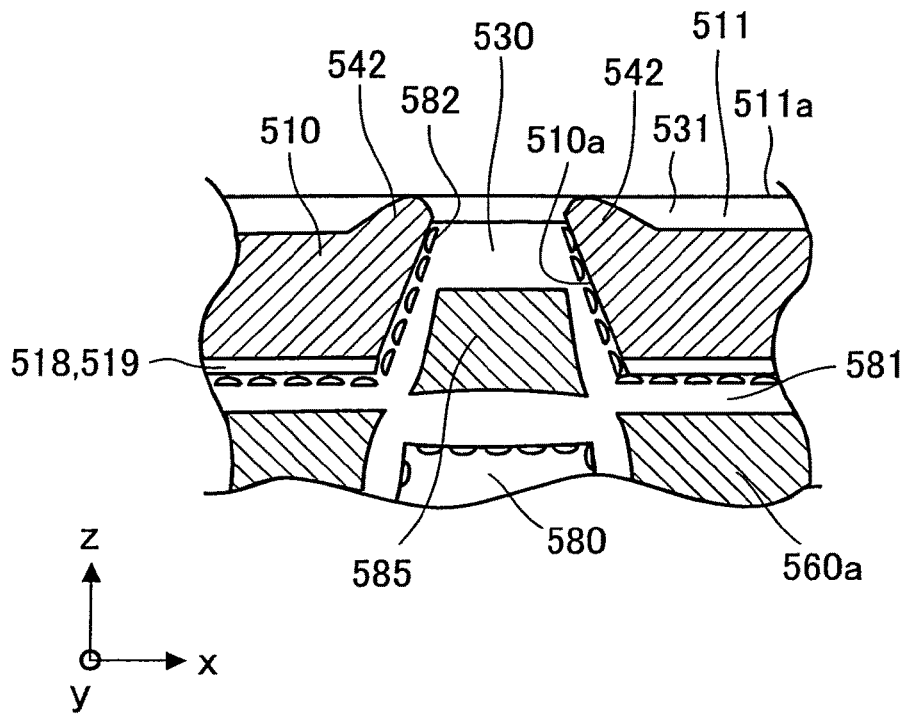
FIG. 54 is a cross sectional view illustrating the vicinity of the confinement portion in cases where the metal fine particles are provided in the interface between the conductor and the substrate.
Figure 55:
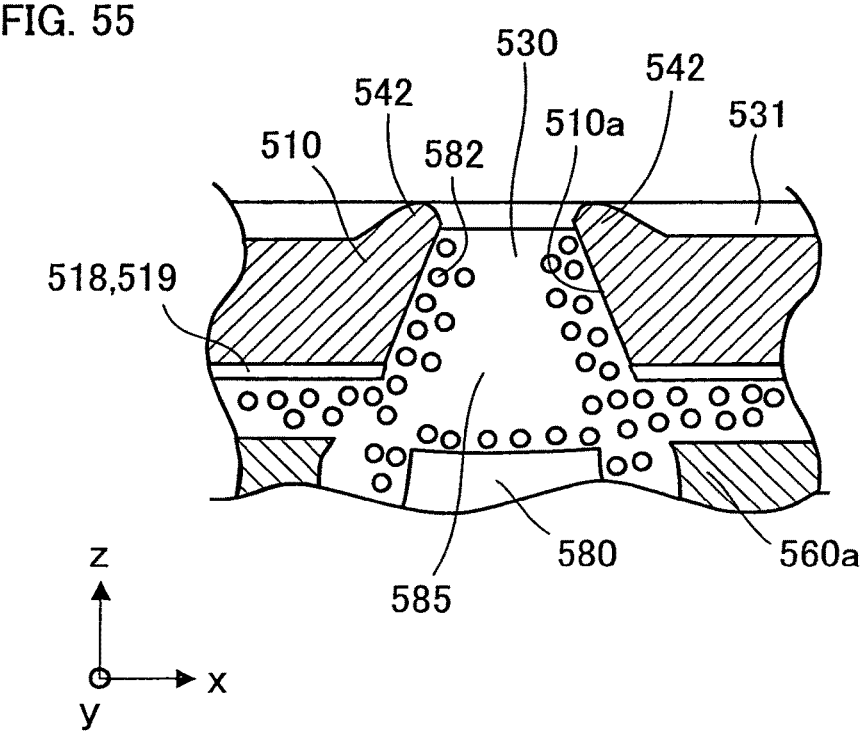
FIG. 55 is a cross sectional view illustrating the vicinity of the confinement portion in cases where the metal fine particles are provided in the interface between the conductor and the substrate.

Each of FIG. 54 and FIG. 55 is a cross sectional view illustrating the vicinity of the confinement portion 530 in cases where the metal fine particles 582 are provided in the interface 510a between the conductor 510 and the substrate 560. The formation of the metal fine particles 582 is carried out in the following manner. That is, before the formation of the conductor 510, the metal fine particles 582 dissolved in a solution are applied to the structure having the interface 510a leaning at an angle not substantially perpendicular to the reference surface 511a of the projecting portion 511. Thereafter, drying is carried out. Alternatively, the metal fine particles 582 are formed in the vicinity of the interface 510a between the conductor 510 and the substrate 560, by forming a metal film (not shown) in accordance with the sputtering film forming method or the metal ion implantation method.

In the metal fine particles 582, the surface plasmons Dlsp are locally excited by the propagated light Pi, and the localized surface plasmons Dlsp excited in the respective metal fine particles 582 are coupled. The localized surface plasmon Dlsp thus strengthened is propagated to the bank-like portions 541 and 542 formed in the confinement portion 530.

It is preferable that each of the metal fine particles 582 has a size of 100 nm or less. Moreover, the metal fine particles 582 may be connected to one another. In this case, the respective localized surface plasmons Dlsp locally excited in the metal fine particles are propagated as the surface plasmon Dsp. The metal fine particle 582 is made of a metal having high electric conductivity. Especially, in the view of the high frequency responsiveness, it is preferable that the metal fine particle 582 be made of Au, Pt, Ag, Cu, Al, Ti, W, Ir, Pd, or the like. Each of these materials is a non-magnetic metal.

Embodiment 11

Figure 56:
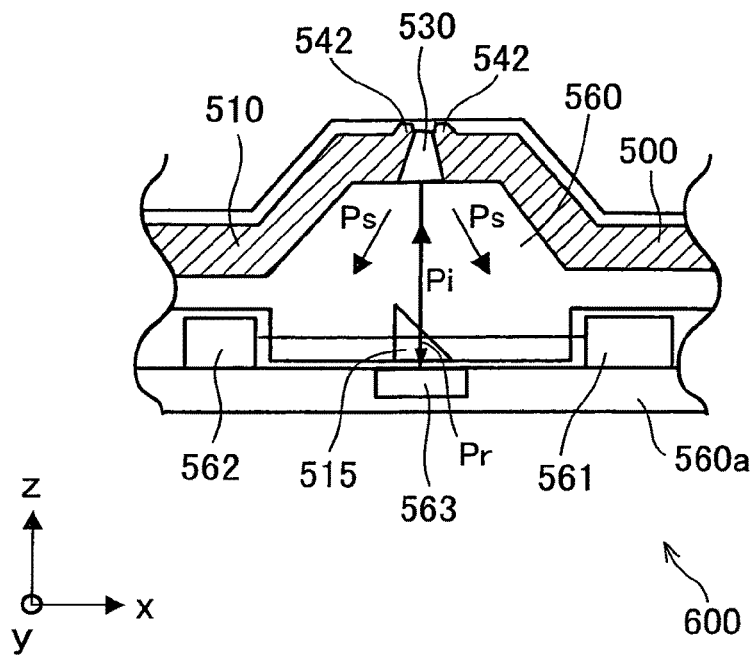
FIG. 56 is an explanatory diagram illustrating an information recording/reproducing head including the electromagnetic field generating element in which: a light detector is further provided on the surface reverse to the surface on which the confinement portion is formed, and is provided on the optical axis passing through the optical element and the confinement portion.
Figure 57:
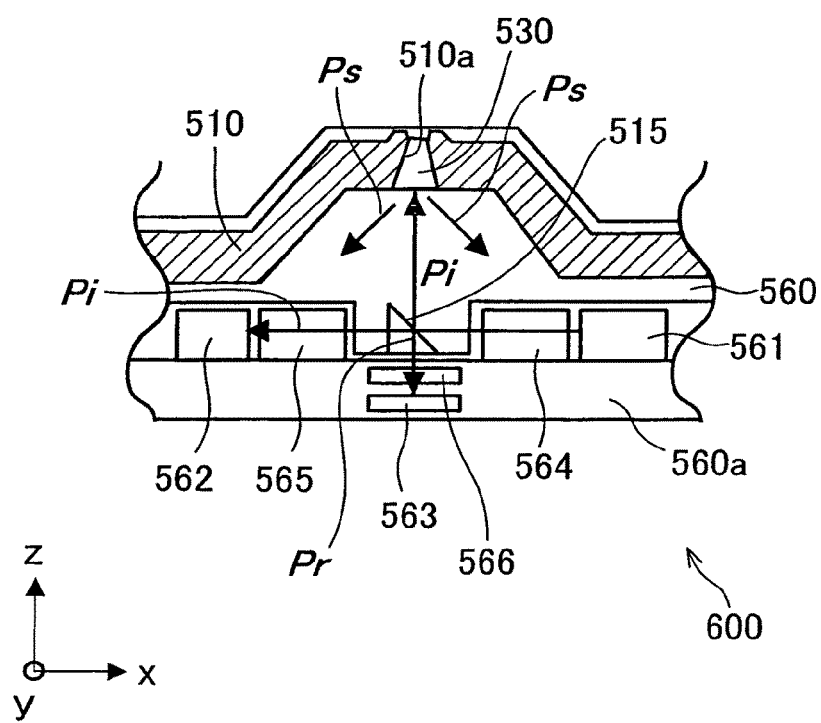
FIG. 57 is a cross sectional view illustrating an example of modifying the information recording/reproducing head shown in FIG. 56 such that a light polarizer is provided between the laser generating source and the optical element, and such that a light polarizer is provided between the light detector and the optical element.

The following explains Embodiment 11 of the present invention with reference to FIG. 56 and FIG. 57. Note that materials having the equivalent functions as to those shown in the aforementioned drawings pertaining to Embodiment 10 will be given the same reference symbols, and explanation thereof will be omitted here.

As shown in FIG. 56, an information recording/reproducing head 600 according to the present embodiment is obtained by providing, in the present element 500, a light detector 563 serving as an electromagnetic field detector. Specifically, the light detector 563 is provided on the surface reverse to the surface on which the confinement portion 530 is formed, and is provided on the optical axis passing through the optical element 515 and the confinement portion 530. Therefore, the optical element 515 is sandwiched between the optical element 563 and the confinement portion 530.

Via the optical element 515, the light detector 563 in the information recording/reproducing head 600 detects either (i) the reflected light Pr, which is the light Pi that was irradiated to and reflected by the confinement portion 530; or (ii) the scattering light Ps, which is the light Pi that was irradiated to and scattered by the confinement portion 530. The light detector 563 detects strength change of the reflected light Pr or of the scattering light Ps. This allows detection of existence (presence) of external electric polarization Pout in the vicinity of the bank-like portion formed in the confinement portion 530. In other words, when the external electric polarization Pout exists in the vicinity of the confinement portion 530, the external electric polarization Pout interplays with the near field NF generated in the bank-like portions 541 and 542. This causes the strength change of (i) the reflected light Pr coming from the confinement portion 530, or (ii) the scattering light Ps coming therefrom.

As such, the light detector 563 detects the strength change of (i) the reflected light Pr coming from the confinement portion 530, or (ii) the scattering light Ps coming therefrom, with the result that the information of the external electric polarization Pout can be detected. FIG. 57 is a cross sectional view illustrating an example in which the information recording/reproducing head shown in FIG. 56 is modified. As is the case with the information recording/reproducing head 600 shown in FIG. 56, the light detector 563 is provided on the surface reverse to the surface on which the projecting portion 511 of the substrate 560 is formed.

In cases where the substrate 560 is a transparent substrate, the light detector 563 can detect the scattering light Ps coming from the confinement portion 530. Further, a light polarizer 564 is provided between the laser generating source 561 and the optical element 515 so as to equally polarize the light Pi. Further, a light polarizer 565 is provided between the light detector 562 and the optical element 515, and a light polarizer 566 is provided between the optical element 515 and the light detector 563.

The light Pi in the TE mode is irradiated from the laser generating source 561 to the optical element 515 via the light polarizer 564. The optical element 515 changes the propagation direction of the light Pi to the direction of the confinement portion 530. The light polarizer 565 allows passage of the TE mode light of the light Pi whose propagation direction is unchanged. With this, the light detector 562 detects the output of the light Pi.

The leaning surface 515s of the optical element 515 is a surface for reflecting the light Pi, so that the leaning surface 515s is coated with a metal film made of Au, Pt, Ag, Cu, Al, Ti, W, Ir, Pd, or the like. In the surface of the reflecting film, i.e., in the leaning surface 515s, the surface plasmon Dsp is excited. This allows attenuation of the scattering light Ps or the reflected light Pr, each of which is the light that was so polarized from the light Pi as to have a component perpendicular to the leaning surface 515s.

This allows restraint of the TM mode light coming back to the laser generating source 561, with the result that the laser generating source 561 can stably oscillate. Further, the polarization axis of the light polarizer 566 coincides with (i) a desired polarization axis of the scattering light Ps coming from the confinement portion 530, or (ii) a desired polarization axis of the reflected light Pr coming therefrom such that the scattering light Ps or the reflected light Pr each having the desired polarization axis can be detected. With this, the light detector 563 detects the strength change of the scattering light Ps or of the reflected light Pr. Accordingly, the light detector 563 can detects an angle of polarization rotation which is caused by external magnetic polarization Mout in the vicinity of bank-like portions 541 and 542 formed in the confinement portion 530.

Specifically, in cases where the external magnetic polarization Mout exists in the vicinity of the confinement portion 530, the external magnetic polarization Mout and the near field NF generated in the bank-like portions 541 and 542 interplays to rotate (i) the polarization direction of the scattering light Ps coming from the confinement portion 530, or (ii) the polarization direction of the reflected light Pr coming therefrom. In other words, such a magneto-optic (photomagnetic) effect causes (i) the rotation of the polarization axis of the reflected light Pr or the scattering light Ps, each of which comes from the confinement portion 530; or (ii) elliptic polarization of the reflected light Pr or the scattering light Ps. The light detector 563 detects such a change of the polarization direction of the reflected light Pr or the scattering light Ps. Accordingly, the light detector 563 can detect the information of the external magnetic polarization Mout.

As described above, the use of the information recording/reproducing head 600 makes it possible to detect the polarization direction change and the strength change of the scattering light Ps or the reflected light Pr, each of which comes from the confinement portion 530, in which the near field NF and magnetic field B are generated, of the present element 500. This allows detection of the external electric polarization Pout and the external magnetic polarization Mout each existing in the vicinity of the confinement portion 530.

In other words, in cases where the external electric polarization Pout and the external magnetic polarization Mout exist in the vicinity of the confinement portion 530, each of the external electric polarization Pout and the external magnetic polarization Mout interplays (works together) with the near field NF. This causes the polarization direction change and the strength change of the scattering light Ps or the reflected light Pr.

The light detector 563 detects the polarization direction change and the strength change of the scattering light Ps or the reflected light Pr. This allows detection of the external electric polarization Pout and the external magnetic polarization Mout in the vicinity of the confinement portion 530.

For example, an external electric polarization Pout and an external magnetic polarization Mout in a recording mark recorded in a magnetic recording medium interplays with the near field NF. The light detector 563 detects the interplay as the polarization direction change and the strength change of the scattering light Ps or the reflected light Pr, each of which comes from the confinement portion 530. This allows readout of information stored in the magnetic recording medium. Further, the detection of the external electric polarization Pout in the present embodiment can be carried out in accordance with the aforementioned method of measuring the change of the threshold current in the laser oscillation carried out by the laser generating source 561.

Each of the light polarizers 564 and 565 used herein is formed by providing a thin metal film on the surface of the light waveguide. Examples of the thin metal film include: Au, Pt, Ag, Cu, Al, Ti, W, Ir, Pd, and the like. Moreover, it is preferable that such a metal film have a large imaginary part in the complex dielectric constant with respect to the wavelength λ of the light Pi or of the scattering light Ps. A specific example of such a metal is Al, or the like. Further, it is preferable that each of the light polarizers 564 and 565 have a film thickness as large as the aforementioned intake length d or so. The light polarizer 566 is in the form of a grid in which thin metal wires each having a film thickness thicker than the intake length d are provided every λ/4 or shorter in the in-plain direction. It is preferable that each of the thin metal wires be made of Al or the like. The light polarizer 566 allows passage of the scattering light Ps or the reflected light Pr, each of which has an electric field component perpendicular to the grid.

Embodiment 12

Figure 59:
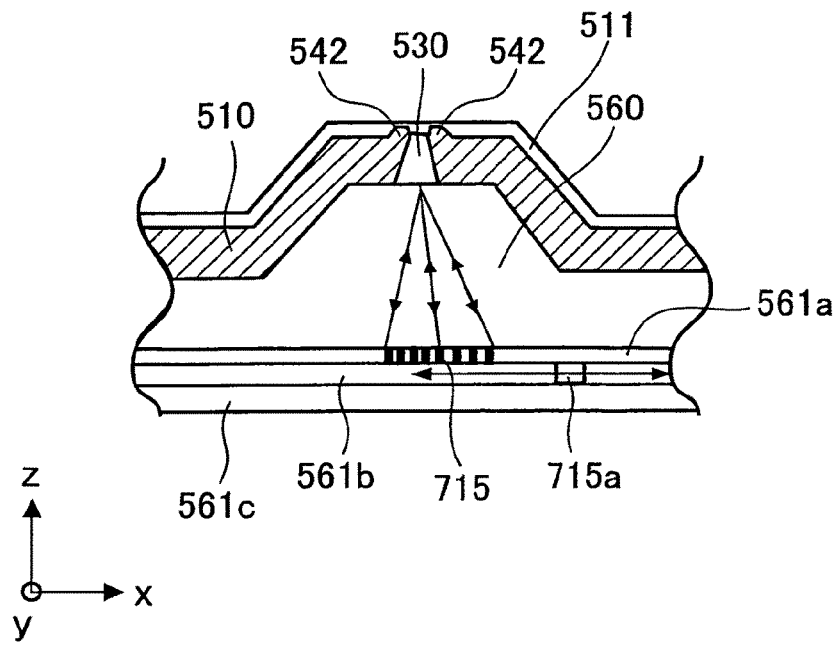
FIG. 59 is a cross sectional view illustrating the electromagnetic field generating element and the electromagnetic field detectors, each of which is illustrated in FIG. 58.
Figure 60:
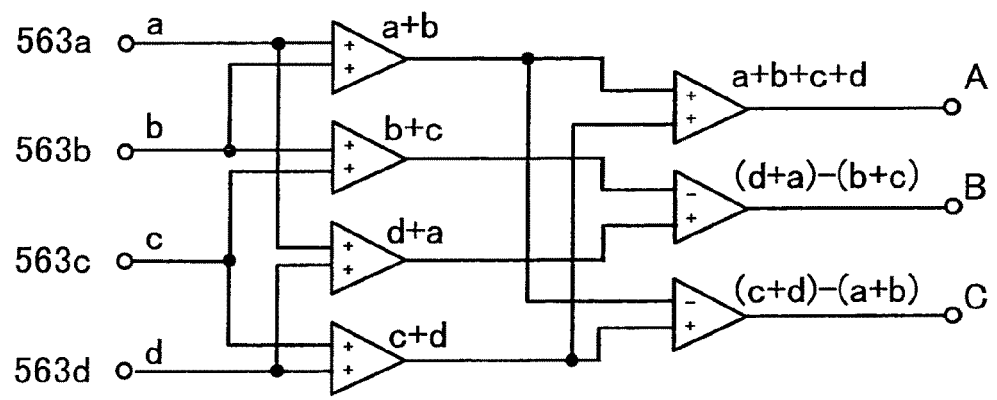
FIG. 60 is a circuit for processing signals sent respectively from the electromagnetic field detectors shown in FIG. 58.

Another embodiment of the present invention will be explained below with reference to FIG. 58 through FIG. 60. Note that materials having the equivalent functions as to those shown in the aforementioned drawings pertaining to Embodiments 10 and 11 will be given the same reference symbols, and explanation thereof will be omitted here.

Described here is a case where the aforementioned laser generating source 561, the optical element 515, and the light detector are provided on a laser element substrate. The optical element 515 changes the propagation direction of the light Pi. The light detector detects the scattering light Ps or the reflected light Pr, each of which comes from the confinement portion 530.

Figure 58:
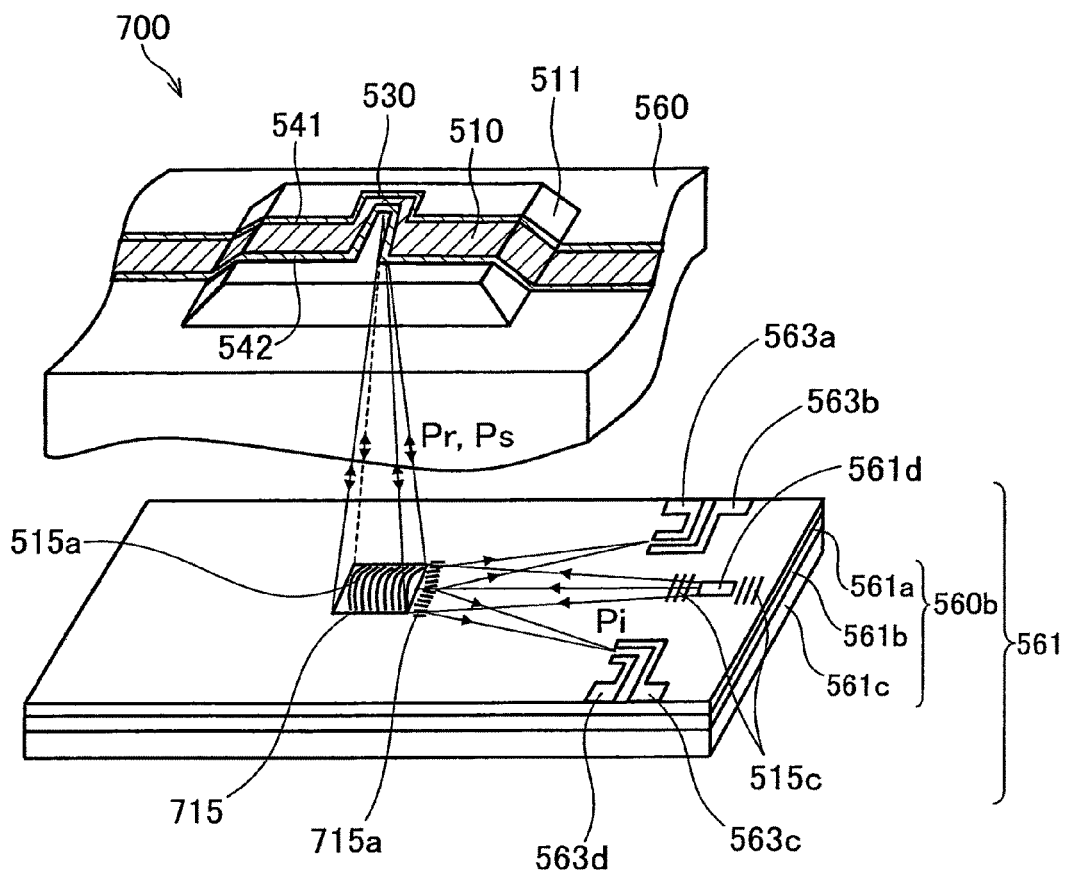
FIG. 58 is an explanatory diagram illustrating (i) a structure of an electromagnetic field generating element according to Embodiment 11 of the present invention, and (ii) how electromagnetic field detectors are provided therein.

Specifically, see FIG. 58. An information recording/reproducing head 700 is arranged such that distributed Bragg reflectors (DBRs) 515c for realizing the laser oscillation are provided in the end portions of an active region 561d of the laser element substrate 560b including a p-doped clad layer 561a, an n-doped clad layer 561c, and an active layer 561b sandwiched between the p-doped clad layer 561a and the n-doped clad layer 561c. In the p-doped clad layer 561a and the n-doped clad layer 561c, electrodes (not shown) are respectively provided for the purpose of current injection.

The active layer 561b may have a multilayer quantum well structure. The p-doped clad layer 561a, the n-doped clad layer 561c, the active layer 561b, and the distributed Bragg reflectors 515c constitute the laser generating source 561.

Further, the active layer 561b provided in the laser element substrate 560b serves as a dielectric thin film waveguide layer, via which the light Pi irradiated from the laser generating source 561 is propagated under the surface of the laser element substrate 560b. See FIG. 59.

Provided on the active layer 561b serving as the dielectric thin film waveguide layer is a light collection grating coupler 715 for converging the light Pi to the vicinity of the confinement portion 530 which is positioned outside the dielectric thin film wavelength layer, i.e., outside the active layer 561. The light collection grating coupler 715 is made up of an uneven interval curved wire clump 515a. Moreover, provided on the active layer 561b are light detectors 563a, 563b, 563c and 563d for detecting the scattering light Ps or the reflected light Pr, each of which comes from the confinement portion 530 via the light collection grating coupler 715.

The information recording/reproducing head 700 includes a beam splitter 715a for dividing the scattering light Ps or the reflected light Pr into two beams of light such that: the divided light beams are symmetrical to each other, and each propagation direction of the divided light beams crosses at an angle of 30° or less with the center optical axis of the light Pi. The beam splitter 715a is provided between the laser generating source 561 and the light collection grating coupler 715.

The light Pi irradiated from the laser generating source 561 is converged, by the light collection grating coupler 715, in the vicinity of the confinement portion 530 positioned outside the active layer 561b serving as the dielectric thin film waveguide layer. The light Pi is so scattered by the confinement portion 530 as to be the scattering light Ps, or is so reflected by the confinement portion 530 as to be reflected light Pr. The scattering light Ps or the reflected light Pr is changed in strength and polarization direction of the electric field by the external electric polarization Pout and the external magnetic polarization Mout existing in the vicinity of the bank-like portion formed in the projecting portion 511.

The light collection grating coupler 715 receives the scattering light Ps or the reflected light Pr from the confinement portion 530, and causes the received scattering light Ps or the received reflected light Pr to be propagated in the in-plane direction of the laser element substrate 560b. The beam splitter 715a divides the scattering light Ps or the reflected light Pr, each of which comes from the confinement portion 530 and each of which is propagating in the active layer 561b serving as the dielectric thin film waveguide layer. The scattering light Ps or the reflected light Pr thus divided are detected by the light detectors 563a, 563b, 563c, and 563d.

In cases where the scattering light Ps or the reflected light Pr has a polarization direction leaning with respect to the polarization direction of the light Pi, a part of the leaning polarization component of the scattering light Ps or the reflected light Pr is propagated, as TE mode light, in the active layer 561b via the uneven interval curved wire clump 515a constituting the light collection grating coupler 715. The active layer 561b serves as the dielectric thin film waveguide layer.

The scattering light Ps or the reflected light Pr each having such a leaning polarization direction is propagated in a direction not parallel to the optical axis center line of the light Pi.

This causes the light collection point of the beam splitter 715a to be displaced from a normal light collection point (light collection point in cases where the polarization direction of the scattering light Ps or the reflected light Pr does not lean with respect to the polarization direction of the light Pi) of the beam splitter 715a.

Accordingly, the light detectors 563a, 563b, 563c, and 563d generate unsymmetrical signals a, b, c, and d, respectively. The signals thus generated by the light detector 563a, 563b, 563c, and 563d are sent to a circuit shown in FIG. 60, and the circuit outputs signals A, B, and C. In accordance with the output signals A, B, and C, a detection signal ratio is found. In accordance with the detection signal ratio thus found, the polarization angle can be detected. As such, the information of the external electric polarization Pout and the external magnetic polarization Mout, each of which exists in the vicinity of the bank-like portion 542, can be detected in accordance with the output signals obtained by sending, to the circuit, the signals generated by the light detectors 563a, 563b, 563c, and 563d.

Figure 61:
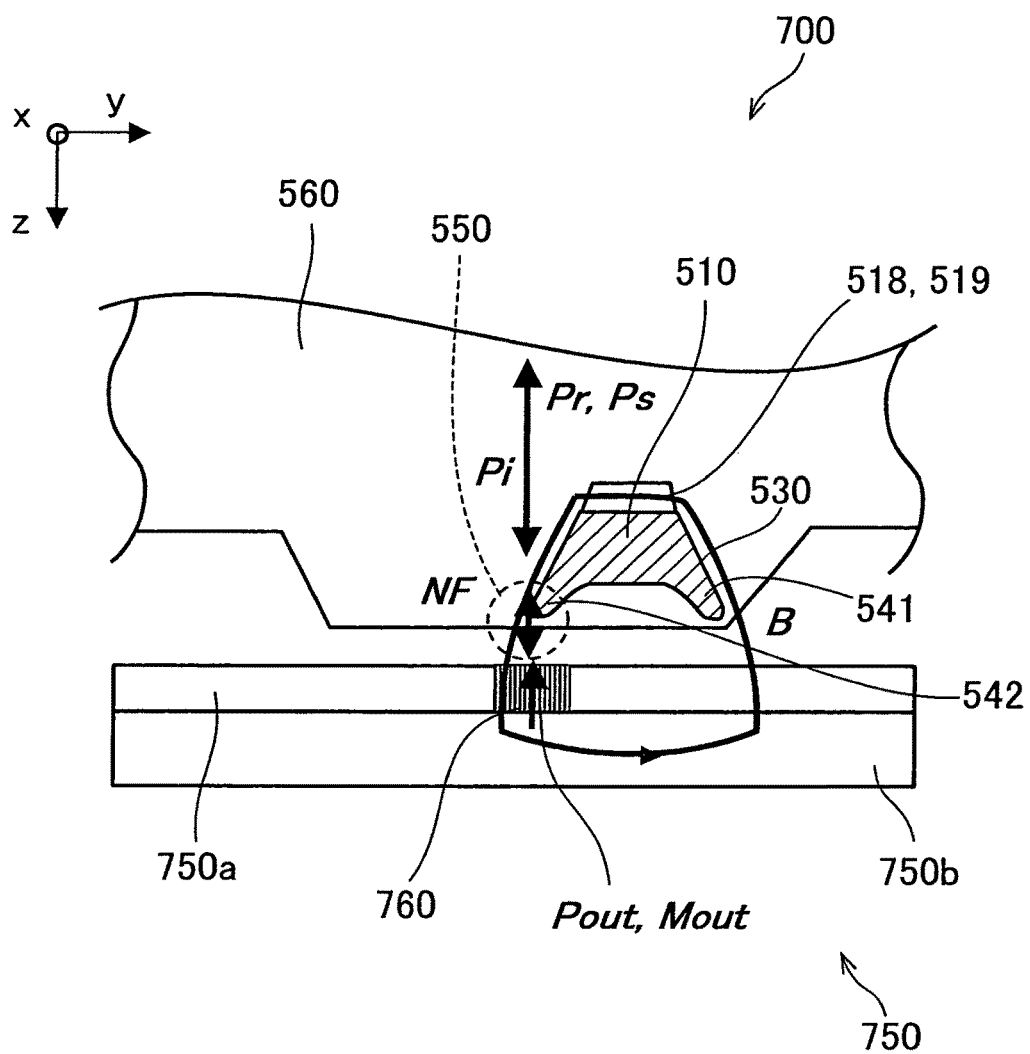
FIG. 61 is a cross sectional view illustrating (i) an information recording/reproducing head according to Embodiment 12 of the present invention, and (ii) how the information recording/reproducing head carries out high density recording with respect to a recording track of an magnetic recording medium.
Figure 62:
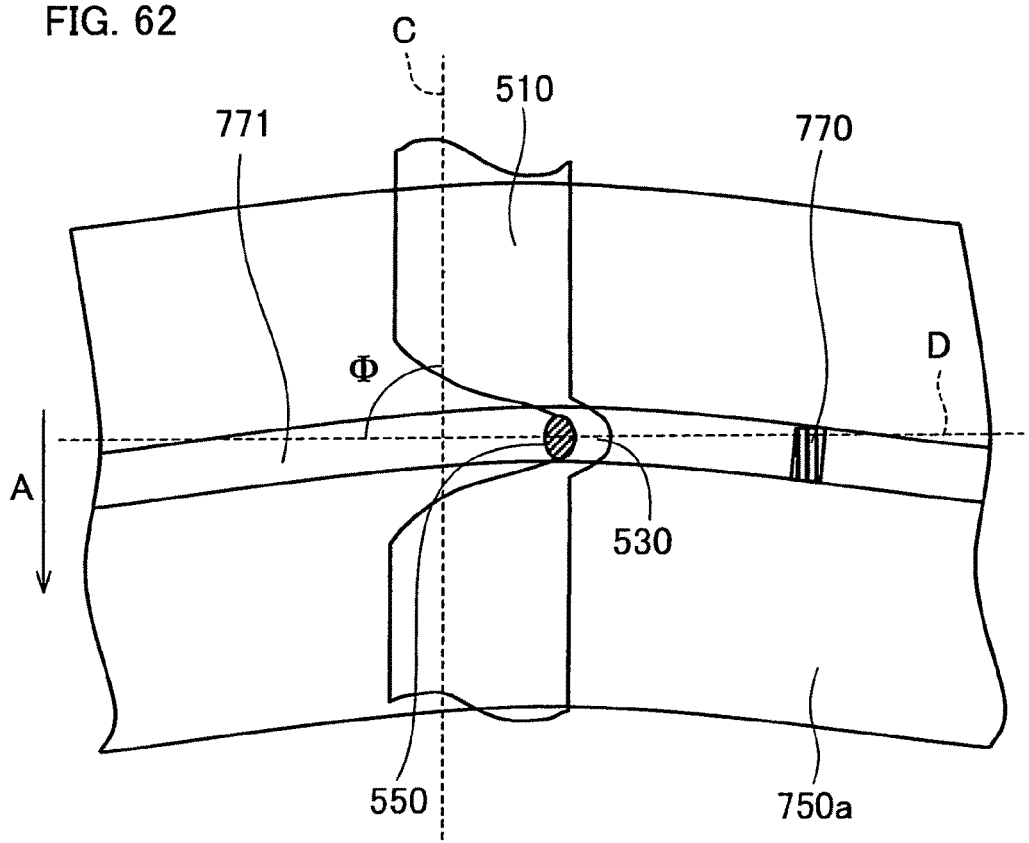
FIG. 62 is a plan view illustrating (i) an information recording/reproducing head according to Embodiment 12 of the present invention, and (ii) how the information recording/reproducing head carries out high density recording with respect to a recording track of a magnetic recording medium.

Explained next is how the information recording/reproducing head 700 of the present embodiment carries out recording operation and reproducing operation with respect to the information recording medium 750, with reference to FIG. 61. FIG. 61 is a cross sectional view illustrating (i) the information recording/reproducing head 700 of the present embodiment, and (ii) the information recording medium 750. FIG. 62 is a plan view illustrating (i) the information recording/reproducing head 700 of the present embodiment, and (ii) the information recording medium 750, when viewed from the information recording/reproducing head 700. The information recording medium 750 shown in FIG. 61 is made up of a substrate 750b and a recording surface 750a, and is a general magnetic recording medium for use in a hard disk drive or the like. Examples of such an information recording medium 350 include: (i) a CoCrPt system magnetic recording medium, (ii) a rare earth transition magnetic metal recording medium, (iii) an FePt system magnetic recording medium, and (iv) a magnetic recording medium made of an antiferromagnetic material such as a RhFe system.

Firstly explained is the recording operation. The laser generating source 561 of the information recording/reproducing head 700 irradiates, to the confinement portion 530 of the conductor 510, light Pi having recording level strength stronger than reproduction level strength. This causes generation of the near field NF in the electromagnetic field generation region 550. When the near field NF thus generated in the bank-like portion 542 comes close to the surface of the information recording medium 750, the near field NF becomes stronger between the bank-like portion 542 and the information recording medium 750. This is because the projecting structure of the bank-like portion 542 causes concentration of the electric field. This allows restraint of the spread of the strength distribution of the near field NF, as compared with the case where the conductor 510 has a flat surface. The irradiation of the light Pi to the recording surface 750a of the information recording medium 750 causes generation of a temperature rise area 760 in the recording surface 750a of the information recording medium 750. Accordingly generated in the temperature rise area 760 is an area which has a temperature equal to or higher than the recording temperature. Further, the supply of the current i to the conductor 510 in an "A" direction as shown in FIG. 62 causes generation of the magnetic field B in the confinement portion 530 of the conductor 510. The thermally assisted magnetic recording is realized in an area where the magnetic field B overlaps with the area which has a temperature equal to or higher than the recording temperature.

Explained next is the reproducing operation. The laser generating source 561 of the information recording/reproducing head 700 irradiates, to the confinement portion 530 formed in the conductor 510, the light Pi having the reproduction level strength. The light Pi thus irradiated causes generation of the near field NF in the electromagnetic field generation region 550 of the information recording/reproducing head 700. The near field NF interplays with the electric polarization Pout and the magnetic polarization Mout each existing in the recording mark 770 so as to change the polarization direction and the strength of the scattering light Ps or the reflected light Pr, each of which comes from the confinement portion 530. The light detector 563 detects the polarization direction change and the strength change of the scattering light Ps or the reflected light Pr. This allows acquirement of information stored in the recording mark 770.

See an alternative reproducing operation in which the light Pi having the reproduction level strength is not irradiated to the confinement portion 530. That is, when the confinement portion 530 formed in the conductor 510 meets the magnetic polarization Mout existing in the recording mark 770, an induction current is generated in the conductor 510. The magnetic information of the recording mark 770 can be acquired by detecting a change of the induction current. Alternatively, the magnetic polarization information can be detected by using a magnetism sensor such as a magnetism resistance element.

See FIG. 62. Indicated by broken line C is the radial direction (track direction) of the information recording medium 750. Indicated by broken line D is the current direction (the X axis direction) of the conductor 510 of the information recording/reproducing head 700. In cases where the radial direction of the information recording medium 750 crosses with the current direction of the conductor 510 at an angle Φ (see FIG. 62) of, e.g., 0°, the electromagnetic field generation region 550 is elongate in the radial direction. This makes it possible to record information onto a narrow track. Note that, the angle Φ may be arbitrarily set which is an angle at which the radial direction (see the broken line C in FIG. 62) of the information recording medium crosses with the current direction (the X axis direction; see the broken line D in FIG. 62) of the conductor 510 of the information recording/reproducing head 700.

As described above, in the present embodiment, the thermally assisted magnetic recording/reproduction using the near field NF is carried out as follows. That is, the near field NF generated in the confinement portion 530 allows effective temperature rise in the minute region, i.e., in the temperature rise area 760 of the information recording medium 750, and the strong magnetic field B generated in the vicinity of the confinement portion 530 allows magnetic recording onto the information recording medium 750. Further, in the following manner, information can be acquired from the recording mark 770 recorded on the recording track 771 of the information recording medium whose temperature is raised by the near field NF. That is, the near field NF generated in the electromagnetic field generation region 550 interplays with the electric polarization Pout and the magnetic polarization Mout each existing in the recording mark 770. This causes polarization direction change and strength change of the scattering light Ps or the reflected light Pr, each of which comes from the confinement portion 530. The light detector 563 detects the changes.

As such, unlike the conventional techniques, the information recording/reproducing head 700 does not need to use the yoke extension section so as to generate the magnetic field in a desired location, so that the magnetic field reduction or the magnetic field delay is restrained as compared with the case of using the yoke extension section. This makes it possible to provide an information recording/reproducing head suitable for the high frequency magnetic recording/reproduction. Further, this makes it possible to realize an information recording/reproducing head capable of carrying out the thermally assisted magnetic recording, with the assistance of the near field NF which exceeds the diffraction limit of light, with respect to the minute region. Further, the use of the information recording/reproducing head 700 allows acquirement of the strong near field NF. This makes it possible to provide the information recording/reproducing head 700 capable of carrying out the recording and the reproducing with respect to the information recording medium 750 having a high coercivity.

Embodiment 13

Figure 63:
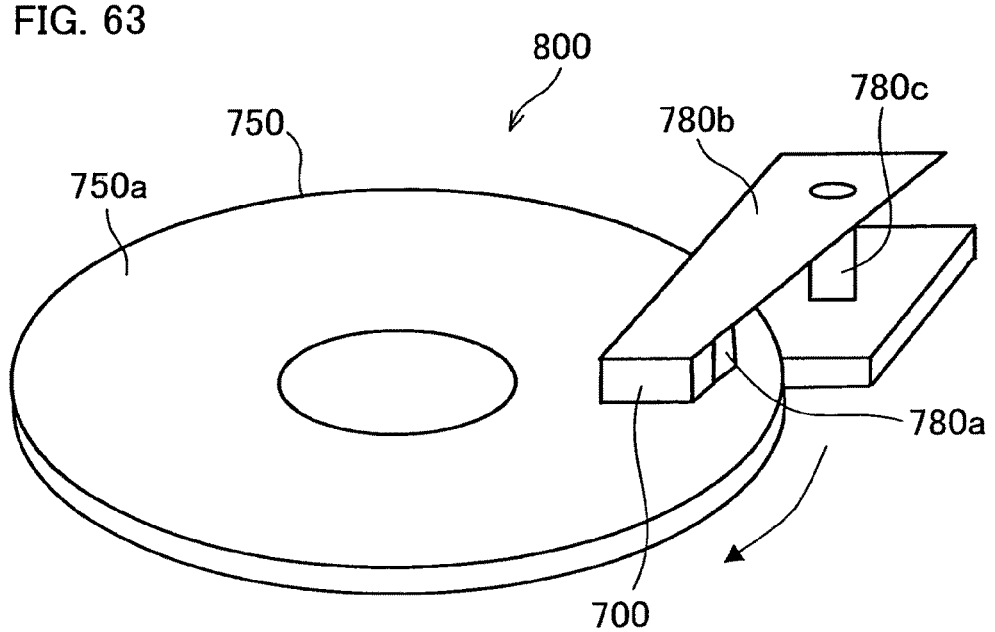
FIG. 63 is an explanatory diagram illustrating a structure of a major portion of an information recording/reproducing apparatus according to Embodiment 13 of the present invention.
Figure 64:
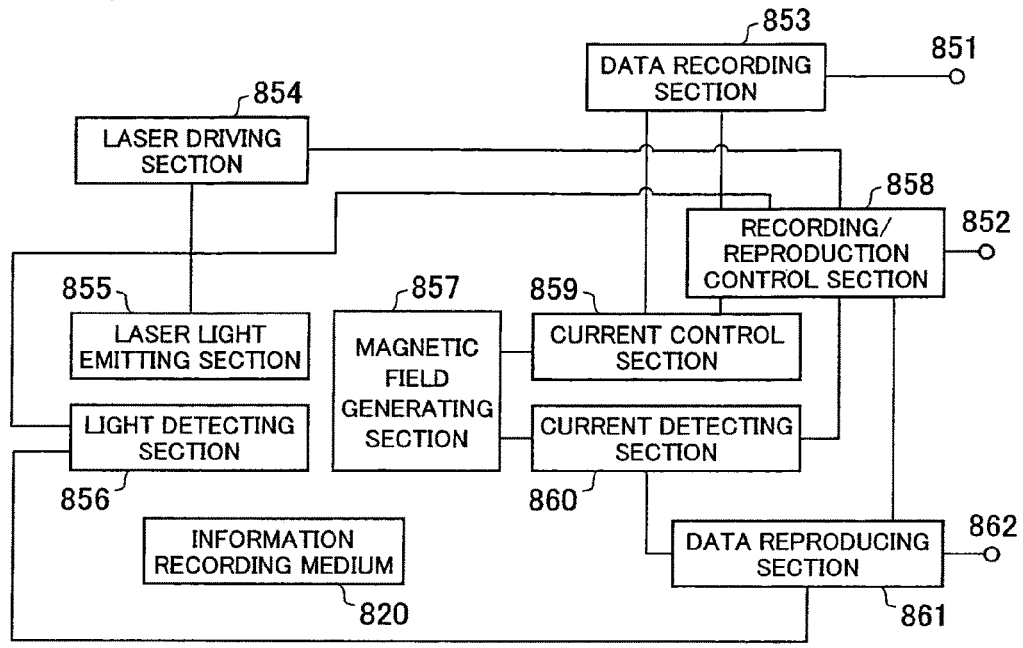
FIG. 64 is a block diagram schematically illustrating a structure of a recording/reproducing system of the information recording/reproducing apparatus shown in FIG. 63.
Figure 65:
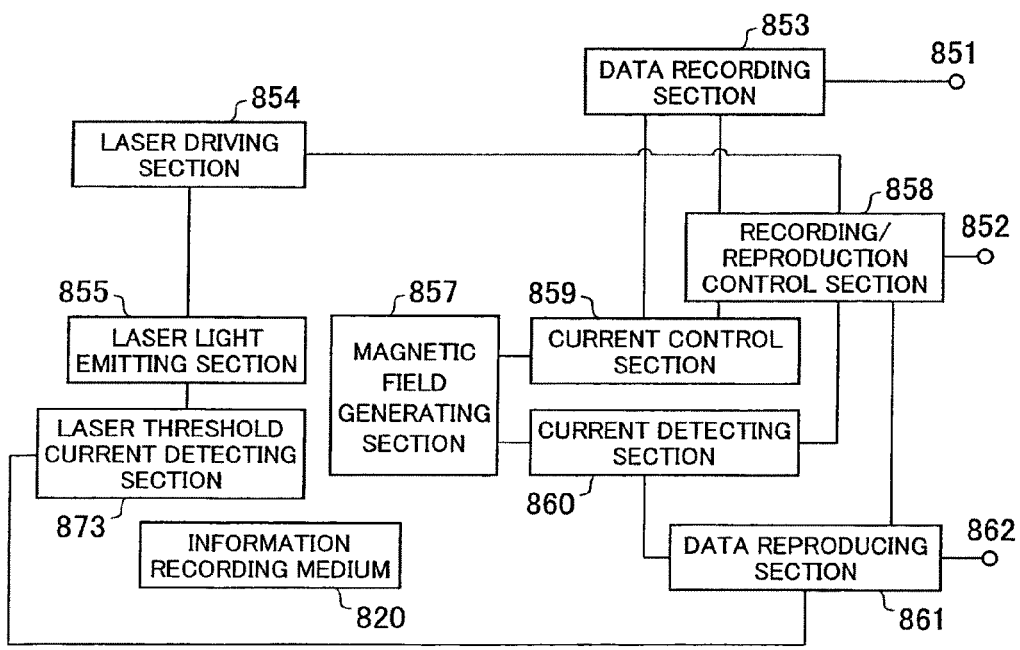
FIG. 65 is a block diagram schematically illustrating a structure of a recording/reproducing system of the information recording/reproducing apparatus, the structure being different from the structure shown in FIG. 64.

The following explains Embodiment 13 of the present invention with reference to FIG. 63 through FIG. 65. Note that materials having the equivalent functions as those shown in the aforementioned drawings pertaining to Embodiments 10 through 12 will be given the same reference symbols, and explanation thereof will be omitted here.

FIG. 63 is an oblique perspective view illustrating a structure of a major portion of an information recording/reproducing apparatus 800 of Embodiment 13. As shown in FIG. 63, in the information recording/reproducing apparatus 800 of the present embodiment, the information recording/reproducing head 700 is installed in a slider 780a such that: the information recording/reproducing head 700 slides over the recording surface 750a of the information recording medium 750 while the information recording medium 750 is rotated.

Note that distance (flying height) is 100 nm or less between the information recording/reproducing head 700 and the recording surface 750a of the information recording medium 750. The slider 780a is supported by an arm 780b, and an actuator 780c serving as transporting means transports the slider 780a for the purpose of scanning the recording track 771 (see FIG. 62) of the information recording medium 750.

FIG. 64 is a block diagram schematically illustrating a structure of a recording/reproducing system of the information recording/reproducing apparatus 800. The information recording/reproducing apparatus 800 includes (i) a recording/reproduction control terminal 852 for receiving, from a superior apparatus, a signal for controlling the recording or the reproduction; (ii) an input terminal 851 for receiving recording data sent from the superior apparatus; and (iii) an output terminal 862 for sending reproduction data to the superior apparatus. The recording/reproduction control terminal 852 is connected to a recording/reproduction control section 858 for controlling the recording or the reproduction. The input terminal 851 is connected to a data recording section 853 for converting the recording data into a recording signal. The output terminal 862 is connected to a data reproducing section 861 for encoding a reproduction signal.

The recording/reproducing control section 858 is connected to the data recording section 853, the data recording section 861, a laser driving section 854, and a current control section 859. The laser driving section 854 controls a laser driving current for a laser light emitting section 855. The current control section 859 controls a current for a magnetic field generating section 857 for generating a recording magnetic field in accordance with the recording signal sent from the data recording section 853.

In response to an instruction sent from the recording/reproducing control section 858, a light detecting section 856 receives the reflected light Pr or the scattering light Ps, each of which comes from the laser light emitting section 855. The light detecting section 856 detects the polarization direction change and the strength change of the light, the changes having been caused by the interplay of the information recording medium 820 and the near field NF. Then, the light detecting section 856 sends the detection result to the data reproducing section 861.

The current control section 859 supplies the magnetic field generating section 857 with a current according to the recording data. The supply of the current is carried out in accordance with (i) the recording signal sent from the data recording section 853, and (ii) an instruction sent from the recording/reproduction control section 858. In response to an instruction sent from the recording/reproduction control section 858, a current detecting section 860 reads out a magnetic signal from a temperature rise area of an information recording medium 820, i.e., an area whose temperature is raised by the near field NF generated by the laser light emitting section 855. Then, the current detection section 860 sends the reproduction signal to the data reproducing section 861.

Explained next is the recording operation and the reproducing operation. In the recording, in response to an instruction sent from the recording/reproduction control section 858, the laser driving section 854 drives the laser light emitting section 855 with the use of a driving current larger than a driving current for use in the reproduction. With this, the laser light emitting section 855 irradiates, to the magnetic field generating section 857, light Pi whose strength is stronger than the strength of light for use in the reproduction. Further, in response to an instruction from the recording/reproduction control section 858, the data recording section 853 converts (i) the recording data received from the input terminal 851, into (ii) the recording signal. Then, the data recording section 853 sends the recording signal to the current control section 859. The current control section 859 supplies the magnetic field generating section 857 with a current according to the recording signal. With this, the magnetic field generating section 857 generates the recording magnetic field. The light Pi excites the surface plasmon Dsp in the magnetic field generating section 857, and the surface plasmon Dsp generates the near field NF. The near field NF raises the temperature of the information recording medium 820 to the temperature required for the recording. Then, the recording magnetic field generated by the magnetic field generating section 857 records the recording mark onto the information recording medium.

Meanwhile, in the reproduction, in response to an instruction from the recording/reproduction control section 858, the laser driving section 854 drives the laser driving section 855 with the use of a driving current smaller than the current for use in the recording. With this, the laser light emitting section 855 irradiates, to the magnetic field generating section 857, light Pi whose strength is weaker than the strength of the light for use in the recording. Such light Pi excites the surface plasmon Dsp in the magnetic field generating section 857, and the surface plasmon Dsp thus excited generates the near field NF. The near field NF raises the temperature of the information recording medium 820 to the temperature required for the recording. The near field NF interplays with the electric polarization Pout and the magnetic polarization Mout each existing in the recording mark of the information recording medium 820.

In response to an instruction from the recording/reproduction control section 858, the light detecting section 856 receives the reflected light Pr or the scattering light Ps each coming from the recording mark of the information recording medium 820, in order to detect the information of the recording mark of the information recording medium 820. Then, the light detecting section 856 sends the reproducing signal to the data reproducing section 861. Further, in response to an instruction from the recording/reproduction control section 858, the current detecting section 860 detects the current converted, by the magnetic field generating section 857, from the magnetism signal acquired from the recording mark of the information recording medium 820. In response to an instruction from the recording/reproducing control section 858, the data reproducing section 861 converts (i) the signal detected by the current detecting section 860 and (ii) the reproducing signal sent from the light detecting section 856, into (iii) the reproduction data. Then, the data reproducing section 861 sends the reproduction data to the output terminal 862.

As described above, in the present embodiment of the present invention, the information recording/reproducing head 700 can be moved to a desired location in the information recording medium 820. In the desired location of the information recording medium 820, the information recording/reproducing head 700 raises the temperature of the minute region of the information recording medium 820. This allows the thermally assisted magnetic recording/reproduction using the near field NF. Specifically, while the temperature of the information recording medium is effectively raised by the near field NF generated in the confinement portion 530, the magnetic recording is carried out with the use of the strong magnetic field generated in the vicinity of the confinement portion 530. Moreover, in the following manner, the stored information can be reproduced from the information recording medium whose temperature is raised by the near field NF. That is, the electric polarization information or the magnetic polarization information each represented by the recording mark of the information recording medium is detected by receiving the reflected light Pr or the scattering light Ps each coming from the recording mark.

As such, unlike the conventional techniques, the information recording/reproducing apparatus 800 does not need to use the yoke extension section for the generation of the magnetic field in a desired location, so that the magnetic field reduction or the magnetic field delay is restrained as compared with the case of using the yoke extension section. This makes it possible to provide an information recording/reproducing apparatus 800 suitable for the high frequency magnetic recording/reproduction. Further, this makes it possible to realize an information recording/reproducing apparatus 800 capable of carrying out the thermally assisted magnetic recording, with the assistance of the near field NF which exceeds the diffraction limit of light, with respect to the minute region. Further, the use of the information recording/reproducing apparatus 800 allows acquirement of the strong near field NF. This makes it possible to provide an information recording/reproducing apparatus 800 capable of carrying out the recording and the reproducing with respect to the information recording medium having a high coercivity.

Explained next is another structure of the information recording/reproducing apparatus 800 with reference to FIG. 65. Such an information recording/reproducing apparatus 800 uses the information recording/reproducing head 600 as the information recording/reproducing head 700. The information recording/reproducing head 600 has such a structure that the conductor 510 having the confinement portion 530 is provided in one piece with the semiconductor laser element.

FIG. 65 is a block diagram schematically illustrating a structure of a recording/reproducing system of the information recording/reproducing apparatus 800. Note that materials having the equivalent functions as to those shown in the drawings pertaining to the foregoing embodiments will be given the same reference symbols, and explanation thereof will be omitted here.

A difference between the foregoing information recording/reproducing apparatus 800 and this information recording/reproducing apparatus 800 lies in that: the laser light emitting section 855 is connected to a laser threshold current detecting section 873 for detecting a change of the threshold current for the laser oscillation carried out by the laser light emitting section 855. The laser threshold current detecting section 873 detects the electric polarization in the information recording medium 820, and sends the reproduction signal to the data reproducing section 861. Further, the laser threshold current detecting section 873 is controlled according to an instruction sent from the recording/reproduction control section 858.

In this case, the light detecting section 856 (not shown) detects the laser strength, and the recording/reproduction control section 858 controls the laser driving section 854 such that laser having a constant power is emitted from the laser light emitting section 855.

As such, the present embodiment allows simplification of the structure of the information recording/reproducing head. This makes it possible to provide an inexpensive and highly reliable information recording/reproducing apparatus 800.

Embodiment 14

The following explains another embodiment of the present invention with reference to FIG. 66 through FIG. 73. Note that materials having the equivalent functions as to those shown in the aforementioned drawings pertaining to Embodiments 10 through 13 will be given the same reference symbols, and explanation thereof will be omitted here. The present embodiment explains a verification result of the near field assisted magnetic recording.

An electromagnetic field generating element 500 of the present embodiment is so formed that the conductor (metal) 510 is implanted in the substrate 560 made of $SiO_2$. The conductor 510 is made up of Ti (thickness of 50 nm) and Au (thickness of 300 nm), which are implanted in the substrate 560 in this order. Further, the electromagnetic field generating element 500 has a surface coated with SiN having a thickness of 5 nm.

For improvement of combination between the surface of the electromagnetic field generating element 500 and SiN, a combining layer Ti having a thickness of 5 nm is deposited on the surface of the aforementioned Au (thickness of 300 nm). Further, a material for use in the coating may be: the aforementioned insulator oxide, the insulator nitride, carbon, diamond-like carbon, carbon nitride, or boron nitride.

Figure 66:
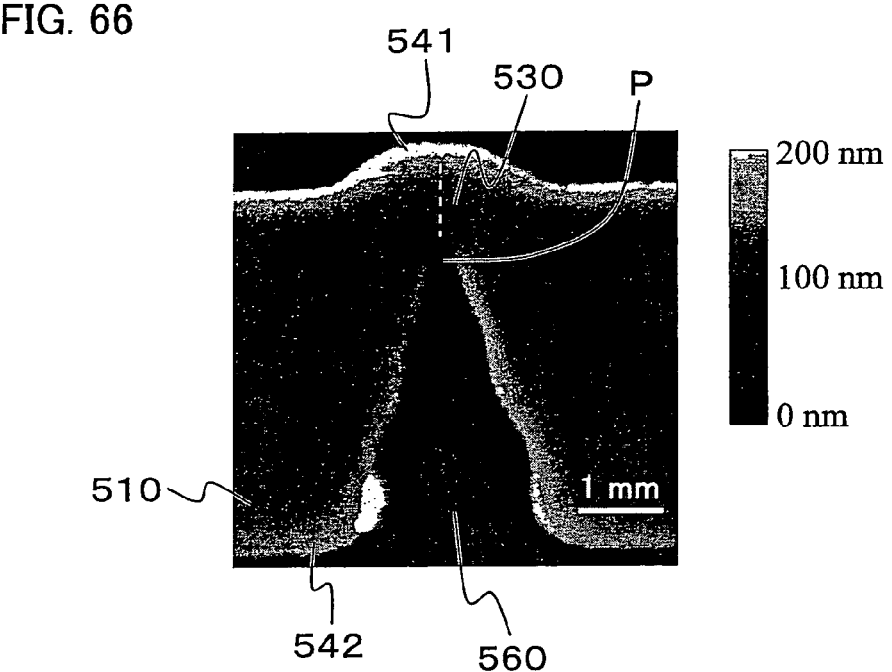
FIG. 66 is a surface observation image which is captured by using an atomic force microscope, and which illustrates the vicinity of a confinement portion formed in an electromagnetic field generating element according to Embodiment 14.

FIG. 66 is a surface observation image illustrating the vicinity of the confinement portion 530 formed in the electromagnetic field generating element 500 of the present embodiment. Formed in the vicinity of the confinement portion 530 (in the side edge portions of the confinement portion 530) are bank-like portions 541 and 542, each of which has a height Td of 50 nm and has a width Wd of 50 nm. Further, a circle (not shown) meeting the inner side edge of the confinement portion 530 has a radius of 100 nm. The vicinity of the center of the circle is indicated by a reference symbol "P" in FIG. 66.

Figure 67:
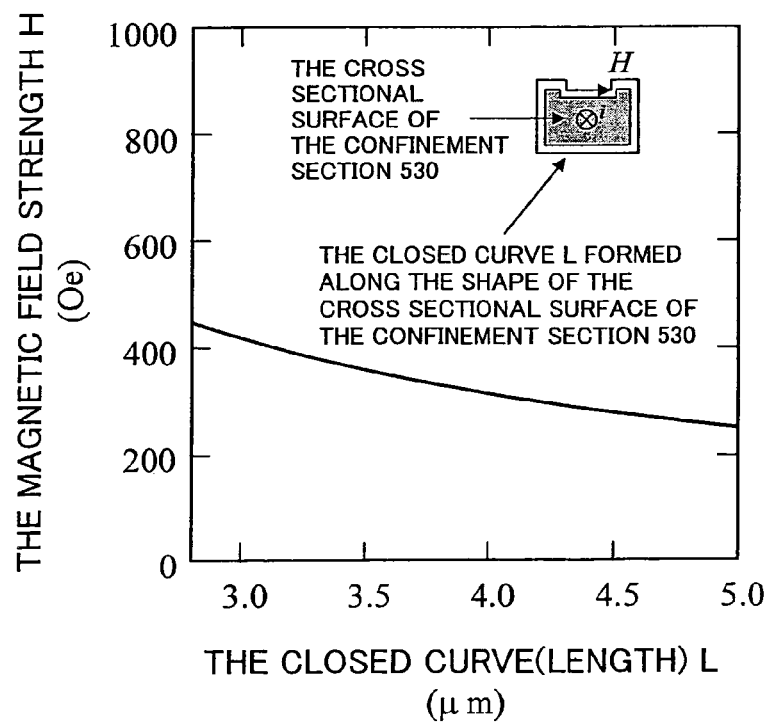
FIG. 67 is a graph illustrating a result of generating the magnetic field in the vicinity of the confinement portion.

FIG. 67 is a graph illustrating a result of generating the magnetic field in the confinement portion 530. In the surface of the confinement portion 530 of the conductor 510, the electric field thus generated has a strength H, which is expressed by the following formula: H=I/L, where "I" indicates a current i (I), and "L" indicates the length of the outer circumference of a cross sectional surface of the conductor 510. The conductor 510 is cross-sectioned in the direction perpendicular to the current i (I). So, when the current i (I) is 100 mA and the outer circumference length L is 2.8 μm, the strength H of the magnetic field is approximately 35.7 kA/m (447 Oe).

The strength H of the magnetic field is the same on the closed curve (length) L formed along the cross sectional surface of the confinement portion 530 of the conductor 510. Further, as the closed curve (length) L becomes longer, the strength H of the magnetic field is reduced because H=I/L is satisfied. The strength H of the magnetic field generated in a region several ten nanometers away from the surface of the conductor 510 is substantially equal to the strength of the magnetic field generated in the surface of the conductor 510. Further, the half-round shape (see FIG. 66) of the confinement portion 530 causes strength increase of the magnetic field in the vicinity of the center (the vicinity of the point P) of the circle meeting the inner side edge of the confinement portion 530.

Figure 68:
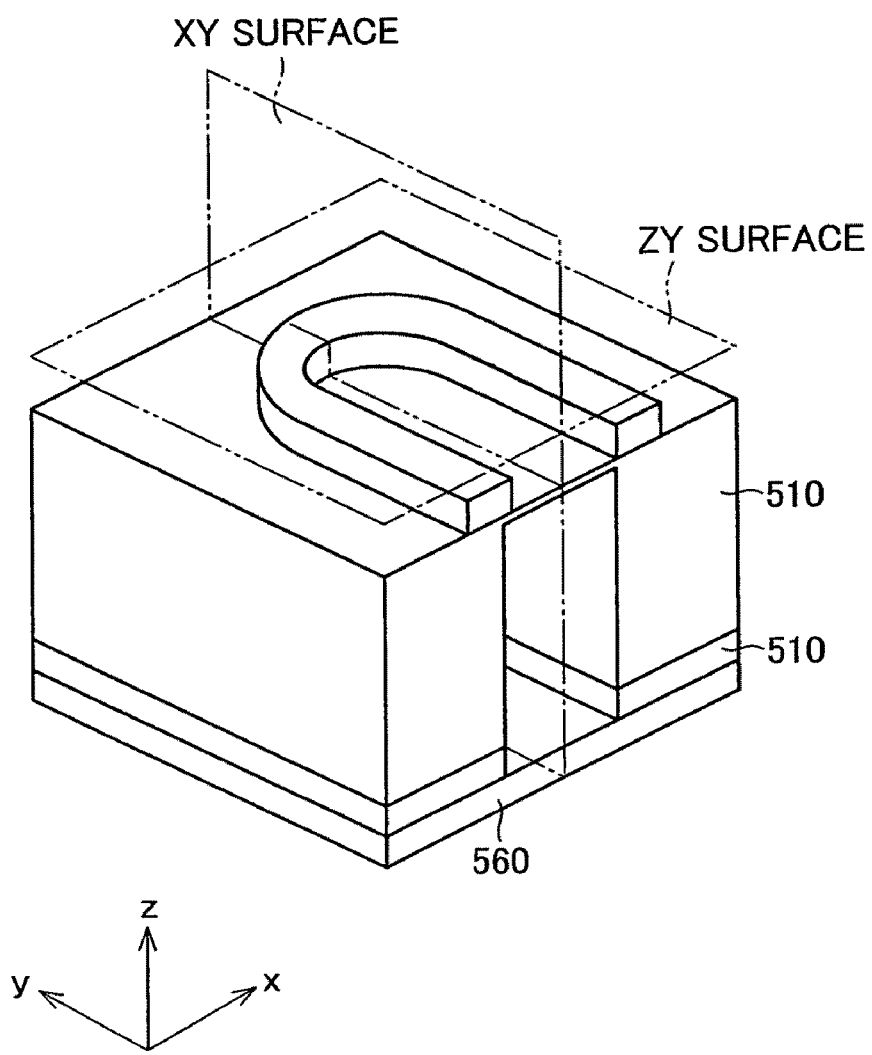
FIG. 68 is a perspective view illustrating a model for calculating, by way of an electromagnetic field simulation, a near field generated in the confinement portion of the electromagnetic field generating element.
Figure 69:
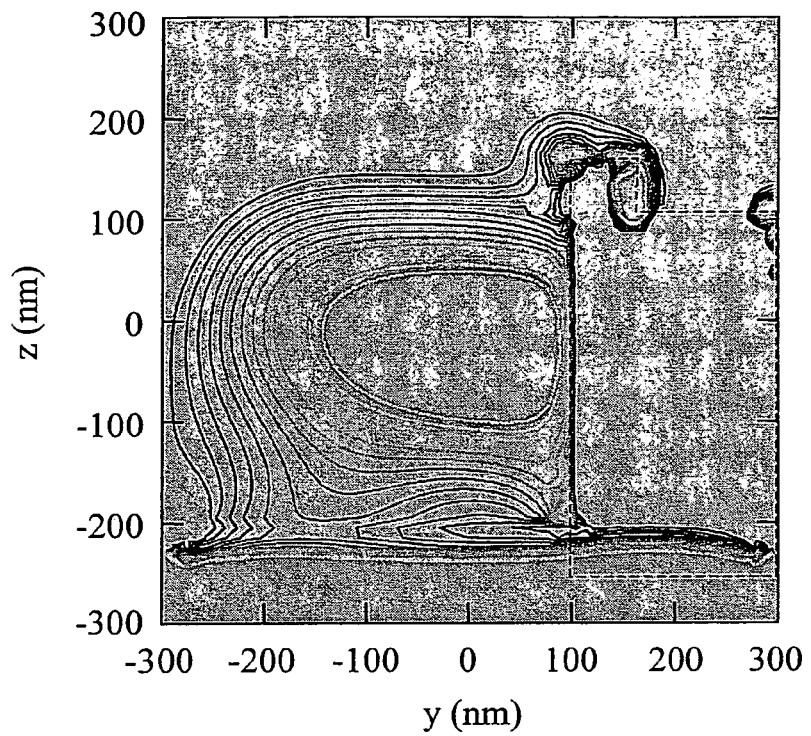
FIG. 69(a) illustrates electric field distribution in the XY surface shown in FIG. 68.
FIG. 69(b) illustrates electric field distribution in the ZY surface shown in FIG. 68.
Figure 69:
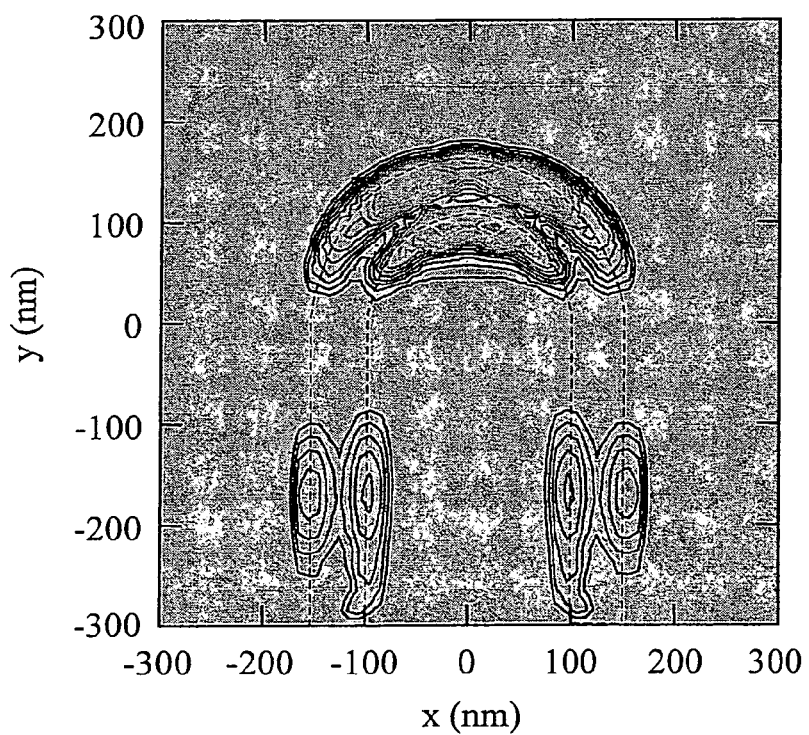
Figure 70:
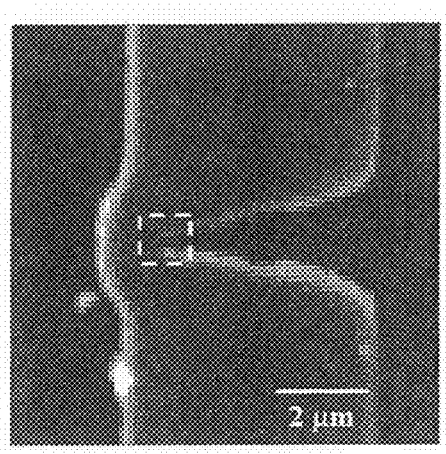
FIG. 70(a) is an explanatory diagram using a near field microscope image so as to illustrate the near field NF generated in the confinement portion of the electromagnetic field generating element.
FIG. 70(b) is an enlarged view of FIG. 70(a).
Figure 70:
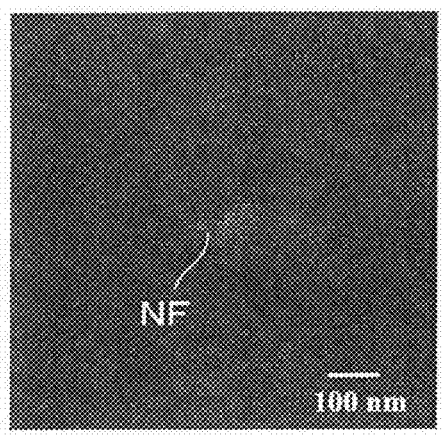

FIG. 68 is a perspective view illustrating a model for calculating, by way of an electromagnetic field simulation, the near field generated in the confinement portion 530 of the electromagnetic field generating element 500. Formed in the vicinity of the confinement portion 530 is the bank-like portion 542 which has a height Td of 50 nm and a width Wd of 50 nm. A light source is provided on the bottom surface of the electromagnetic field simulation model so as to emit light whose wavelength is 650 nm and whose polarization direction is parallel to the Y axis. Under such a condition, the calculation was carried out.

FIG. 69(a) illustrates electric field distribution in the surface (XY surface) taken along the upper portion of the bank-like portion 542. FIG. 69(b) illustrates electric field distribution in the surface (ZY surface; the surface taken along the most narrow portion of the confinement portion 530) taken along the conductor 510. As apparent from FIG. 69(a) and FIG. 69(b), an electric field E is concentrated in the bank-like portion 542, so that the near field NF is strengthened in the vicinity of the bank-like portion 542. Note that broken lines in the figures indicate the outer circumferential portion of the electromagnetic field generating element 500.

FIG. 70(a) is an explanatory diagram using a near field microscope image so as to illustrate the near field (NF) generated in the confinement portion 530 of the electromagnetic field generating element 500. FIG. 70(b) is an enlarged explanatory diagram of FIG. 70(a). As shown in FIG. 70(a) and FIG. 70(b), the factual observation result verifies that the near field NF is strengthened in the vicinity of the bank-like portion 542.

Figure 71:
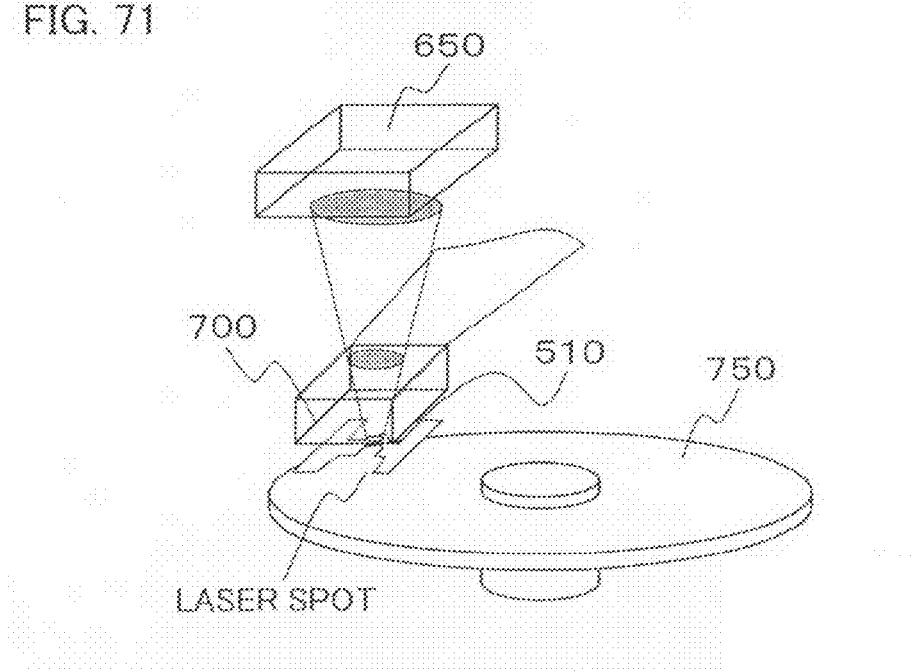
FIG. 71 is a diagram schematically illustrating a structure of an information recording/reproducing apparatus according to Embodiment 14.

FIG. 71 is a diagram schematically illustrating the structure of the information recording/reproducing apparatus 800. The information recording/reproducing apparatus 800 includes an optical head 650 provided in one piece with (i) the laser generating source 561 (see FIG. 25) for collecting laser light to the confinement portion 530 of the electromagnetic field generating element 500; (ii) the optical element 515 (see FIG. 25); and (iii) the light detector 563 (see FIG. 56) for detecting the light reflected from the confinement portion 530. Further, between the optical head 650 and the information recording medium 750, the information recording/reproducing head 700 is provided.

Each of the optical head 650 and the information recording/reproducing head 700 may include a mechanism for adjusting a position thereof to a position of its counterpart. Further, it is preferable that the optical element 515 be able to control the polarization direction of the laser light.

The following explains one example of information recording carried out in cases where: the laser light has a wavelength of 650 nm, the optical element 515 has a light collection lens whose numerical aperture NA is 0.65, and the information recording medium 750 is a TbFeCo medium. The TbFeCo medium used here has a coercivity of 2 kOe, and has a magnetization (magnetic dipole density) of 200 emu/cc, and has a film thickness of 50 nm.

The information recording medium 750 is rotated at a rotation speed of 200 rpm (at a linear velocity of 0.9 m/s). These set values are merely examples in the information recording example, so that the set values needs to be optimized according to parameters such as: a magnetic property of the information recording medium 750, a film structure of the information recording medium 750, the linear velocity, the laser light wavelength, the laser light power, the numeral aperture of the light collection lens, the structure in the vicinity of the confinement portion 530 of the electromagnetic field generating section 500 of the information recording/reproducing head 700, and the current to be supplied to the confinement portion 530.

Figure 72:
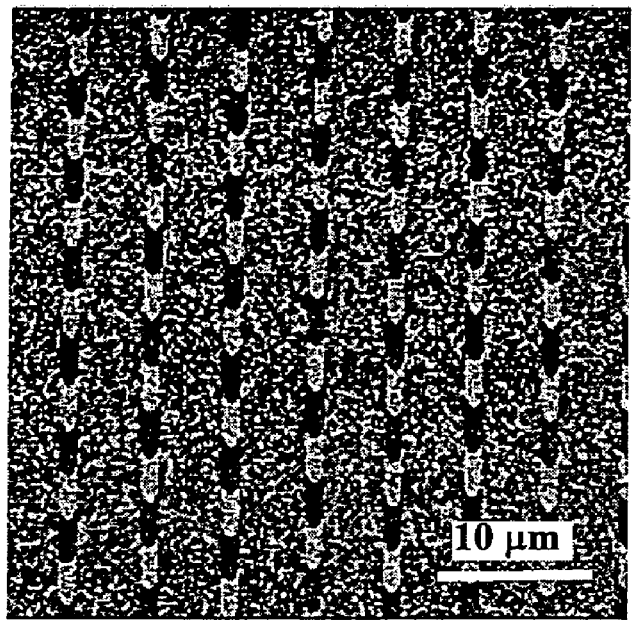
FIG. 72 is an explanatory diagram illustrating a result of observing a magnetic domain image in the information recording medium with the use of a magnetic force microscope.

FIG. 72 is an explanatory diagram illustrating a result of observing a magnetic domain image in the information recording medium 750 with the use of a magnetic force microscope. Here, the information recording is carried out under the following condition: laser light of 5 mW is irradiated, and a current of 100 mA is injected to the confinement portion 530, and the laser spot is dislocated from the confinement portion 530 such that the light is directly collected on the information recording medium 750.

The magnetic bit image can be observed in a track width of approximately 1 μm that corresponds to the diameter of the laser spot. As such, the generation of the magnetic field can be observed in the electromagnetic field generating section 500.

Figure 73:
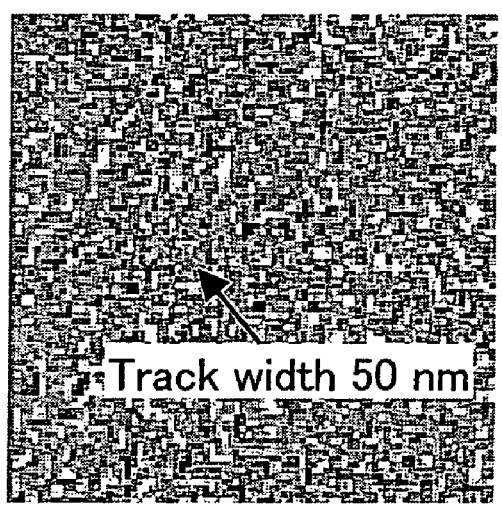
FIG. 73 is an explanatory diagram illustrating a result of observing a magnetic domain image in the information recording medium with the use of the magnetic force microscope, in cases where the near field assisted magnetic recording is carried out.
Figure 74:
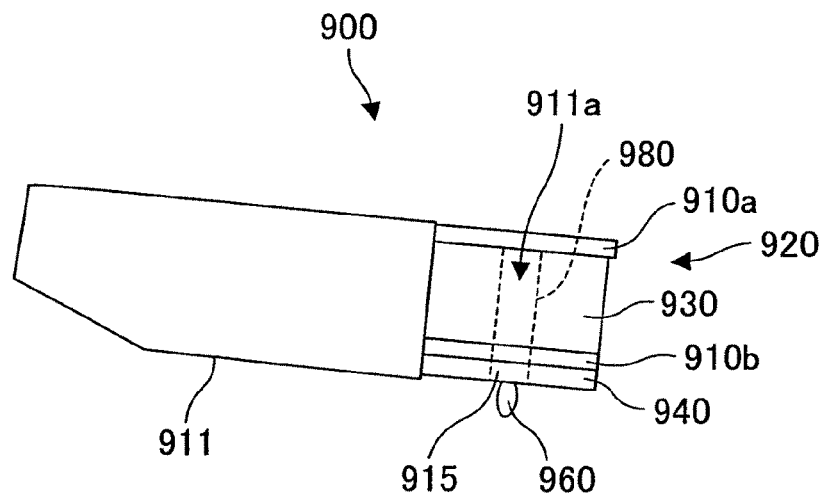
FIG. 74(a) is an explanatory diagram illustrating a conventional optical head.
FIG. 74(b) is an explanatory diagram illustrating respective positions of the conventional optical head and a medium.
Figure 74:
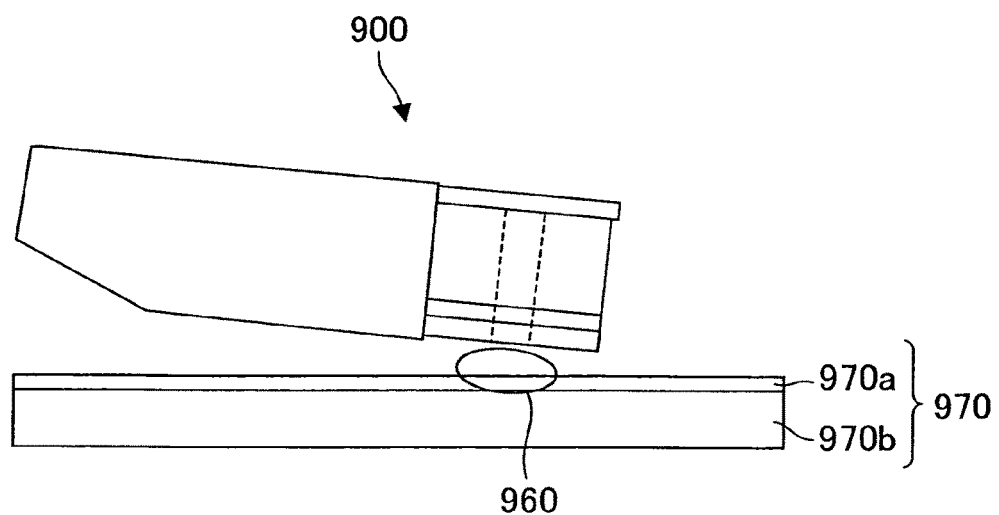

FIG. 73 is an explanatory diagram illustrating a result of observing a magnetic domain image in the information recording medium 750 with the use of the magnetic force microscope, in cases where laser light of 8 mW is collected in the confinement portion 530. The near field assisted magnetic field recording is achieved in a track having a width of 50 nm. The use of ordinary light allows magnetic recording onto a track having a width of approximately 1 μm as shown in FIG. 72. As such, the near field assisted magnetic recording can be realized in a region having such a minute size exceeding the wavelength limit of the light, by collecting the laser light to the confinement portion 530 with the use of the information recording/reproducing head 700 including the electromagnetic field generating element 500 of the present invention. Moreover, the principle of the information reproducing operation is the same as the principle described above, so that explanation thereof is omitted here.

Further, it is preferable to arrange the electromagnetic field generating element according to the present invention such that a supporting section for supporting the conductor is provided between the substrate and the conductor.

In the structure above, the supporting section and the light irradiation means are provided on the substrate. Therefore, the conductor provided on the supporting section, and the light irradiation means can be registered with each other by changing the thickness of the supporting section. With this, the position of the conductor, to which the light is to be irradiated by the light irradiation means, is adjusted to the light. In other words, the structure above makes it possible to adjust the edge portion of the conductor to a position appropriate to the light to be irradiated thereto. Accordingly, the electromagnetic field generating element can effectively generate the near field.

Further, it is preferable to arrange the electromagnetic field generating element according to the present invention such that the supporting section is formed in accordance with a thin film formation method.

The thin film formation method refers to a publicly known method for forming a thin film, such as the deposition method. According to the structure above, the supporting section is formed in accordance with the thin film formation method, so that the thickness of the supporting section can be adjusted minutely. As such, the structure makes it possible to adjust the edge portion of the conductor to a position more appropriate to the light to be irradiated thereto. Accordingly, the electromagnetic field generating element can effectively generate the near field.

Further, it is preferable to arrange the electromagnetic field generating element according to the present invention such that the light irradiation means is a laser oscillation section for oscillating laser light.

According to the structure above, the light irradiated from the light irradiation means is monochromatic light having strong coherency and strong directivity, so that the electromagnetic field generating element can effectively generate the near field.

Further, it is preferable to arrange the electromagnetic field generating element according to the present invention such that: orientation of the laser light irradiated from the light irradiation means is never changed, and the laser light is irradiated to the conductor.

According to the structure above, the orientation of the laser light oscillated and irradiated by the light irradiation means is never changed, and the light is directly irradiated to the conductor. This allows restraint of laser light strength attenuation due to orientation change of the laser light, and accordingly allows realization of an electromagnetic field generating element that generates the near field with high efficiency.

Further, the laser oscillation section required for the generation of the near field is incorporated with the substrate, so that the total size of the electromagnetic field generating element can be smaller than the size of an electromagnetic field generating element separately including a laser oscillation section.

It is preferable to arrange the electromagnetic field generating element according to the present invention such that the conductor includes a confinement section for confining a path of the current supplied to the conductor.

According to the structure, the confinement section of the conductor confines the path of the current supplied to conductor. This causes strength increase of a magnetic field generated from the conductor, and accordingly allows realization of an electromagnetic field generating element that generates such a strong magnetic field in the vicinity of the edge portion of the conductor.

Further, it is preferable to arrange the electromagnetic field generating element according to the present invention such that the conductor projects, in a light irradiation direction, higher than the supporting section.

In the structure above, the edge portion of the conductor projects as such. Therefore, when the near field is propagated, in the light irradiation direction, to the edge portion of the conductor via the surface of the conductor, the edge portion of the conductor prevents the near field from being diffused from the surface of the conductor to the supporting section. This allows prevention of attenuation of the near field.

Further, the electromagnetic field generating element according to the present invention may be arranged such that the conductor has unevenness extending in a light irradiation direction.

The unevenness may be either a rise portion or a recess portion. Alternatively, the unevenness may have such a shape that is obtained by folding a plate-like object, i.e., may have such a shape that has a rise portion and a recess portion. Further, the direction in which the unevenness extends corresponds to the direction in which a corner portion (the rise portion and/or the recess portion) in the unevenness extends.

As described above, the orientation of the near field propagated on the surface of the conductor is dramatically changed by the edge portion or the like. This causes generation of a strong localized near field. The unevenness formed in the conductor causes dramatic orientation change of the propagated near field, with the result that a strong localized near field is also generated in the unevenness. As such, the structure above makes it possible for the electromagnetic field generating element to generate such a strong near field.

Further, in cases where the current flows, e.g., perpendicular to the unevenness of the conductor, the magnetic field generated by the current flowing across the unevenness causes convergence of magnetic flux to the inside of the unevenness. As such, the structure above makes it possible for the electromagnetic field generating element to generate such a strong near field and such a strong magnetic field.

Further, the electromagnetic field generating element according to the present invention may further include a soft magnetic layer for converging magnetic flux generated from the conductor.

According to the structure, the magnetic field generated from the conductor is converged by the soft magnetic layer. This makes it possible to level the strength distribution of the magnetic field.

The electromagnetic field generating element according to the present invention may further include an insulating layer; and a soft magnetic layer, wherein: the insulating layer is sandwiched between the soft magnetic layer and the conductor.

According to the structure above, the following effect is obtained. That is, the soft magnetic field levels the strength distribution of the magnetic field as described above, and the insulating layer provided between the conductor and the soft magnetic layer makes it possible to prevent the current from leaking from the conductor to the soft magnetic layer. Accordingly, magnetic field loss due to current loss can be reduced. As such, the structure makes it possible for the electromagnetic field generating element to generate the magnetic field effectively.

The electromagnetic field generating element according to the present invention may further include: an insulating soft magnetic layer, provided on the conductor.

According to the structure, the magnetic flux can be leveled in the soft magnetic layer. Further, the insulating soft magnetic layer provided on the conductor prevents the current from leaking from the conductor to outside, so that magnetic field loss due to current loss can be reduced. Further, the soft magnetic layer is insulative, so that a change of the magnetic field never causes generation of an eddy current in the soft magnetic layer. Accordingly, electric field loss in the high frequency region can be reduced. As such, the structure allows realization of an electromagnetic field generating element for generating the magnetic field effectively.

Further, it is preferable to arrange the electromagnetic field generating element according to the present invention such that: the conductor has a portion to which the light irradiation means irradiates the light, and the portion is positioned substantially in an end of the substrate.

In the structure above, the conductor has the portion to which the light irradiation means irradiates the light, so that the near field generated in the portion is never greatly attenuated due to propagation loss or the like before the near field is propagated to the edge portion of the substrate. Moreover, the strong magnetic field can be generated outside.

To solve the problems, an information recording/reproducing head according to the present invention includes any of the aforementioned electromagnetic field generating elements.

As described above, each electromagnetic field generating element to be applied to the information recording/reproducing head can generate, from the edge portion of the conductor, (i) the near field, and (ii) the strong magnetic field with a little attenuation and a little delay. Therefore, in cases where such an electromagnetic field generating element is applied to the information recording/reproducing head for carrying out reading and writing with respect to an information recording medium, the information recording/reproducing head can carry out the thermally assisted magnetic recording. The thermally assisted magnetic recording is carried out such that: the near field, generated by the electromagnetic field generating element, is used to raise temperature of a portion of the information recording medium, and the magnetic field is applied to the portion whose temperature is raised. Here, the electromagnetic field generating element to be applied allows high output and high responsiveness, so that the high frequency magnetic recording can be carried out with respect to the information recording medium. Therefore, the structure above allows realization of the information recording/reproducing head capable of the high frequency magnetic recording.

Further, it is preferable that the information recording/reproducing head according to the present invention further include: an electromagnetic field detector for reading out information from an information recording medium, the electromagnetic field detector being provided in one piece with the electromagnetic field generating element.

In the structure above, the electromagnetic field detector for reading out information from the information recording medium is incorporated in this way. This allows the size of the information recording/reproducing head to be small.

Further, it is preferable to arrange the information recording/reproducing head according to the present invention such that the electromagnetic field detector is able to detect higher harmonic wave light.

The structure above makes it possible for the electromagnetic field detector to detect, as reflected light and scattering light, electric polarization information or magnetic polarization information each recorded in the information recording medium, even when the reflected light and the scattering light are the harmonic wave light. This allows removal of a noise signal generated by leaking laser light, with the result that the information can be read out from the information recording medium with a high S/N ratio.

To solve the problems, an information recording/reproducing apparatus according to the present invention includes any of the aforementioned information recording/reproducing heads.

Each information recording/reproducing head applied to the information recording/reproducing apparatus is capable of the high frequency magnetic recording, so that the structure above allows realization of an information recording/reproducing apparatus capable of the high frequency magnetic recording.

Further, it is preferable that the information recording/reproducing apparatus further include a slider, which flies over an information recording medium with a predetermined interval therebetween, wherein: the information recording/reproducing head is provided in one piece with the slider.

In the structure above, the information recording/reproducing head and the slider are provided in one piece. However, manufacturing processes coming after this are similar to the processes of manufacturing the conventional magnetic head. Therefore, the manufacturing processes of the conventional magnetic head can be used. With this, productivity is improved.

Further, the slider is in one piece with (i) a terminal for supplying a current to the laser oscillation section, (ii) a terminal for supplying a current to the conductor, and the like. This allows easy access from outside to the terminals, with the result that the productivity is improved.

Further, it is preferable that the information recording/reproducing apparatus according to the present invention further include an actuator, which is able to bring the slider to an arbitrary location in the information recording medium.

According to the structure above, the actuator can transport the information recording/reproducing head because the information recording/reproducing head is incorporated with the slider. This makes it possible to read out information from a desired position of the information recording medium.

Further, it is preferable to arrange the electromagnetic field generating element according to the present invention such that the conductor is so provided as to be implanted in the substrate.

According to the structure above, the implant of the conductor in the substrate allows formation of an interface with very tight combination secured between the conductor and the substrate. This allows restraint of scattering of a surface plasmon in the inward direction of the interface. Accordingly, propagation efficiency of the surface plasmon is improved. This allows improvement in efficiency of generating the near field in the bank-like portion formed in the edge constituting the confinement portion of the conductor. The efficiency of generating the near field is efficiency with respect to the strength of the light irradiated from the laser generating source.

Further, it is preferable to arrange the electromagnetic field generating element according to the present invention such that: the substrate has a projecting portion, and the bank-like structure portion is formed near a most projecting surface of the projecting portion.

Here, the projecting portion refers to a portion having a projecting surface which is parallel to a horizontal plane and which corresponds to the average height of a region projecting upward the most when the underside surface of the substrate is positioned in the downward direction.

According to the structure above, the following effect can be obtained when the near field generation region selectively comes close to (i) a surface, facing the near field generation region, of a sample; or (ii) a surface, facing the near field generation region, of a medium. That is, the near field is restrained from being generated, due to the scattering light or the leaking light (stray light) within the element, in a region other than the selected region. This makes it possible to selectively detect scattering light or reflected light, each of which is scattered or reflected by a region of the surface of the target sample or a region of the surface of the target medium.

It is preferable to arrange the electromagnetic field generating element according to the present invention such that an intermediating metal layer made of at least two types of metal is provided on the conductor.

According to the structure above, the surface plasmon scattered by the bank-like structure portion is reflected again by the intermediating metal layer formed between the conductor and the substrate. This allows strength increase of the near field generated in the bank-like structure. Moreover, the intermediating metal layer provided on the conductor makes it possible to prevent the conductor from being detached from the electromagnetic field generating element, and accordingly allows improvement of element strength of the electromagnetic field generating element.

It is preferable to arrange the electromagnetic field generating element according to the present invention so that: the confinement portion of the conductor has a side surface leaning with respect to an optical axis of the light, which is irradiated from the light source, such that an area receiving the light becomes large.

According to the structure above, the confinement portion of the conductor has the surface that is not parallel to the optical axis of the light coming from the light source to the bank-like structure portion positioned in the edge portion constituting the confinement portion of the conductor. This allows increase of an area of the interface which is between the conductor and the substrate, and in which the light is converted into the surface plasmon. This allows strength increase of the surface plasmon, which is to be propagated to the bank-like portion formed in the edge portion constituting the confinement portion of the conductor.

Further, a near field having desired strength is generated in the bank-like portion by irradiating the light to the interface, which is between the conductor and the substrate and in which the light is converted into the surface plasmon. This allows simplification of alignment of the respective optical axes of the laser generating source with a desired electromagnetic field generation region. Accordingly, reliability improvement and productivity improvement of the electromagnetic field generating element is realized.

Further, it is preferable to arrange the electromagnetic field generating element according to the present invention such that the confinement portion of the conductor has a thickness thinner than a wavelength of the light irradiated from the light source.

With this, the conductor to which the laser light is irradiated has the thickness thinner than the wavelength of the laser light irradiated from the light source provided in the substrate. The laser light irradiation causes excitation of the surface plasmon in (i) the surface, to which the laser light is irradiated, of the conductor and (ii) the surface, opposite to the surface to which the laser light is irradiated, of the conductor. The surface plasmon, excited in the surface to which the laser light is irradiated, is resonated with the surface plasmon excited in the surface opposite to the surface to which the laser light is irradiated. This allows strength increase of the near field generated in the conductor.

Further, it is preferable to arrange the electromagnetic field generating element according to the present invention such that a metal fine particle is provided between the substrate and the conductor.

According to the structure above, when the light is irradiated to the metal fine particle provided between the substrate and the conductor, the surface plasmon is locally excited. While the surface plasmon thus excited is propagated, the localized surface plasmon is resonated with either (i) the edge portion constituting the confinement portion of the conductor, or (ii) each localized surface plasmon excited in other metal fine particles. This allows strength increase of the surface plasmon generated in the edge portion of the conductor, and accordingly allows improvement in the near field generating efficiency with respect to the strength of the light irradiated from the light source.

Further, it is preferable to arrange the electromagnetic field generating element according to the present invention such that a soft magnetic layer is provided between the conductor and the substrate.

According to the structure above, the soft magnetic layer converges magnetic flux generated, in the confinement portion, by the current supplied to the conductor. This causes increase of magnetic flux density in the vicinity of the confinement portion, with the result that a strong magnetic field can be obtained.

Further, in this case, it is preferable that the soft magnetic layer be an insulating soft magnetic layer. With this, a change of the magnetic field in the soft magnetic layer never causes generation of an eddy current. Accordingly, electric field loss in the high frequency region can be reduced. Moreover, the strong magnetic field can be generated in the vicinity of the confinement portion.

Further, it is preferable that, in cases where the soft magnetic layer is a conductive soft magnetic layer, an insulating layer is provided between the soft magnetic layer and the conductor. With this, the insulating layer prevents leakage, to the conductive metal layer, of the current supplied to the conductor. This allows restraint of reduction of current density in the confinement portion. Accordingly, the magnetic field loss can be reduced, with the result that a strong magnetic field can be obtained in the conductive metal layer.

It is preferable to arrange the electromagnetic field generating element of the present invention such that: the light source is a semiconductor laser element, and the semiconductor laser element is formed in one piece with the substrate.

According to the structure above, the near field can be generated by the light irradiated from the semiconductor laser element that serves as the light source and that is incorporated with the substrate. This allows realization of reliability improvement and productivity improvement of the electromagnetic field generating element.

To solve the problems, a recording head of the present invention includes: the electromagnetic field generating element of the present invention; while the near field generated in the bank-like structure portion is used to raise temperature of an information recording medium, a magnetic field generated in the confinement portion being used to record information onto the information recording medium.

To solve the problems, a reproducing head of the present invention includes: (i) the electromagnetic field generating element of the present invention; and (ii) an electromagnetic field detector for detecting light, the near field generated in the bank-like structure portion being used to raise temperature of an information recording medium such that information stored in the information recording medium is reproduced, the reproducing being carried out such that the electromagnetic field detector detects light which is irradiated from the light source to the conductor, and which is reflected or scattered by the conductor.

With this, the temperature of the information recording medium can be effectively raised by the near field generated in the bank-like structure portion of the edge portion constituting the confinement portion of the conductor. On this account, magnetic recording can be carried out with the use of the strong magnetic field generated in the vicinity of the confinement portion. As such, the thermally assisted magnetic recording/reproduction is carried out with the use of the near field NF for raising the temperature of the minute region in the information recording medium. Further, the near field generated in the bank-like structure portion in the electromagnetic field generating element comes close to a surface of a medium, the near field is strengthened between the projecting bank-like structure portion and the surface of the medium. This allows restraint of variation of strength distribution of the near field.

Further, the electromagnetic field detector detects the light, which is irradiated from the light source to the conductor and which is reflected or scattered by the conductor. This allows acquirement of the electric polarization information or the magnetic polarization information, each of which is stored in the information recording medium and each of which is represented by a signal. In this way, the information stored in the information recording medium can be reproduced by using the near field and the magnetic field. Therefore, unlike the conventional techniques, the yoke extension section does not need to be used for the generation of the magnetic field in a desired location. This allows restraint of magnetic field attenuation or magnetic field delay as compared with the case of using the yoke extension section. This makes it possible to provide a recording head or a reproducing head each suitable for the high frequency magnetic recording/reproduction.

Further, this makes it possible to realize an information recording/reproducing head for the thermally assisted magnetic recording carried out, with the assistance of the near field region which exceeds the diffraction limit of light, with respect to the minute. The acquirement of the strong near field makes it possible to provide an information recording/reproducing head for carrying out the recording and the reproducing with respect to the information recording medium having a high coercivity.

To solve the problems, an information recording/reproducing apparatus of the present invention includes: (i) the recording head of the present invention; and (ii) transporting means for transporting the recording head to a location in the information recording medium, the information recording/reproducing apparatus at least carrying out information recording with respect to the information recording medium. Further, to solve the problems, an information recording/reproducing apparatus includes: (i) the reproducing head of the present invention; and (ii) transporting means for transporting the recording head to a location in the information recording medium, the information recording/reproducing apparatus at least carrying out information reproducing with respect to the information recording medium.

This makes it possible to transport the recording head or the reproducing head to a desired position in the information recording medium. With this, the thermally assisted magnetic recording/reproduction is carried out with the use of the near field NF for raising the temperature of the minute region in the information recording medium. Further, the temperature of the information recording medium can be raised effectively by the near field generated in the bank-like structure portion of the edge portion constituting the confinement portion of the conductor, so that the magnetic recording can be carried out by way of the strong magnetic field generated in the vicinity of the confinement portion. Further, the electromagnetic field detector detects the light, which is irradiated from the light source to the conductor and which is reflected or scattered by the conductor. This allows acquirement of the electric polarization information or the magnetic polarization information, each of which is stored in the information recording medium and each of which is represented by a signal. In this way, the information stored in the information recording medium can be reproduced by using the near field and the magnetic field.

Therefore, unlike the conventional techniques, the yoke extension section does not need to be used for the generation of the magnetic field in a desired location. This allows restraint of magnetic field attenuation or magnetic field delay as compared with the case of using the yoke extension section. This makes it possible to provide a recording head or a reproducing head each suitable for the high frequency magnetic recording/reproduction. Further, this allows realization of an information recording/reproducing head for the thermally assisted magnetic recording carried out, with the assistance of the near field which exceeds the diffraction limit of light, with respect to the minute region. Further, the acquirement of the strong near field makes it possible to provide an information recording/reproducing head for carrying out the recording and the reproducing with respect to the information recording medium having a high coercivity.

To solve the problems, an electromagnetic field generating element according to the present invention includes: (i) a substrate; (ii) a supporting section, provided on the substrate; (iii) a conductor, which is provided on the supporting section and which has a plate-like shape; and (iv) light irradiation means for irradiating light, the light irradiation means being provided on the supporting section, the light irradiation means irradiating, to the conductor, light substantially parallel to an extending flat surface of the conductor, the conductor generating a magnetic field when receiving a current.

This allows realization of an electromagnetic field generating element restraining the magnetic field attenuation and the magnetic field delay, as described above.

Further, an information recording/reproducing head according to the present invention includes the electromagnetic field generating element.

This allows realization of an information recording/reproducing head capable of the high frequency magnetic recording, as described above.

Further, an information recording/reproducing apparatus according to the present invention includes the information recording/reproducing head.

This allows realization of an information recording/reproducing apparatus capable of the high frequency recording, as described above.

As described above, an electromagnetic field generating element of the present invention includes: (i) a light source; and (ii) a substrate, in which a conductor is provided, the conductor having a confinement portion, which is so narrow as to confine a path of a current flowing through the conductor, the confinement portion of the conductor having an edge that includes a bank-like structure portion projecting higher than a surface of the conductor; when the light source irradiates light to the confinement portion, a near field being generated in the bank-like portion within the confinement portion.

With this, the confinement portion formed in the conductor confines the current path, with the result that a strong magnetic field is generated in the vicinity of the confinement portion. Therefore, for the attainment of the magnetic field in a desired location, the confinement portion is formed within the location. Therefore, unlike the conventional techniques, the yoke extension section does not need to be used for the generation of the magnetic field in such a desired location. This allows restraint of magnetic field attenuation or magnetic field delay as compared with the case of using the yoke extension section. This makes it possible to provide an electromagnetic field generating element suitable for the high frequency magnetic recording/reproduction.

The magnetic field is generated by supplying a current to the conductor, whereas the near field is generated by irradiating the light to the conductor. The near field thus generated is propagated via the side surface of the conductor, thereby strengthening the near field in the bank-like structure portion of the edge portion constituting the confinement portion of the conductor. As such, the magnetic field and the near field are generated in substantially the same location, i.e., in the bank-like structure portion of the edge portion constituting the confinement portion of the conductor. The use of the conductor having such a simple structure makes it possible to provide an electromagnetic field generating element allowing for acquirement of the magnetic field and the near field in a desired location.

The electromagnetic field generating element, the information recording/reproducing head, the information recording/reproducing apparatus, and the thermally assisted magnetic recording method of the present invention allows restraint of magnetic field attenuation and magnetic field delay. For this reason, they can be applied to an information recording/reproducing head, an information recording/reproducing apparatus, and the like, each of which carries out the high frequency magnetic recording/reproducing with respect to an information recording medium.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An electromagnetic field generating element, comprising:
    a substrate;
    a conductor clump including a first conductor provided on the substrate, a second conductor which is in contact with the first conductor and has a plate-like shape, and a third conductor which is in contact with the second conductor; and
    light irradiation means, which is provided on the substrate, irradiating light, wherein
    a magnetic field is generated when the second conductor receives a current via the first and third conductors,
    the light irradiation means irradiates light towards the second conductor substantially parallel to an extending flat surface of the second conductor without change of orientation of the light irradiated from the light irradiation means.

2. The electromagnetic field generating element as set forth in claim 1, wherein:
    the first conductor and the third conductor constitute a supporting section for supporting the second conductor.

3. The electromagnetic field generating element as set forth in claim 2, wherein:
    the supporting section is formed in accordance with a thin film formation method.

4. The electromagnetic field generating element as set forth in claim 2, wherein:
    the second conductor projects, in a light irradiation direction, higher than the supporting section.

5. The electromagnetic field generating element as set forth in claim 1, wherein:
    the light irradiation means is a laser oscillation section for oscillating laser light.

6. The electromagnetic field generating element as set forth in claim 1, wherein:
    the second conductor serves as a confinement section for confining a path of the current supplied to the second conductor via the first and third conductors.

7. The electromagnetic field generating element as set forth in claim 1, wherein:
    the second conductor has unevenness extending in a light irradiation direction.

8. The electromagnetic field generating element as set forth in claim 1, further comprising:
    a soft magnetic layer for converging magnetic flux generated from the second conductor.

9. The electromagnetic field generating element as set forth in claim 1, further comprising:
    an insulating layer; and
    a soft magnetic layer,
    wherein:
    the insulating layer is sandwiched between the soft magnetic layer and the second conductor.

10. The electromagnetic field generating element as set forth in claim 1, further comprising:
    an insulating soft magnetic layer, provided on the second conductor.

11. The electromagnetic field generating element as set forth in claim 1, wherein:
    the second conductor has a portion to which the light irradiation means irradiates the light, and the portion is positioned substantially in an end of the substrate.

12. An information recording/reproducing head, comprising:
    the electromagnetic field generating element as set forth in claim 1.

13. The information recording/reproducing head as set forth in claim 12, further comprising:
    an electromagnetic field detector for reading out information from an information recording medium, the electromagnetic field detector being provided in one piece with the electromagnetic field generating element.

14. The information recording/reproducing head as set forth in claim 13, wherein:
    the electromagnetic field detector is able to detect higher harmonic wave light.

15. An information recording/reproducing apparatus, comprising:
    an information recording/reproducing head, which includes the electromagnetic field generating element as set forth in claim 1.

16. The information recording/reproducing apparatus as set forth in claim 15, further comprising:
    a slider, which flies over an information recording medium with a predetermined interval therebetween,
    wherein:
    the information recording/reproducing head is provided in one piece with the slider.

17. The information recording/reproducing apparatus as set forth in claim 16, further comprising:
    an actuator, which is able to bring the slider to an arbitrary location in the information recording medium.

* * * * *

UNITED STATES PATENT AND TRADEMARK OFFICE
CERTIFICATE OF CORRECTION

| | |
|---|---|
| PATENT NO. | : 7,690,009 B2 |
| APPLICATION NO. | : 12/316592 |
| DATED | : March 30, 2010 |
| INVENTOR(S) | : Shintaro Miyanishi et al. |

It is certified that error appears in the above-identified patent and that said Letters Patent is hereby corrected as shown below:

On the title page item (54) and col. 1, line 1, delete Title of the Invention:

"ELECTROMAGNETIC FIELD GENERATING ELEMENT, INFORMATION RECORDING/REPRODUCING HEAD AND INFORMATION RECORDING/REPRODUCTION APPARATUS"

and substitute the following correct Title of the Invention therefor:

--ELECTROMAGNETIC FIELD GENERATING ELEMENT, INFORMATION RECORDING/REPRODUCING HEAD AND INFORMATION RECORDING/REPRODUCING APPARATUS--

Signed and Sealed this

Seventh Day of September, 2010

David J. Kappos
*Director of the United States Patent and Trademark Office*